(12) United States Patent
Zaerin

(10) Patent No.: US 8,167,079 B2
(45) Date of Patent: May 1, 2012

(54) AUTO CLUTCH SYSTEM

(76) Inventor: Mehdi Zaerin, Isfahan (IR)

( * ) Notice: Subject to any disclaimer, the term of this patent is extended or adjusted under 35 U.S.C. 154(b) by 285 days.

(21) Appl. No.: 12/563,522

(22) Filed: Sep. 21, 2009

(65) Prior Publication Data

US 2010/0095801 A1    Apr. 22, 2010

(51) Int. Cl.
*B60K 26/00* (2006.01)
(52) U.S. Cl. .......................................... 180/334
(58) Field of Classification Search ............. 180/334, 180/336, 315, 333; 74/490.14
See application file for complete search history.

(56) References Cited

FOREIGN PATENT DOCUMENTS

KR      2007112343 A   * 11/2007
* cited by examiner

*Primary Examiner* — Faye M. Fleming
(74) *Attorney, Agent, or Firm* — Barry Choobin; Choobin & Choobin Consultancy L.L.C.

(57) ABSTRACT

The presented system is a full-mechanical system composed of 60 metal parts all of which parts are made of steel and iron metals. This system is placed in the deck of vehicles and over the car mat and connected to clutch and gas pedals such that it connects gas and clutch pedals through levers. This system is fixed in its place through two levers called "fulcrum shafts" such that head of these two levers are placed in a due place avoiding any slide helping to install the system tightly in its due place.

5 Claims, 72 Drawing Sheets

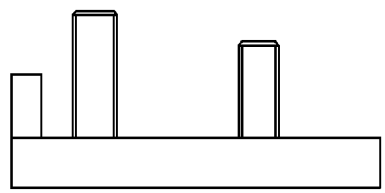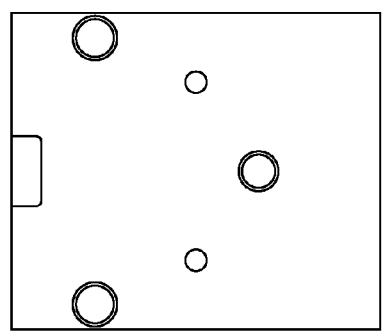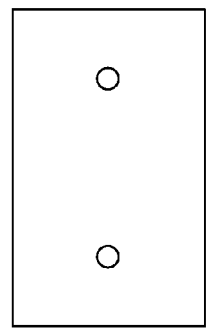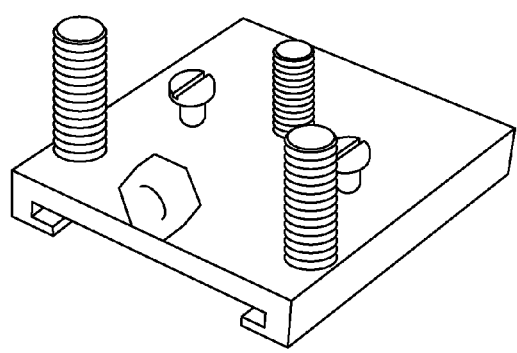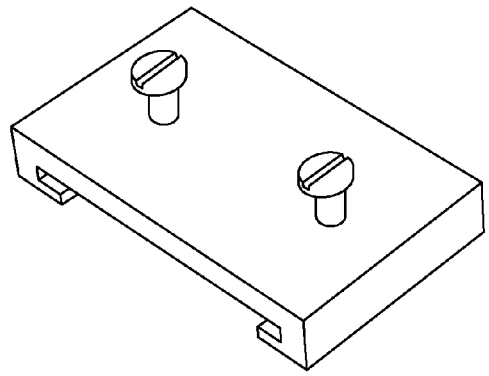
FIG. 6(B)  FIG. 6(C)

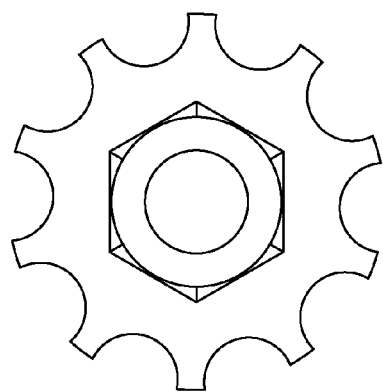 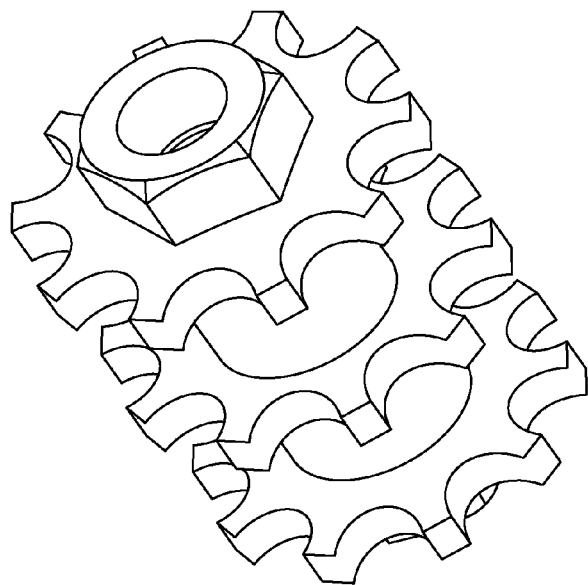
FIG. 32(B)    FIG. 32(C)
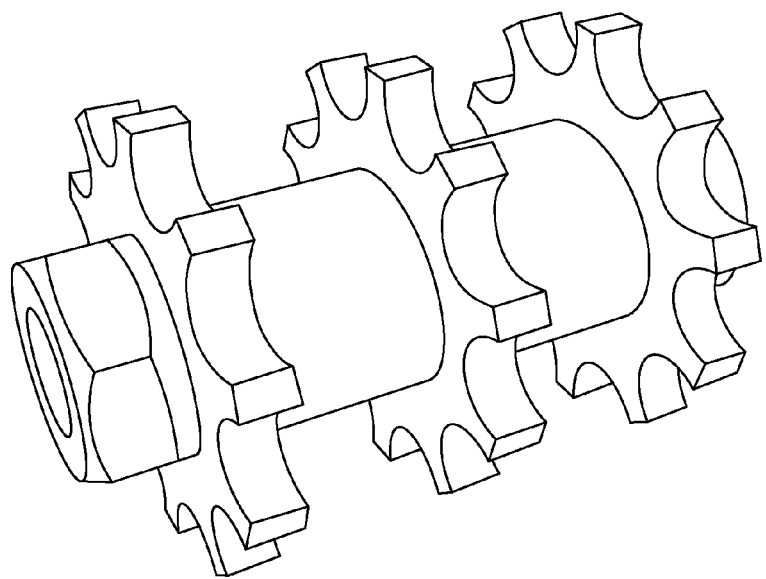
FIG. 32(D)

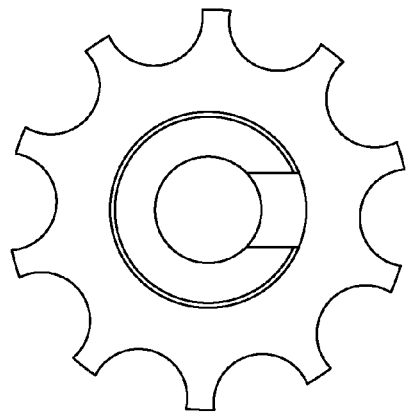
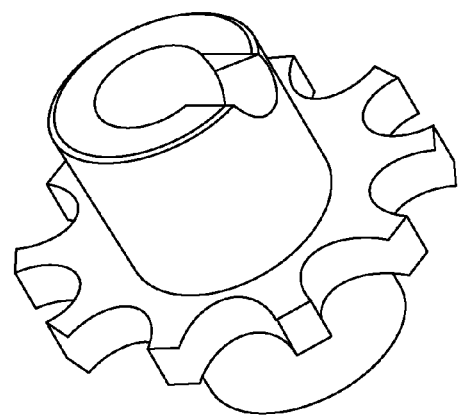
FIG. 33(B)　　　　　　　　　　FIG. 33(C)
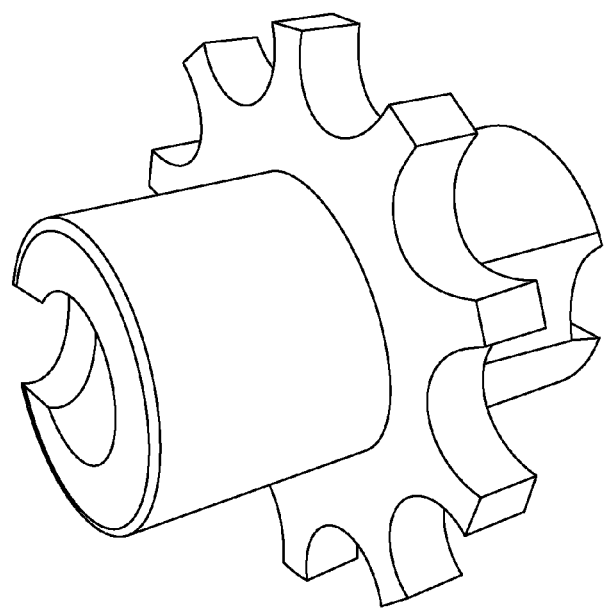
FIG. 33(D)

AUTO CLUTCH SYSTEM

FIELD OF THE INVENTION

The present invention relates to clutches, combinations including vortex flow drive and clutch, vortex flow drive and brake, clutch and brake, and clutch and gear; and also relates to mechanism for joint control of transmission and clutch, and transmission and brake.

The present invention relates also to the control of those various power-transmission means, motors, and brakes the motions of which occur at the completion of a cycle of operations or which are due to contact with the material handled by the machine or to the defective action of the parts of the machine operated or to such operations as arise from the initiation of measures for the safety of the operator.

BACKGROUND OF THE INVENTION

A clutch is a mechanism for transmitting rotation, which can be engaged and disengaged. Clutches are useful in devices that have two rotating shafts. In these devices, one shaft is typically driven by a motor or pulley, and the other shaft drives another device. In a drill, for instance, a motor drives one shaft, and the other drive a drill chuck. The clutch connects the two shafts so that they can either be locked together and spin at the same speed (engaged), or be decoupled and spin at different speeds (disengaged).

Driving in high-traffic streets is a very difficult and boring task for those who drive for a long time during a daylong and for those who are suffering from pain in their foot or backache. The modern technology has been able to mitigate such problems somehow through producing automatic cars or other advanced cars.

Therefore, it would be advantageous to have a system to modify regular stick shift cars to an automatic system.

SUMMARY OF THE INVENTION

One objective of the present invention is to provide a system to facilitate and improve driving in high-traffic streets to the benefit of the public and, in particular, for those who are suffering from foot or backache and driving is difficult for them.

Yet another objective of the present invention is to provide a system not needing for clutch pedal when a driver brakes and tries to stop the car.

Yet another objective of the present invention is to provide a system not needing clutch at the time of starting and launching the car.

Yet another objective of the present invention is to provide a system not needing a clutch for changing gears.

Yet another object of the present invention is to provide a full-mechanical system composed of 60 metal parts all of which parts are made of steel and iron metals.

BRIEF DESCRIPTION OF THE DRAWINGS

FIG. 1 (A): This figure is representative of the Length of the Main Frame and represents arrangement style of cogs along the main frame.

FIG. 1 (B): This figure is representative of the Width of the Main Frame and represents arrangement style of cogs in the width of the main frame.

FIG. 1 (C): This figure is representative of the Main Frame and represents scale of length and width of the main frame of the system.

FIG. 4 (A): This figure represents dynamic frames and their installation over System's Main Frame.

FIG. 4 (B): This figure represents dynamic frames and their installation over System's Main Frame.

FIG. 6 (A): This figure is representative of dynamic frames of Clutch Lever.

FIG. 6 (B): This figure is representative of Shaft and Parallel Columns.

FIG. 6 (C): This figure is representative of Bearing Levers.

FIG. 7 (A): This figure is representative of the map of scales and sizes used in the fixed and dynamic levers.

FIG. 7 (B): This figure is representative of the 3D Map of fixed and dynamic levers.

FIG. 8 (A): This figure is representative of 3D Map of the Nut of Rotating Gasket.

FIG. 8 (B): This figure is representative of 3D Map of the Reciprocal Bolt.

FIG. 8 (C): This figure is representative of Head of Dynamic Lever in the bearing lever. A nut (no. 8) is welded in the Head Section of the bearing lever.

FIG. 9 (A): This figure is representative of flat series of bearing lever.

FIG. 9 (B): This figure is representative of angled series of bearing lever.

FIG. 9 (C): This figure is representative of semicircle series of bearing lever.

FIG. 10 (A): This figure is representative of the base of bearing lever along with its constituent elements.

FIG. 10 (B): This figure is representative of 3D Map of the support base of bearing lever.

FIG. 11 (A): This figure is representative of the Complete Drawing of bearing lever with flat series.

FIG. 11 (B): This figure is representative of the Complete Drawing of bearing lever with semicircle series.

FIG. 11 (C): This figure is representative of the Complete Drawing of bearing lever with angled series.

FIG. 12 (A): This figure is representative of the explosive map of bearing lever.

FIG. 12 (B): This figure is representative of the 3d Explosive Map of bearing lever.

FIG. 14 (A): This figure is representative of the map of fixed lever in the clutch lever.

FIG. 14 (B): This figure is representative of the map of fixed lever in the clutch lever.

FIG. 15 (A): This figure is representative of dynamic lever in the clutch lever. A Nut (no. 8) is welded in the Head Section of this lever.

FIG. 15 (B): This figure is representative of dynamic lever in the clutch lever. A Nut (no. 8) is welded in the Head Section of this lever.

FIG. 16 (A): This figure is representative of the map of "Nipper Regulator Bolt" of lever. This bolt (no. 8) is placed over Nut welded to the dynamic lever.

FIG. 16 (B): This figure is representative of the map of "Nipper Regulator Bolt" of lever. This bolt (no. 8) is placed over Nut welded to the dynamic lever.

FIG. 17 (A): This figure is representative of the map of "Nipper of Clutch Lever" and connection style of the base to the nipper.

FIG. 17 (B): This figure is representative of the installation method of base over Nipper of the Clutch Lever.

FIG. 17 (C): This figure is representative of Nipper of the Clutch Lever and base.

FIG. 18 (A): This figure is representative of the connection style of Nut of the rotating gasket to the pipe. This piece is finally set inside the base of the Nipper of the Clutch Lever.

FIG. 18 (B): This figure is representative of the connection style of Nut of the rotating gasket to the pipe. This piece is finally set inside the base of the Nipper of the Clutch Lever.

FIG. 18 (C): This figure is representative of the connection style of Nut of the rotating gasket to the pipe. This piece is finally set inside the base of the Nipper of the Clutch Lever.

FIG. 19 (A): This figure represents drawing of the Nut of the screw wire.

FIG. 19 (B): This figure represents drawing of the screw wire.

FIG. 19 (C): This figure represents drawing of the screw wire.

FIG. 19 (D): This figure represents drawing of the screw wire.

FIG. 20 (A): This figure is representative of the map of "Frame of Clutch Lever's Nipper". This frame is finally connected to the Base of Clutch Lever's Nipper.

FIG. 20 (B): This figure is representative of the map of "Frame of Clutch Lever's Nipper". This frame is finally connected to the Base of Clutch Lever's Nipper.

FIG. 20 (C): This figure is representative of the map of "Frame of Clutch Lever's Nipper". This frame is finally connected to the Base of Clutch Lever's Nipper.

FIG. 21 (A): This figure is representative of the blueprint of Clutch Lever showing all constituent parts of the Clutch Lever.

FIG. 21 (B): This figure is representative of the blueprint of Clutch Lever showing all constituent parts of the Clutch Lever.

FIG. 22 (A): This figure is representative of binary cogwheels. Binary cogwheels are composed of parallel cogwheels and one bolt no. 10.

FIG. 22 (B): This figure is representative of binary cogwheels. Binary cogwheels are composed of parallel cogwheels and one bolt no. 10.

FIG. 22 (C): This figure is representative of binary cogwheels. Binary cogwheels are composed of parallel cogwheels and one bolt no. 10.

FIG. 22 (D): This figure is representative of binary cogwheels. Binary cogwheels are composed of parallel cogwheels and one bolt no. 10.

FIG. 32 (A): This figure is representative of triple cogwheels. Triple or triplicate cogwheels are composed of three parallel cogwheels put in one line and in similar scales.

FIG. 32 (B): This figure is representative of triple cogwheels. Triple or triplicate cogwheels are composed of three parallel cogwheels put in one line and in similar scales.

FIG. 32 (C): This figure is representative of triple cogwheels. Triple or triplicate cogwheels are composed of three parallel cogwheels put in one line and in similar scales.

FIG. 32 (D): This figure is representative of triple cogwheels. Triple or triplicate cogwheels are composed of three parallel cogwheels put in one line and in similar scales.

FIG. 33 (A): This figure is representative of single cogwheel. Single cogwheel is put in one line with middle cogwheel from among triple cogwheels.

FIG. 33 (B): This figure is representative of single cogwheel. Single cogwheel is put in one line with middle cogwheel from among triple cogwheels.

FIG. 33 (C): This figure is representative of single cogwheel. Single cogwheel is put in one line with middle cogwheel from among triple cogwheels.

FIG. 33 (D): This figure is representative of single cogwheel. Single cogwheel is put in one line with middle cogwheel from among triple cogwheels.

FIG. 34 (A): This figure is representative of shaft. This shaft is put in one line with single cogwheel.

FIG. 34 (B): This figure is representative of shaft from upper view. In this figure, you may see the internal and external diameter of shaft.

FIG. 34 (C): This figure is representative of shaft from side view. In this figure, you may see scale of furrow created over the shaft.

FIG. 35 (A): This figure is representative of the support base of shaft. This base is placed over dynamic frame of shaft and is screwed to the frame. The furrow existing over the frame of the support base is a tapped furrow, which holds shaft inside base tightly through a no. 5 bolt. These tapped furrows reach 3 over the base's frame.

FIG. 35 (B): This figure is representative of the support base of shaft. This base is placed over dynamic frame of shaft and is screwed to the frame. The furrow existing over the frame of the support base is a tapped furrow, which holds shaft inside base tightly through a no. 5 bolt. These tapped furrows reach 3 over the base's frame.

FIG. 35 (C): This figure is representative of the support base of shaft from lower view. The furrow created in the button section of the base is the place for screwing base to the dynamic frame.

FIG. 36 (A): This figure is representative of the spring existing around the shaft. This spring, which is a roll-top spring, may assume different wire thicknesses depending on the power of the clutch pedal.

FIG. 36 (B): This figure is representative of the spring existing around the shaft. This spring, which is a roll-top spring, may assume different wire thicknesses depending on the power of the clutch pedal.

FIG. 37 (A): This figure is representative of the ball bearing coupling. This coupling moves up and down around the shaft. The spring existing around the shaft is placed under this coupling.

FIG. 37 (B): This figure is representative of the ball bearing coupling. This coupling moves up and down around the shaft. The spring existing around the shaft is placed under this coupling.

FIG. 37 (C): This figure is representative of the ball bearing coupling from upper view. In this figure, you may see the internal and external diameter of this coupling.

FIG. 38 (A): This figure is representative of "Chain Clamp". This clamp is finally installed over the frame of ball bearing coupling and its cogged section is connected to the single chain.

FIG. 38 (B): This figure is representative of "Chain Clamp". This clamp is finally installed over the frame of ball bearing coupling and its cogged section is connected to the single chain.

FIG. 38 (C): This figure is representative of "Chain Clamp". This clamp is finally installed over the frame of ball bearing coupling and its cogged section is connected to the single chain.

FIG. 38 (D): This figure is representative of "Chain Clamp". This clamp is finally installed over the frame of ball bearing coupling and its cogged section is connected to the single chain.

FIG. 39 (A): This figure is representative of the shaft's cap from side view. This cap is connected tightly to head of shaft through two bolts. In this figure, you may observe location of bolt over the frame of the shaft's cap.

FIG. 39 (B): This figure is representative of the shaft's cap from side view. This cap is connected tightly to head of shaft through two bolts. In this figure, you may observe location of "Coupling Regulation Bolt" over the frame of the shaft's cap.

FIG. 39 (C): This figure is representative of the shaft's cap from side view. This cap is connected tightly to head of shaft through two bolts. In this figure, you may see the internal and external diameter of shaft's cap.

FIG. 40 (A): This figure is representative of the shaft's blueprint and its constituent details.

FIG. 40 (B): This figure is representative of the shaft's blueprint and its constituent details.

Figure 45:
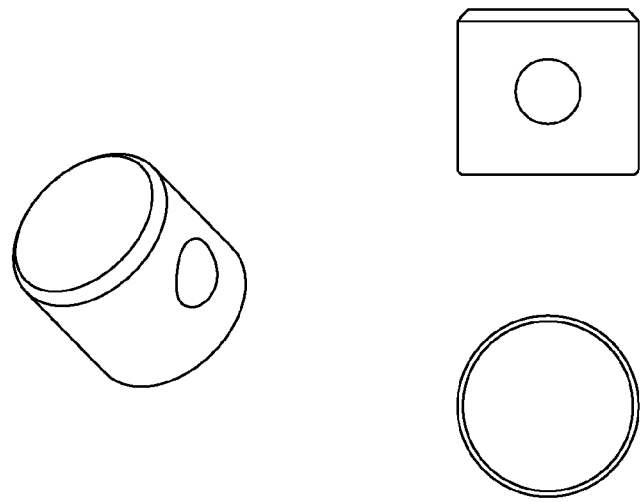
Figure 45A:
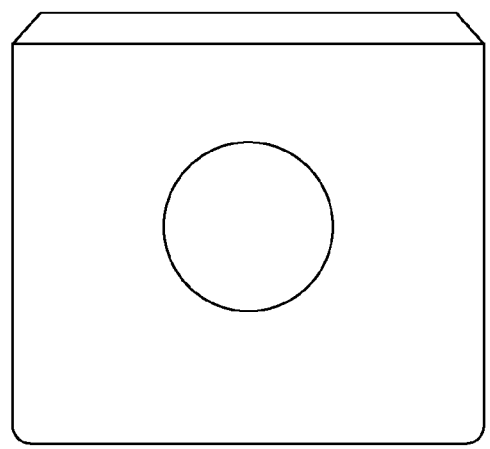
Figure 45B:
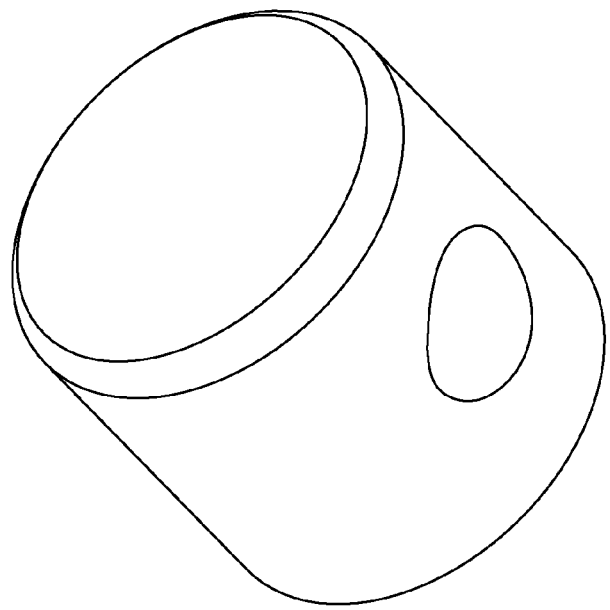
Figure 45C:
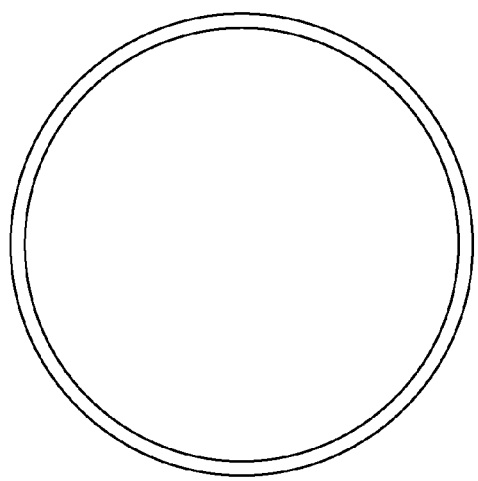

FIG. 45: This figure is representative of column existing inside the shaft's hole. This piston may move up and down inside the shaft's hole.

FIG. 45 (A): This figure is representative of column existing inside the shaft's hole. This piston may move up and down inside the shaft's hole.

FIG. 45 (B): This figure is representative of column existing inside the shaft's hole. This piston may move up and down inside the shaft's hole.

FIG. 45 (C): This figure is representative of column existing inside the shaft's hole. This piston may move up and down inside the shaft's hole. In this figure, you may observe the external diameter of piston.

Figure 46:
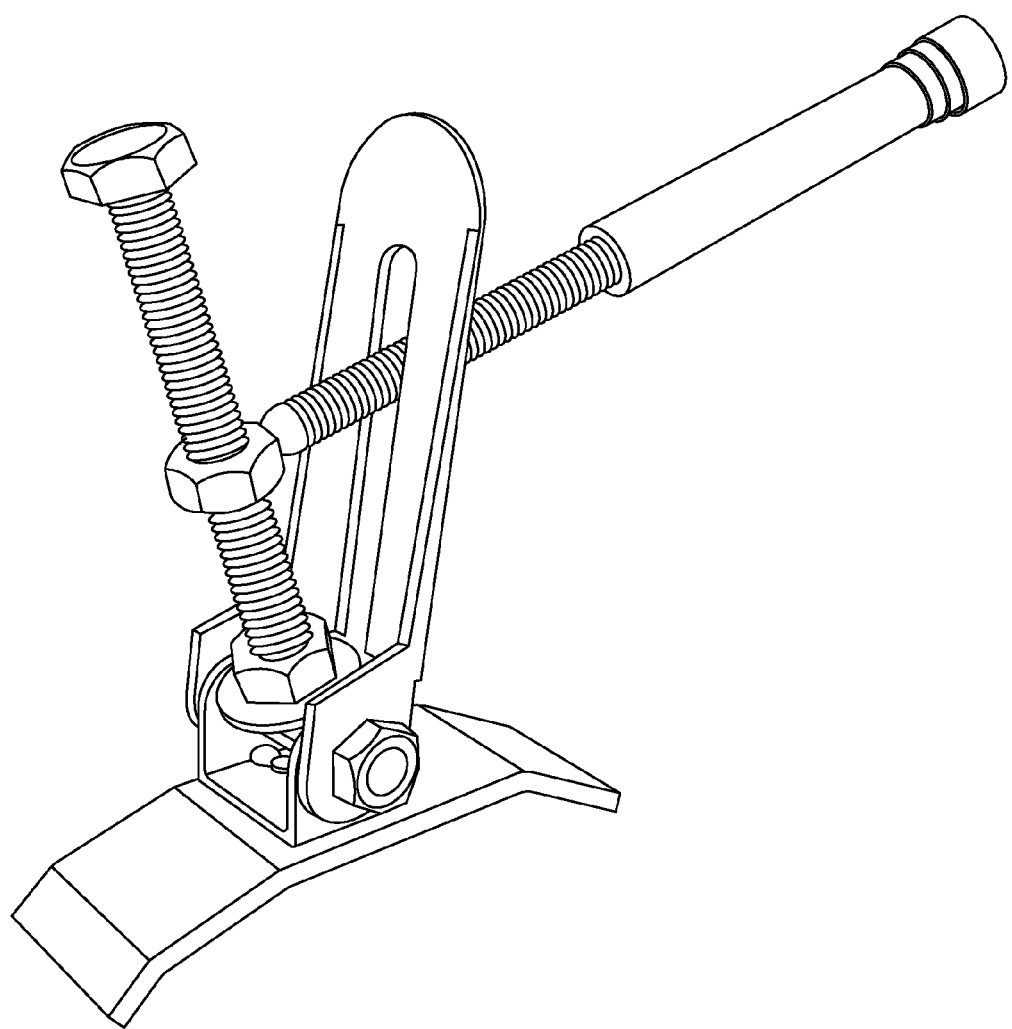

FIG. 46: This figure is representative of the clutch lever along with all constituent parts of it.

Figure 47:
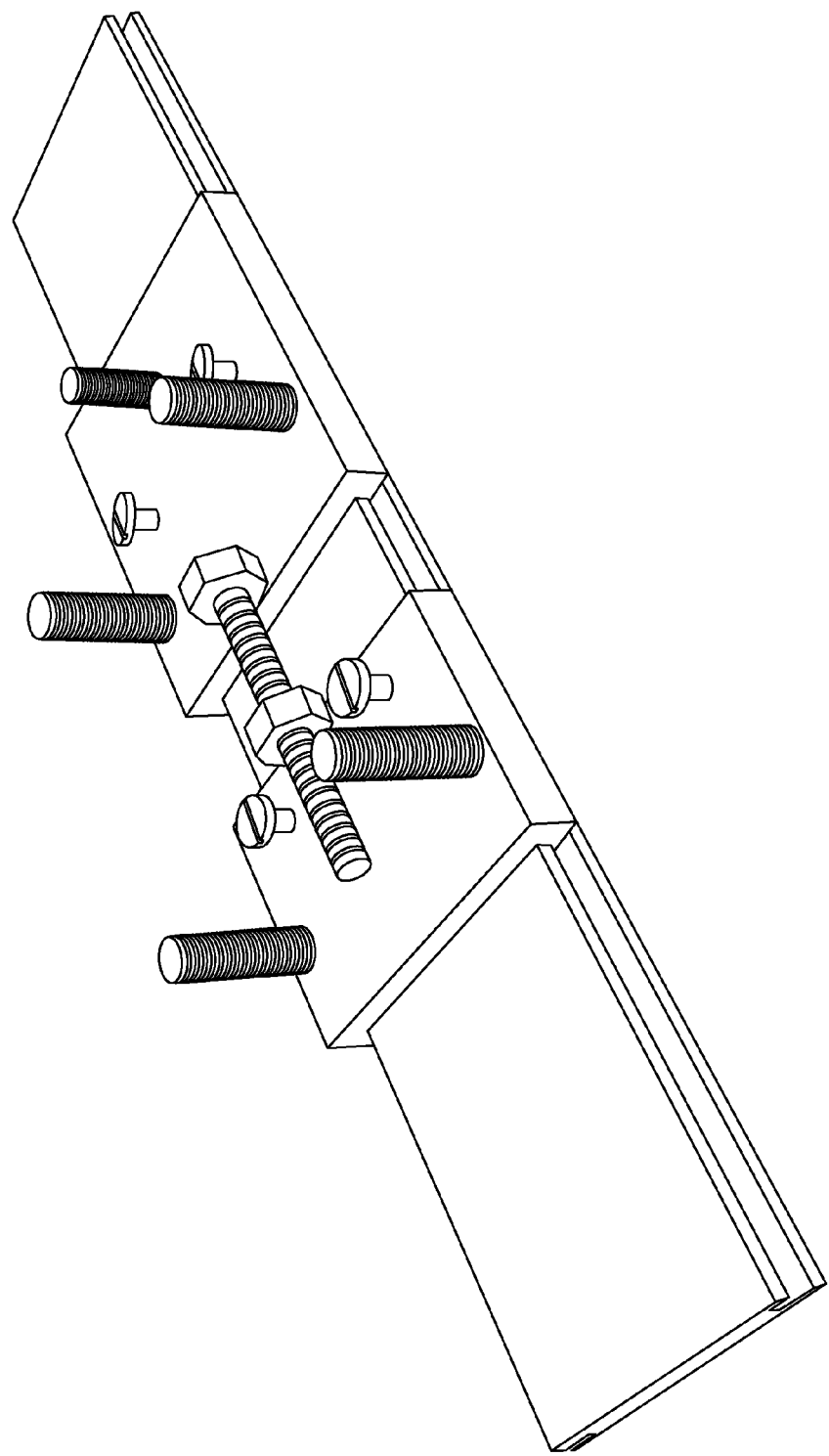

FIG. 47: This figure is representative of the dynamic frame of clutch lever and dynamic frame of shaft that the distance between these two may be adjusted through the bolt existing between these two frames.

Figure 48:
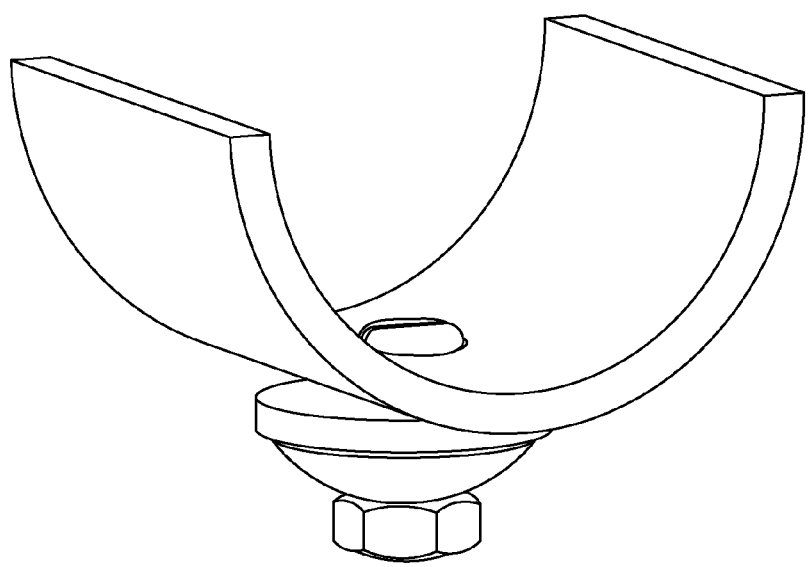

FIG. 48: This figure is representative of a kind of series from the series of bearing levers.

Figure 49:
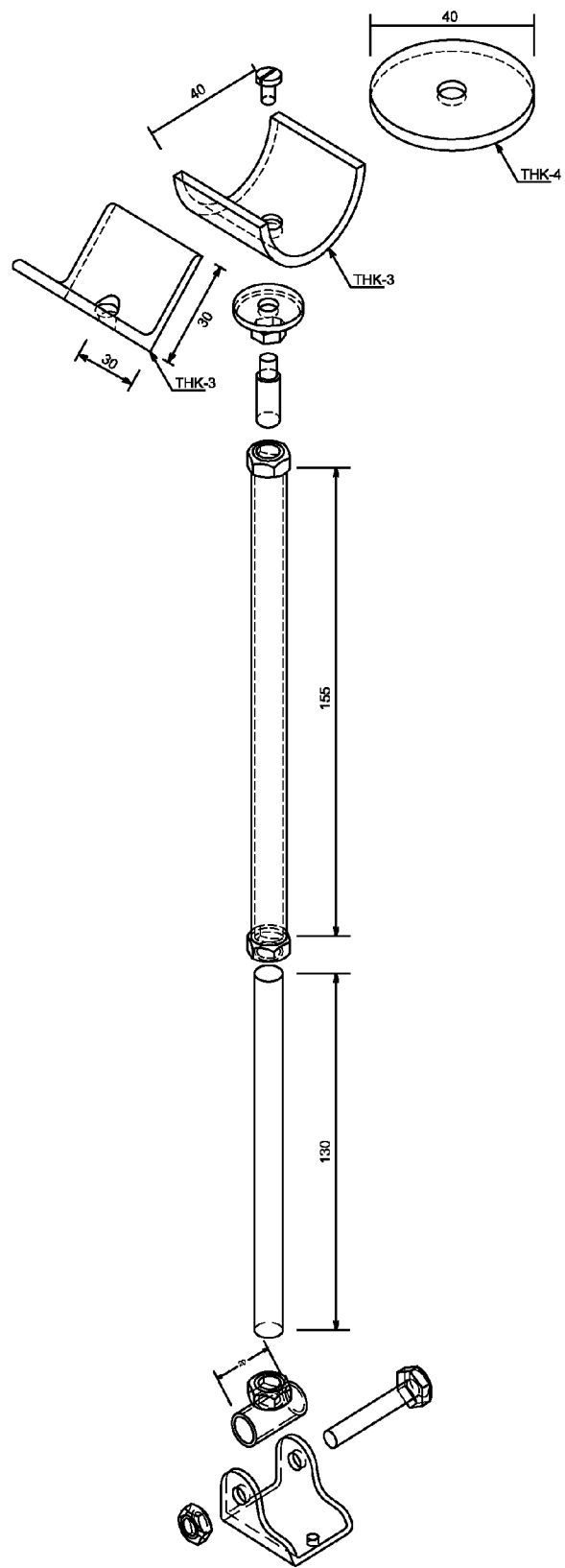

FIG. 49: This figure is representative of Explosive Scale Map of Bearing Lever and all its constituent elements.

Figure 50:
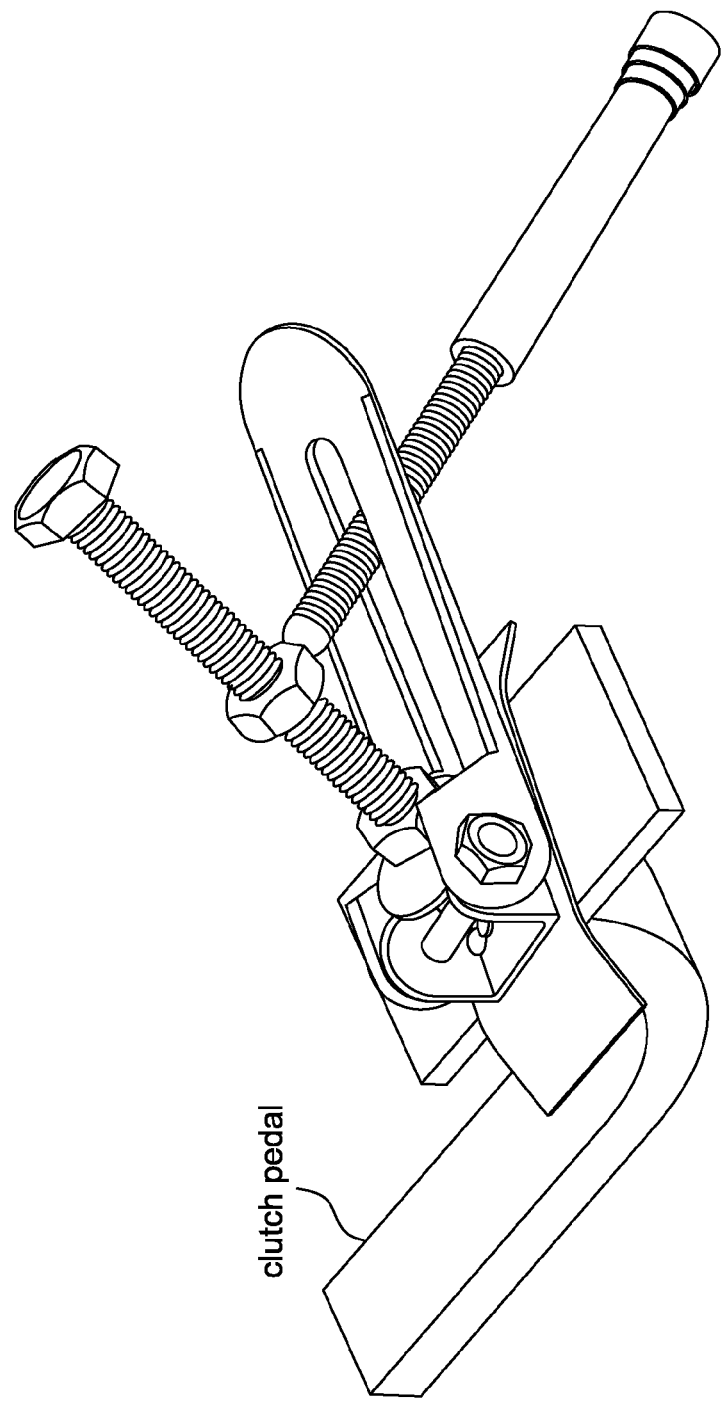

FIG. 50: This figure is representative of an auto clutch apparatus in connection with a clutch pedal of a vehicle.

DETAILED DESCRIPTION OF THE INVENTION

Referring to FIG. 50, the system is placed in the deck of vehicles and over the car mat and connected to clutch and gas pedals such that it connects gas and clutch pedals through levers. This system is fixed in its place through two levers called "fulcrum shafts" such that head of these two levers are placed in a due place avoiding any slide helping to install the system tightly in its due place.

General dimensions of this system:
Length: 22 cm
Width: 4.5 cm
Height: 20 cm (without fulcrum shafts)

Fulcrum shafts may have a length of 17-50 cm. Since these levers function in opening-closing fashion, their length can be modified.

In the flooring section of the main frame of the system positioned over the car mat, some pyramidal cogs are created which are connected to the main frame of the system. Existence of such cogs, which reach 44 pyramidal cogs, is for placing the system over the car mat tightly and to avoid any slid. Dimension of each of these cogs is as follows: 4 mm length, 5 mm width, and 5 mm height that they are placed beside each other with determined distances.

A part of this system is placed beneath the brake pedal and other part of it is set between gas and brake pedals in vertical fashion. The part placed beneath brake pedal is entitled of a height equal to 3.2 cm and when the brake pedal is pressed to the last, the brake pedal will not have any contact with the system (in vehicles the brake system of which is standard, when you press the brake pedal to its last, a minimum space of 4 cm remains beneath the brake pedal).

That part of the system set between brake and gas pedals has a total diameter of 3.5 cm and this enables it to be placed between these two pedals.

Fulcrum shafts are also installed vertically in their due place beside gas and clutch pedals without having any contact with them such that their head is located under the console of steering wheel such that one of the fulcrum shafts is set beside the clutch pedal and another lever is placed beside the pedal gas.

Functioning of this system is such that the pedal gas is always kept in a lower position than its regular status such that pressing the gas pedal, head of the clutch lever, which keeps the clutch in a lower position, raises and this action brings the clutch up and it is engaged with the gearbox of the vehicle such that giving a little pressure to the gas pedal, clutch or gearbox is engaged and car moves softly. Lowness of the clutch pedal from the car deck is adjustable through this system. In different vehicles, clutch pedal is engaged with gearbox in different distances from the floor. Taking this into account, this system is designed such that you can adjust the clutch pedal in different distances from the floor. For instance, in some vehicles, you need to release clutch pedal 3 cm in order to engage the gearbox and in some others this rate varies from 5 to 7 cm.

This system is completely separated from engine and gearbox of car and it is connected to the other pedals of the vehicle and you may easily install it in your car in a shortest time (less than 5 minutes) without the need for a mechanic or any other expert in this field. With the installation of the levers existing in this system to gas and clutch pedals and tightening it through fulcrum shafts, the system will be ready to be used.

This system is completely separated from engine and gearbox of car and it functions separately. For this reason it is entitled with many advantages. This system is mostly useful in high traffic streets since it eliminates clutch in your car and you will never use clutch pedal while driving. With this system, you will only use brake and gas pedals and gear while you are driving such that your left foot will be no longer needed. So it will be useful for those who are suffering from foot pain or backache and even for the sake of amputees who have only one foot.

Figure 1:
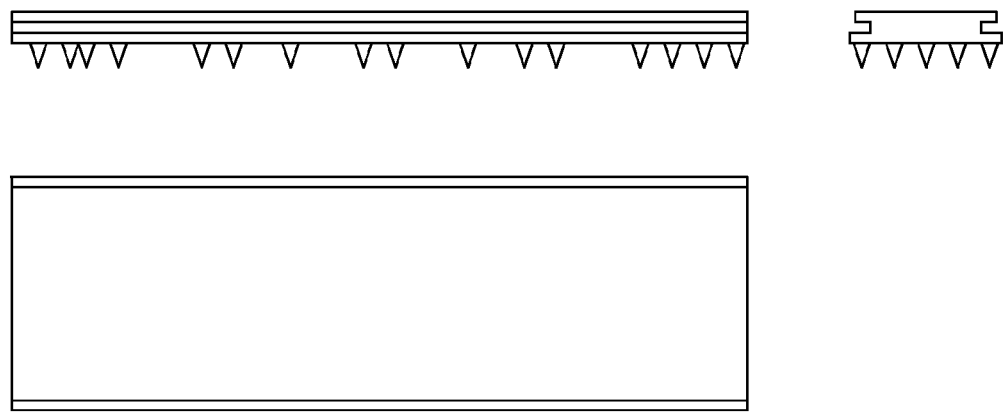
FIG. 1: This figure is representative of Main Frame of the system and represents width, length, and height in the main frame of the system.
Figure 1A:
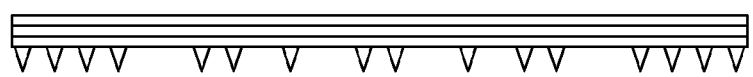
Figure 1B:
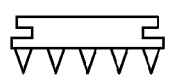
Figure 1C:
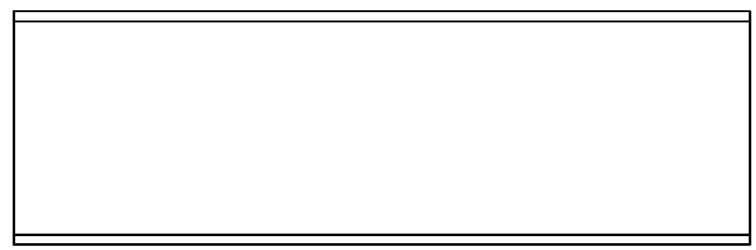

Auto-Clutch System is composed of 8 general sections as follows:
Main rail frame of the system and dynamic frames
Fulcrum shafts and their constituent parts
Clutch pedal and its constituent parts
Double cogwheels (gears) and their connection with clutch lever
Parallel columns
Triplicate cogwheels (gears) and their connection style with double or binary cogwheels
Shaft and spring and their connection with single chain
Gas pedal tweezers
Best Mode
Main frame of the system and its structure:

As shown in FIG. 1, main rail frame of the system composes a big part of this system that is generally the base and support of entire parts existing in this system.

This frame is made of iron and has an approximate weight of 400 g solely. Length of this frame is equal to 22 cm and its width is 4.5 cm.

Diameter of this frame is just 6 mm. In the flooring section of this frame, there are teeth connected to the frame which teeth are made in pyramidal form and dimensions of each of them is 4 mm for length, 4 mm for width and 5 mm for height.

Cogs or teeth existing underneath this frame enable us to avoid any slide under the effect of strikes imposed on the system when the main frame, which is the supporter of the entire parts existing within the system, is pressed by the fulcrum shafts set beneath car's pedals and over the car mat.

Figure 2:
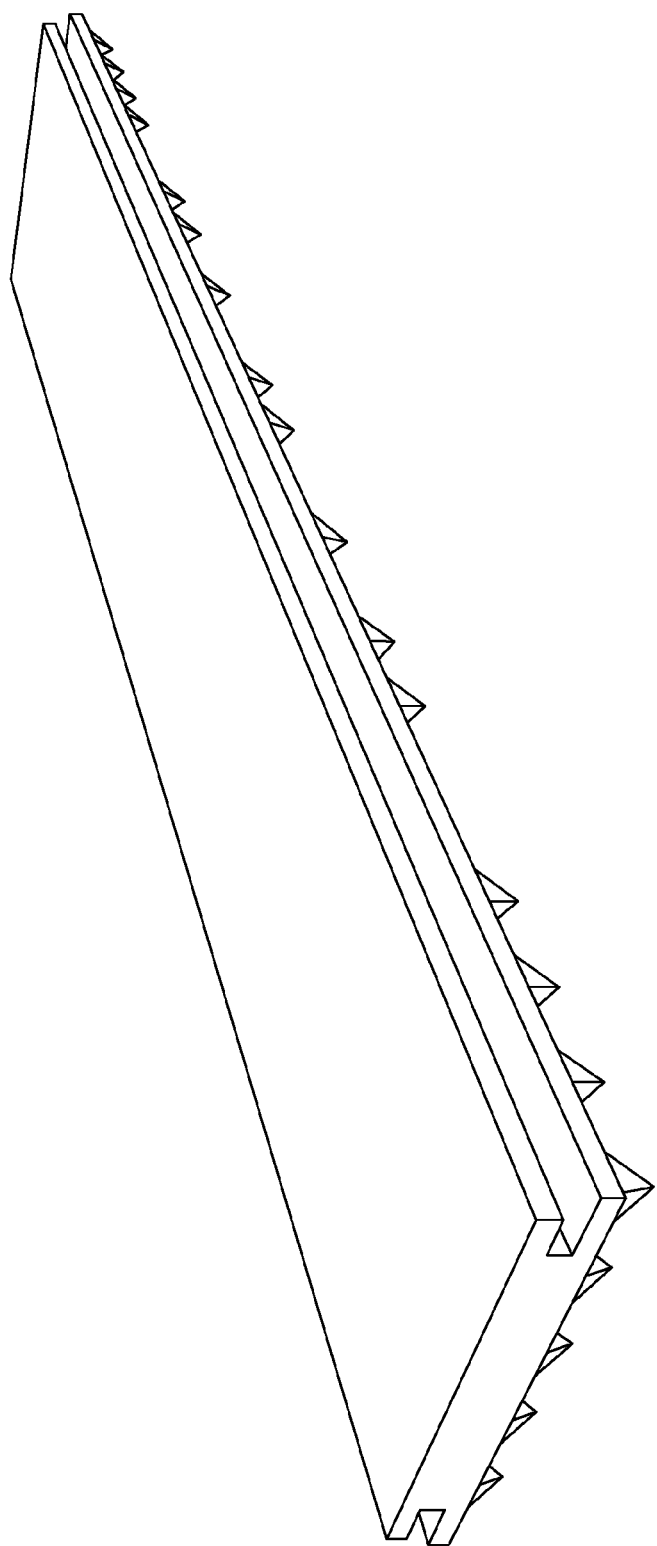
FIG. 2: This figure is representative of 3D Map of the System's Main Frame.
Figure 3:
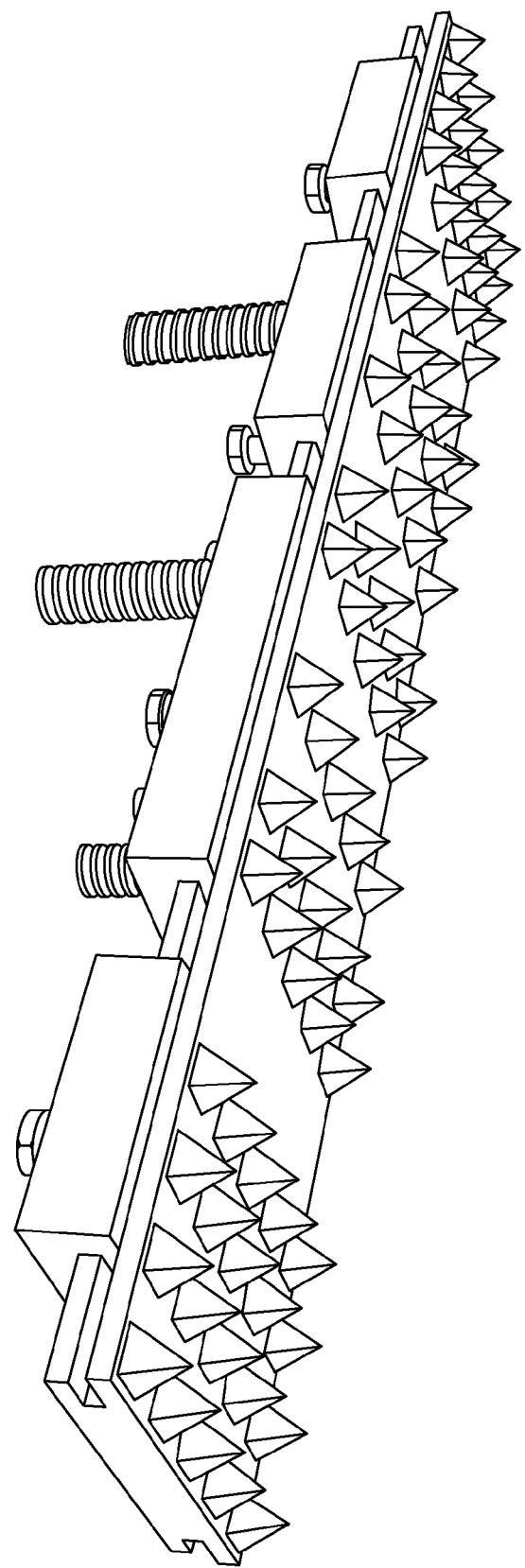
FIG. 3: This figure is representative of 3D Map of the System's Main Frame showing installation of dynamic frames over system's mainframe as well as arrangement of cogs in the flooring of System's Main Frame in 3D fashion.
Figure 4:
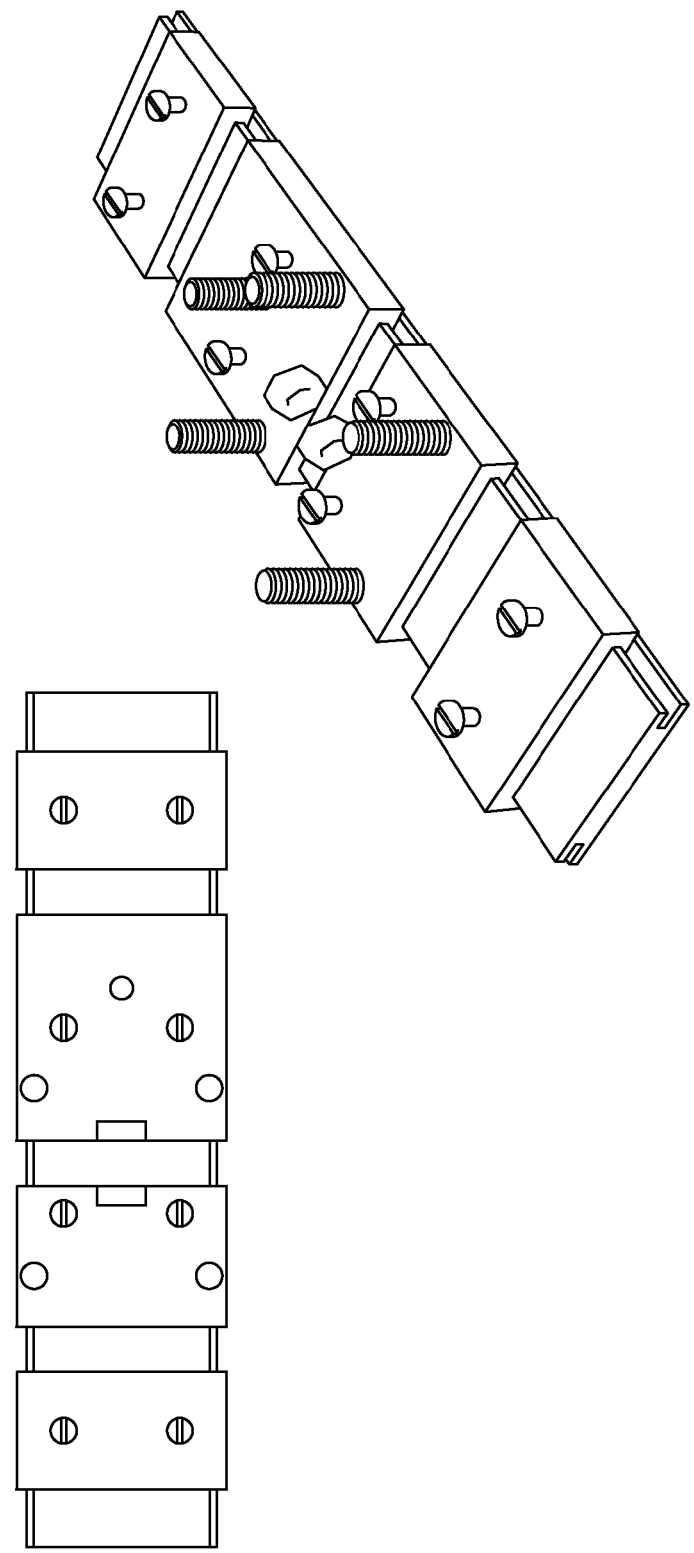
FIG. 4: This figure is representative of dynamic frames showing placement order of dynamic frames over System's Main Frame.
Figure 4A:
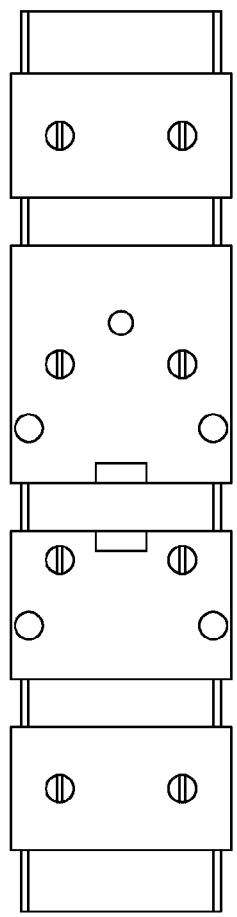
Figure 4B:
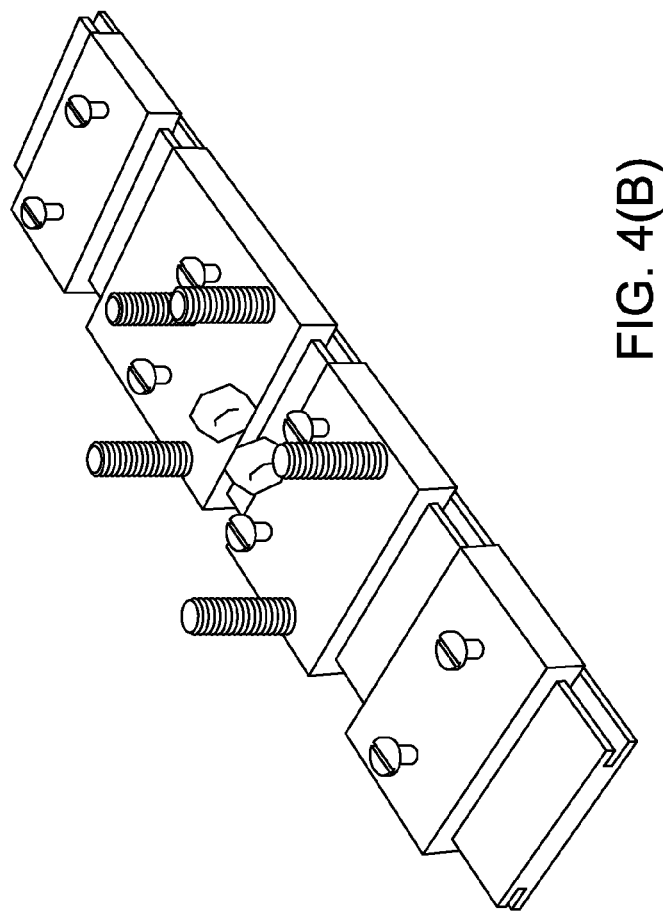

These teeth are connected to the floor of the rail frame of the system and their quantity reaches 44 pyramidal cogs all of which are made by milling turner machine with determinative spaces (CNC). Distance between each of these cogs is 4 mm that the settlement style of these cogs beneath the rail frame is represented in the FIG. 2.

There are two furrows in both longitudinal sides of the rail frame, which furrows are equal with the length of the frame through which furrows, frames called "Dynamic Frames" are placed in the system, which can move over the main frame of the system in rail fashion. Over each of these dynamic frames, depending on the function of each of them, different parts are installed that we will describe them in every section.

Main frame of the system and dynamic frames are tantamount to train and rail that the physical form of the main frame of the system and pyramidal cogs connected to the flooring of the system.

Dynamic Frames:
  Quantity of these frames in this system is 4 as follows:
    1—Dynamic Frame of Fulcrum shaft (2 frames with similar shape and size)
    2—Dynamic Frame of Clutch Lever and Binary Cogwheels
    3—Dynamic frame of Shaft and Spring and Parallel Columns
(Function of each of these dynamic frames will be described in separate sections)

Dynamic frames have a diameter of 4 mm and width of 5 cm. Frame of the fulcrum shafts has a length equal to 30 mm, length of the frame of clutch levers is equal to 36 mm, and length of shaft's frame and spring piston is 58 mm.

These frames are made of steel. Fringes are installed beneath these frames in both longitudinal sides that with the placement of these fringes in the existing furrows in both sides of the main frame of the system, we may put the existing frames over the frame of the main rail frame of the system and to move it and to adjust distance of these frames with each other. Dynamic frames are placed over the main frame of the system with the following order respectively from the right side:
  1) Dynamic frame of the first fulcrum shaft;
  2) Dynamic frame of shaft and spring piston;
  3) Dynamic frame of the clutch lever; and
  4) Dynamic frame of the second fulcrum shaft.

Figure 5:
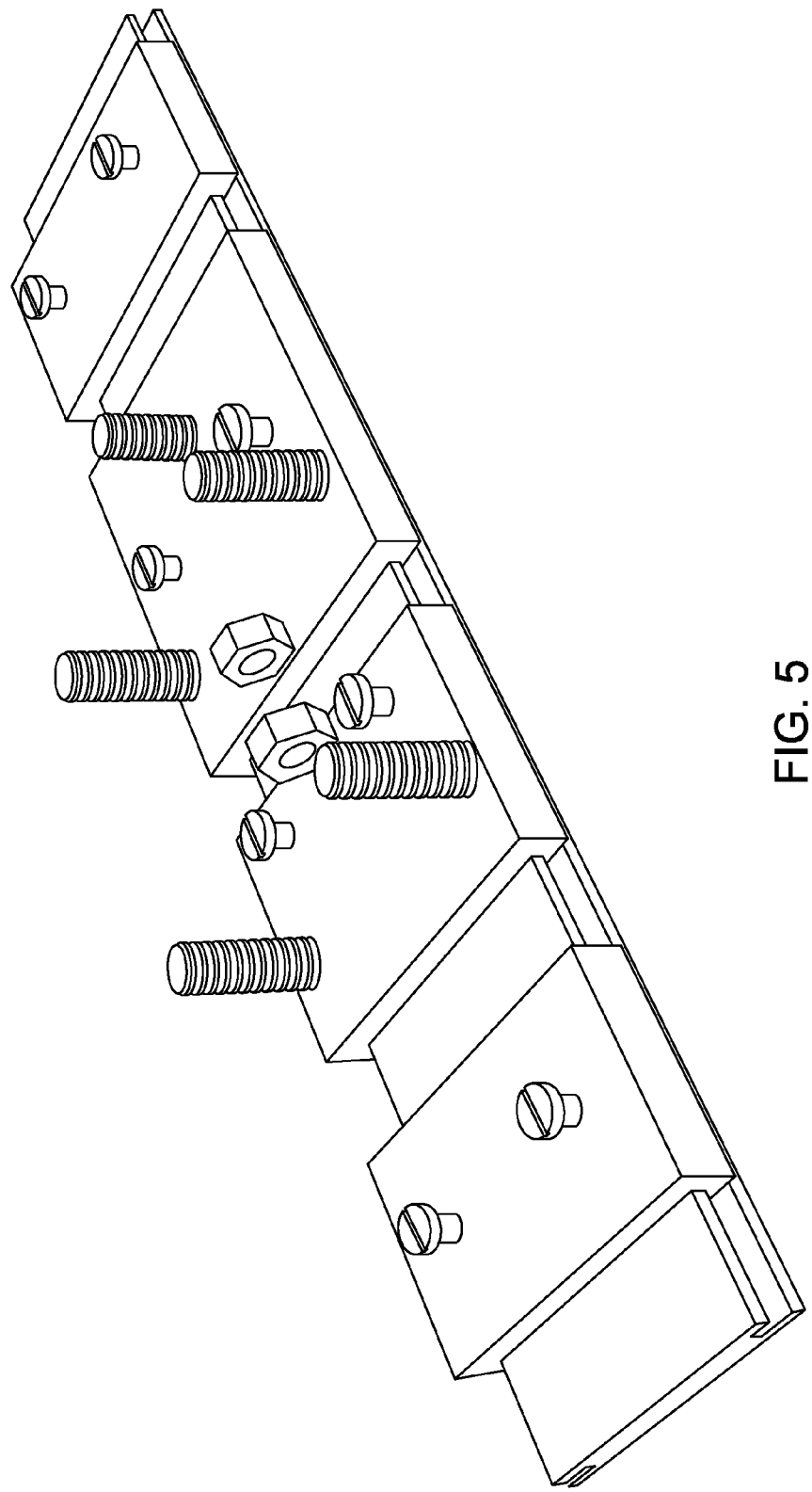
FIG. 5: This figure is representative of 3D Map of Dynamic Frames and their installation over System's Main Frame.
Figure 6:
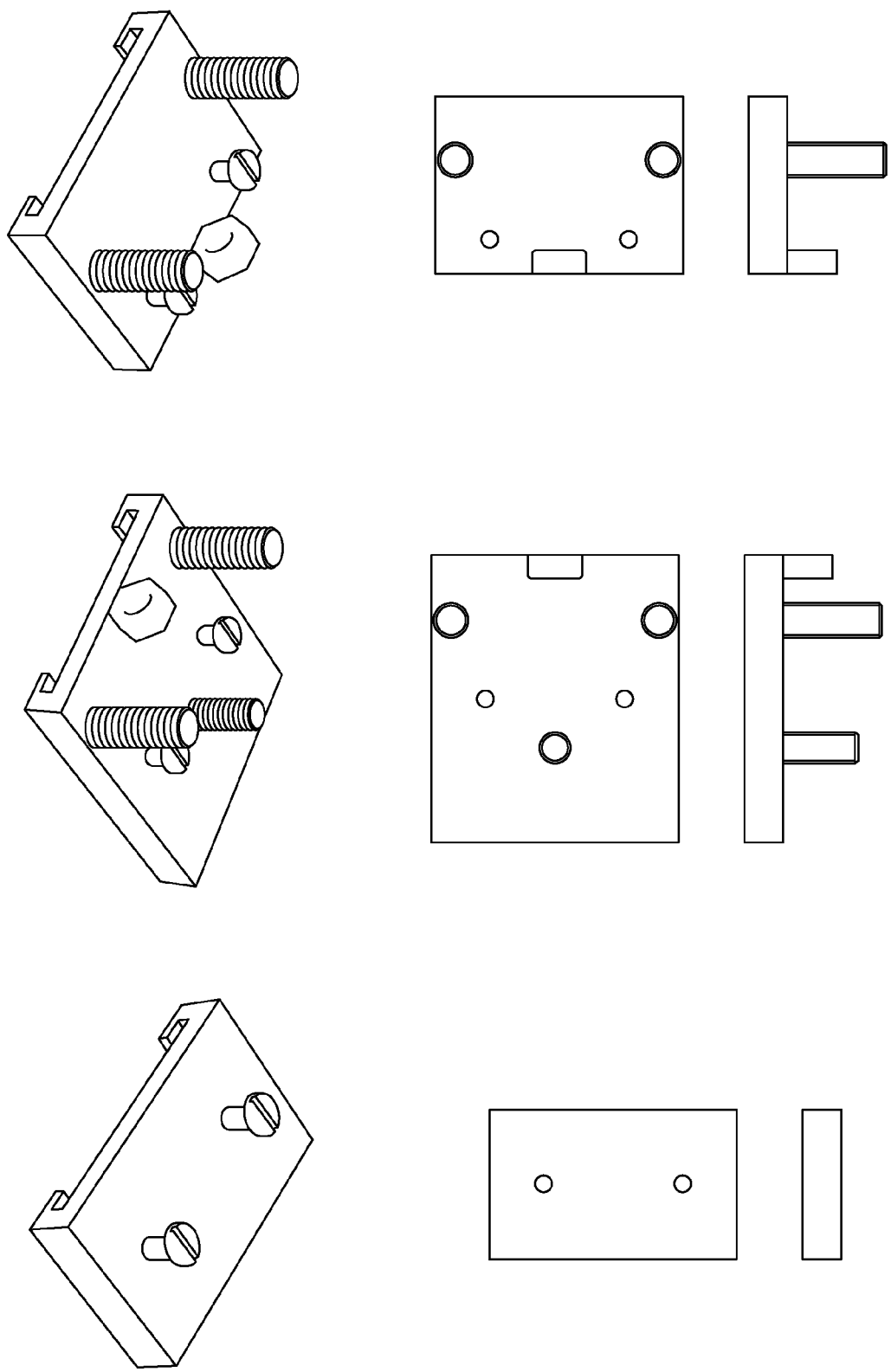
FIG. 6: This figure is representative of dynamic frames including respectively from the top: 1—Dynamic Frame; 2—Clutch Lever; Dynamic Frame of the Shaft and Parallel Columns; 3—Dynamic Frame of Bearing Levers; of course, dynamic frames of bearing levers are of same shape and size.
Figure 6A:
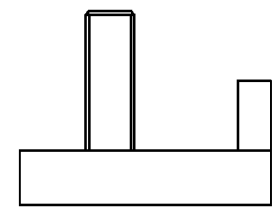
Figure 6A:
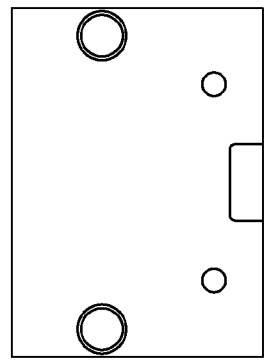
Figure 6A:
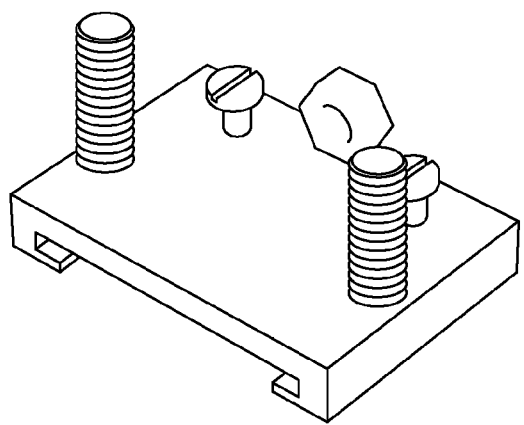

As shown in FIG. 5, the disposition style of these frames over the main frame is illustrated.

Fulcrum Shafts and Constituent Parts:
Fulcrum Shaft and Constituent Parts of it:
  Followings are constituent parts of fulcrum shafts:
    1—Fixed lever and dynamic lever
    2—Heads of dynamic lever
    3—Bracket holding fixed lever
1—Fixed and Dynamic Lever:
  Lever mentioned previously are called "Fulcrum shafts" that function in open and close fashion. Both of them are designed similarly composed of 1 empty pipe with the length of 155 mm and diameter of 1 cm that the internal diameter of these pipes is equal to 8 mm. These pipes Articles of Association made of steel that in both of them, head of these pipes is connected to a nut no. 8 composing the dynamic lever in general.

Inside the dynamic lever the internal radius of which is 8 mm there is a helical wire with the diameter of 8 mm and length of 21 cm composing fixed lever of the system and can compose a helical closing-opening lever in general through the nut connected to the bottom of the dynamic lever. Bottom of the fixed lever is connected to the system and its head is placed inside the empty pipe (dynamic lever) surrounding the bolt is dynamic and it can move up or down.

Figure 7:
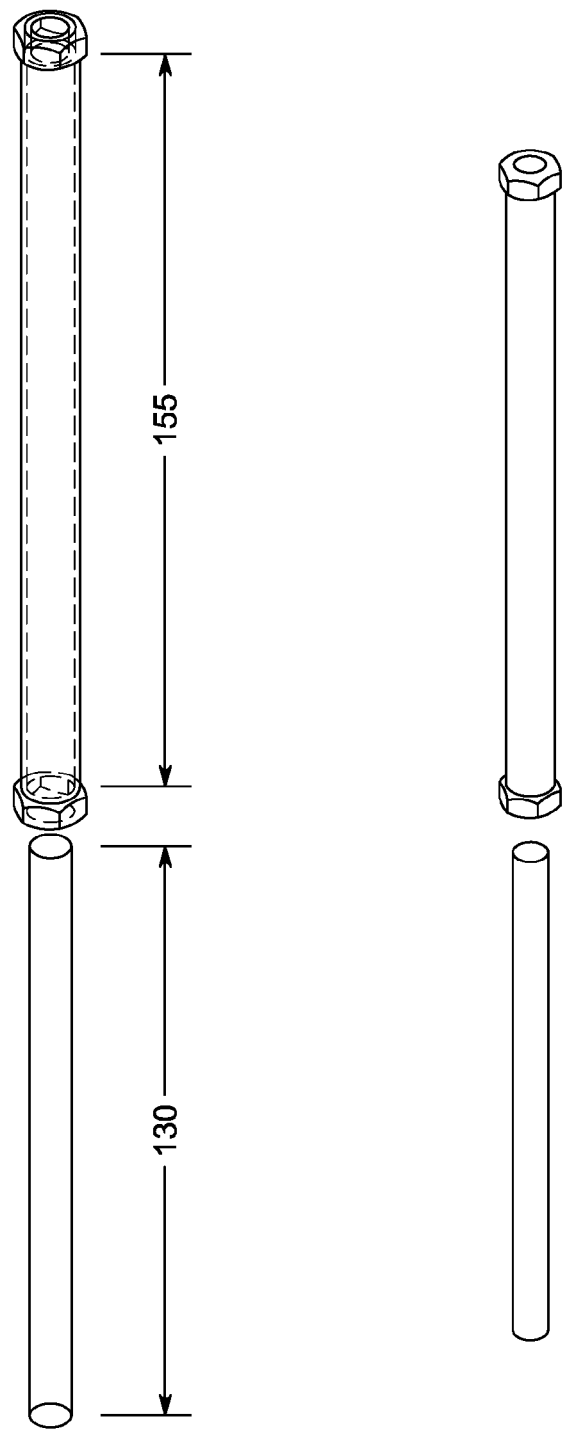
FIG. 7: This figure is representative of Fixed Clutch Lever and Dynamic Lever in the Bearing Levers.
Figure 7A:
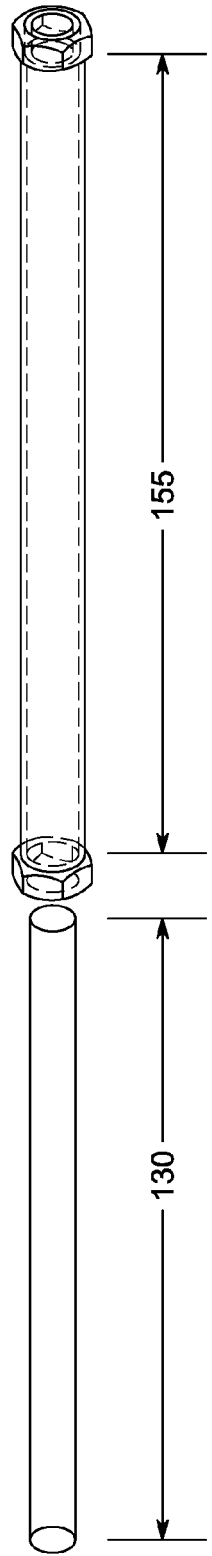
Figure 7B:
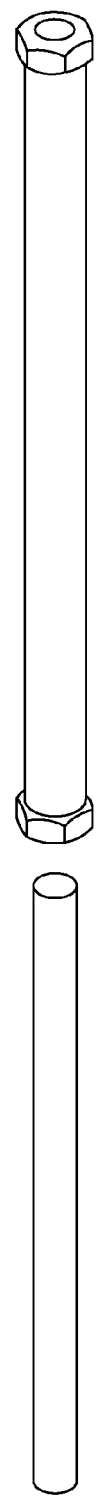

As shown in FIG. 7, the general form and design of the fixed and dynamic lever is illustrated.

2—Heads of Fulcrum Shafts and their Connection Style:
In the former section, we mentioned that two no. 8 nuts are connected to the both heads of empty pipes that fixed lever is located in one of them composing a helical opening-closing lever. But in the other head of the dynamic lever to which one no. 8 nut is welded a "Rotating Washer Nut" is connected This nut in this system is designed such that simultaneously, nut and washer can rotate while connected to each other.

Figure 8:
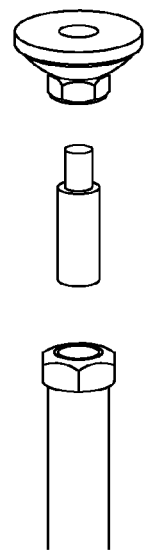
FIG. 8: This figure is representative of the Nut of Rotating Gasket. Nut of Rotating Gasket is connected to the Reciprocal Bolt through dynamic lever.
Figure 8A:
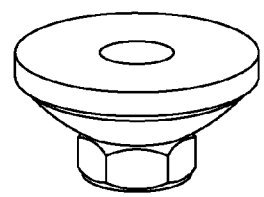
Figure 8B:
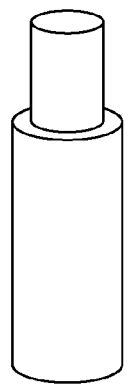
Figure 8C:
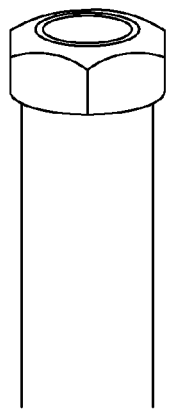

As shown in FIG. 8, nut of rotating washer is connected to the head of the dynamic lever by a reciprocal bolt. By reciprocal bolt in this system, we mean the bolt that one head of it is 8 mm and the other head is 6 mm. The 6 mm head of this bolt is connected to the rotating washer and the 8 mm head is connected to the nut in the head of dynamic lever connecting nut of the rotating washer to the nut of the dynamic lever.

Figure 9:
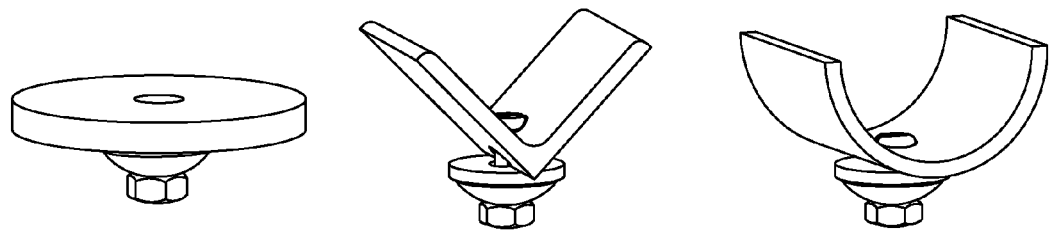
FIG. 9: This figure is representative of series of bearing levers. These series are designed in three flat, semicircles, and angled forms and are connected to the nut of rotating lever.
Figure 9A:
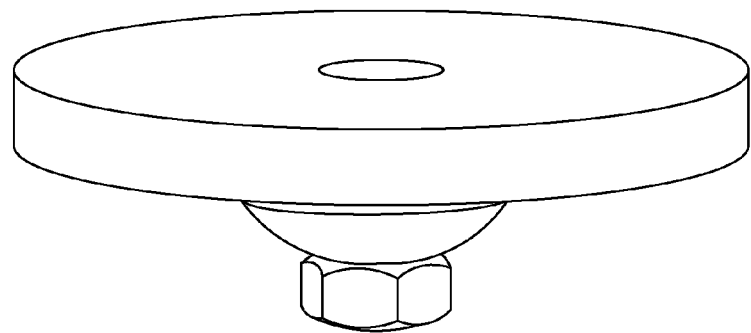
Figure 9B:
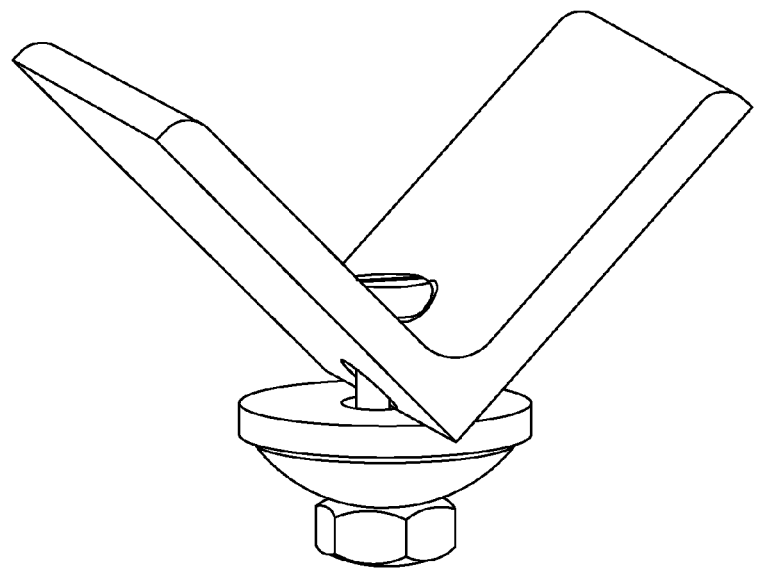
Figure 9C:
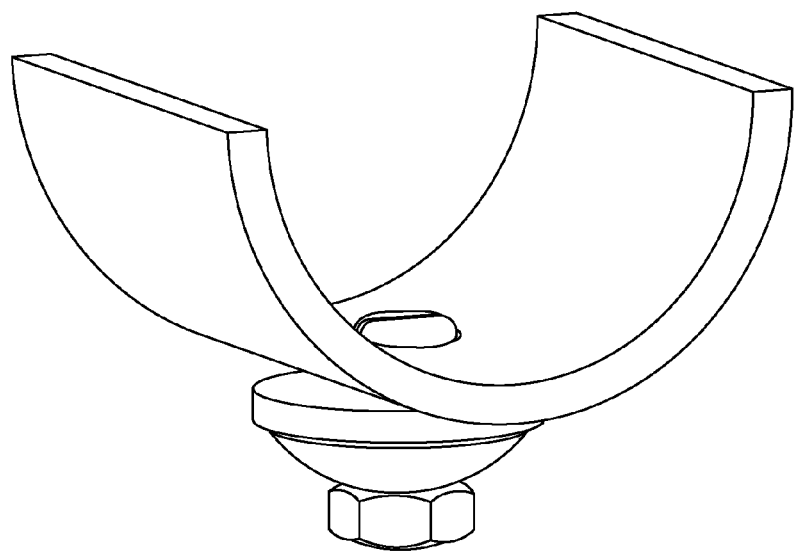

But heads are installed over the washer existing on the rotating washer, which are called "Heads of Fulcrum shafts". These heads are designed in three forms as follows:
  1—Flat
  2—Semicircle
  3—Angled As shown in FIG. 9, the physical form of these heads and connection style of nut of the rotating washer.

These heads or caps, which are connected to the rotating washer nut with the help of bolt no. 5, can be replaced if so required.

Over these series and in their external section, i.e. in the placement section of heads or caps underneath console of the steering wheel, there is a sticking rubber part with the diameter of 2 mm. This sticking rubber enables the fulcrum shafts to avoid any slide when fulcrum shafts are put beneath the console of the steering wheel.

Figure 10:
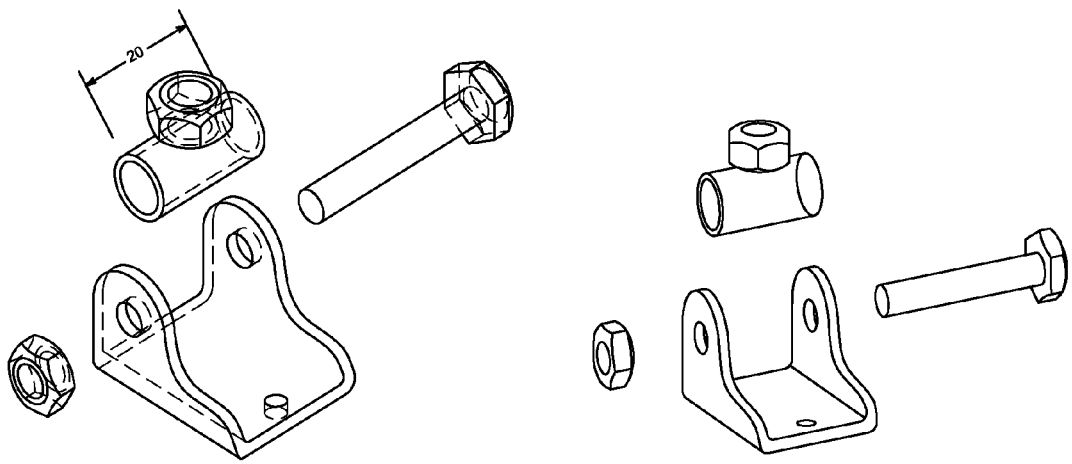
FIG. 10: This figure is representative of the base of bearing lever. Bearing lever is installed over the base of bearing lever. Bearing levers are installed over this base and they can be connected to the dynamic frame of bearing levers through this base and assume a rotating quality.
Figure 10A:
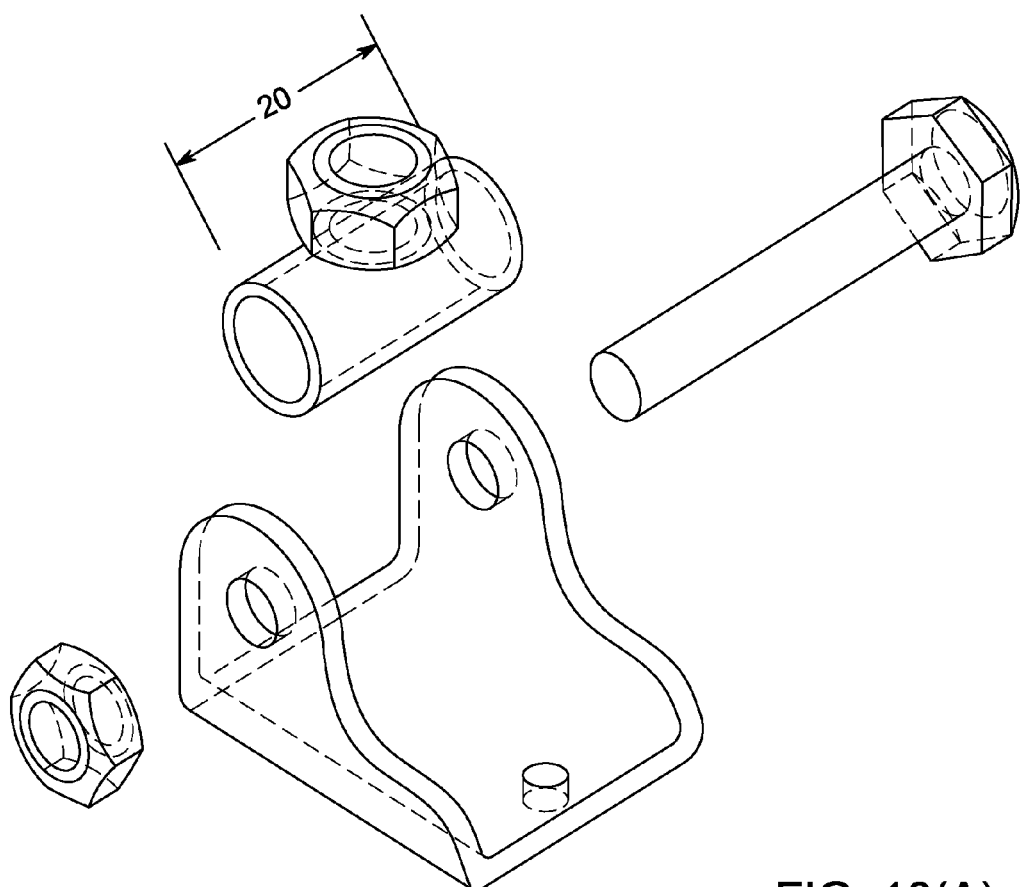
Figure 10B:
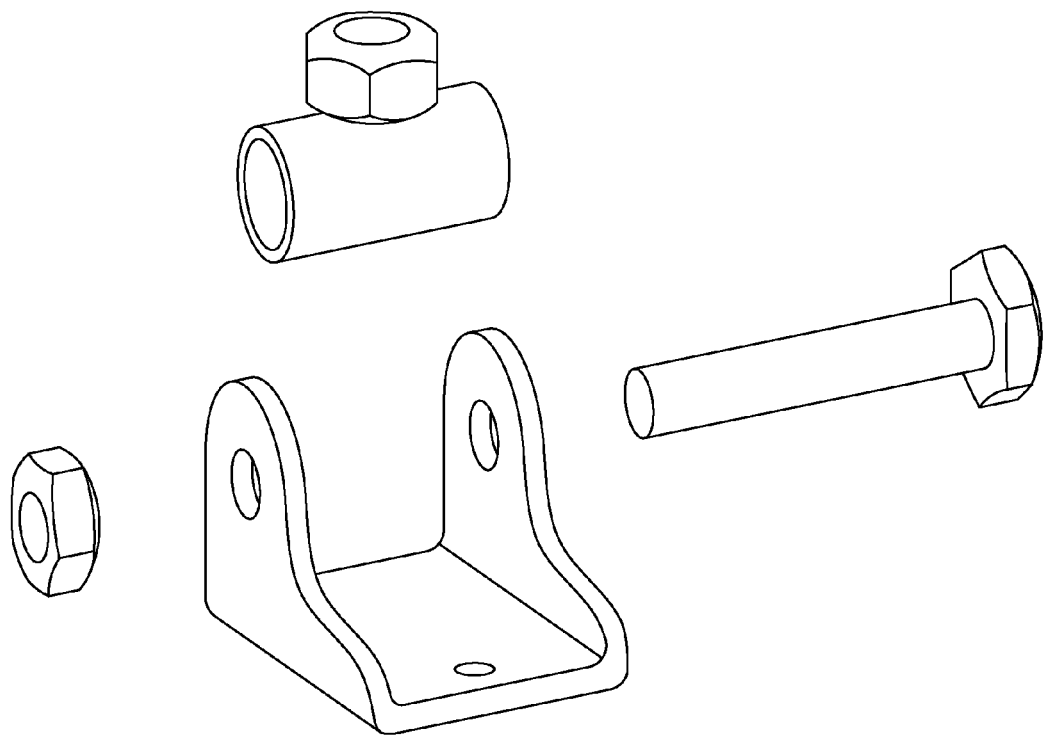
Figure 11:
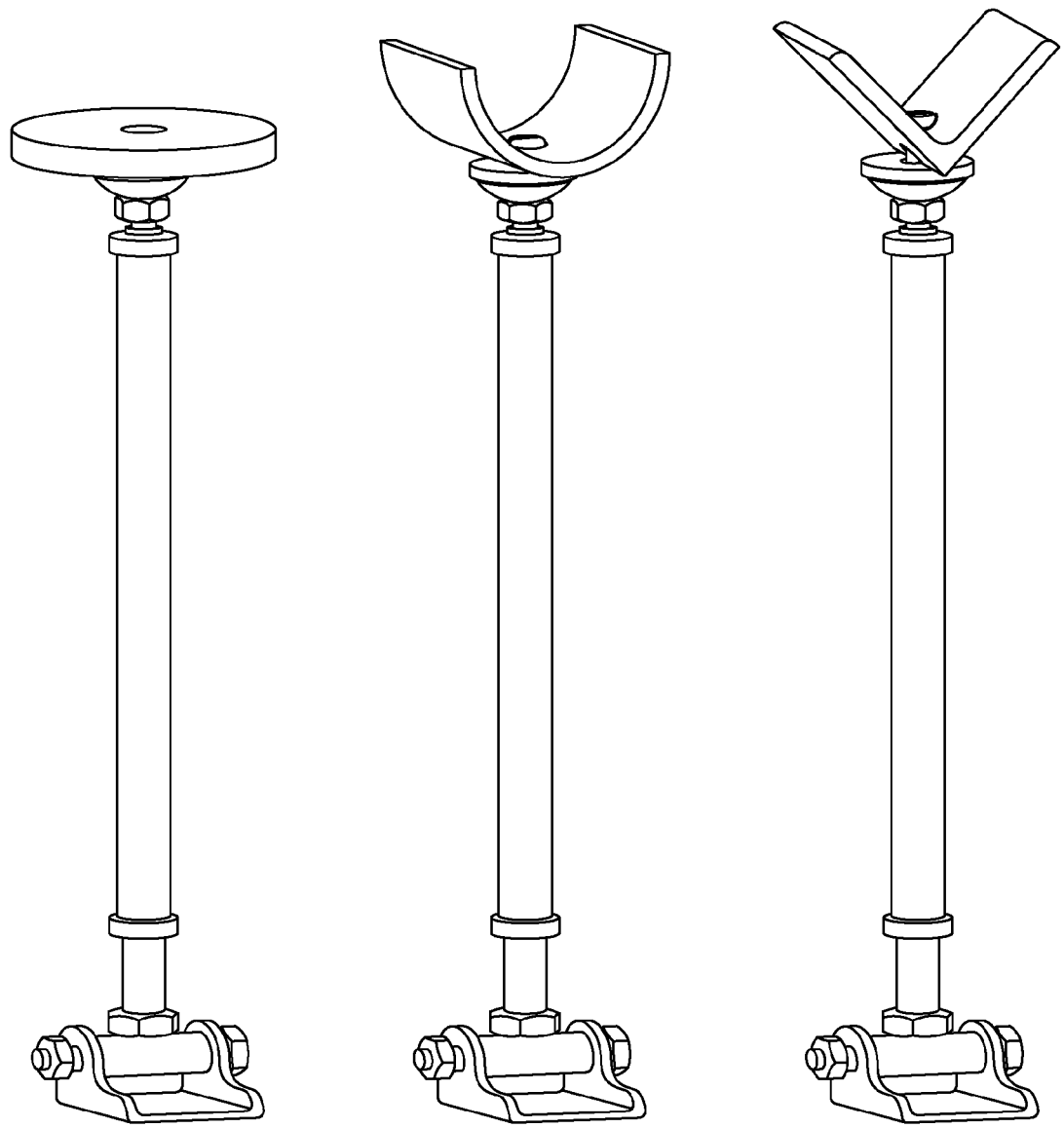
FIG. 11: This figure is representative of bearing levers along with different series and support bases.
Figure 11A:
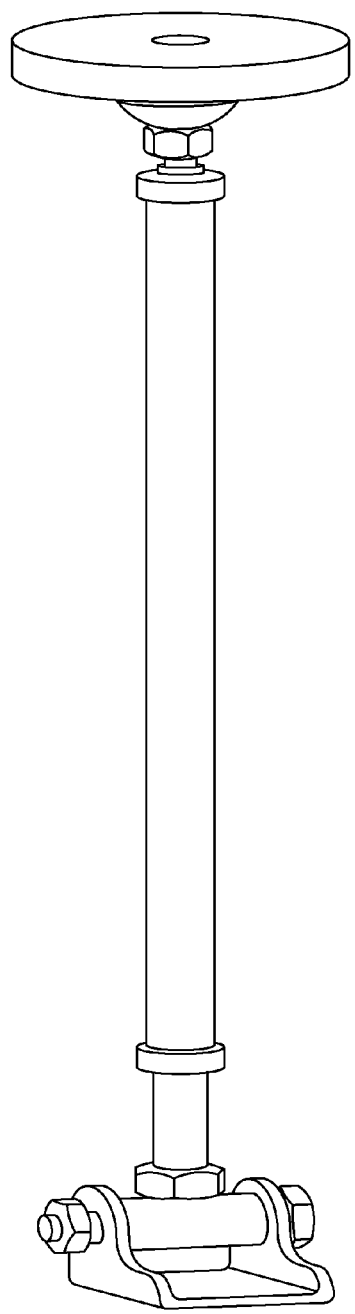
Figure 11B:
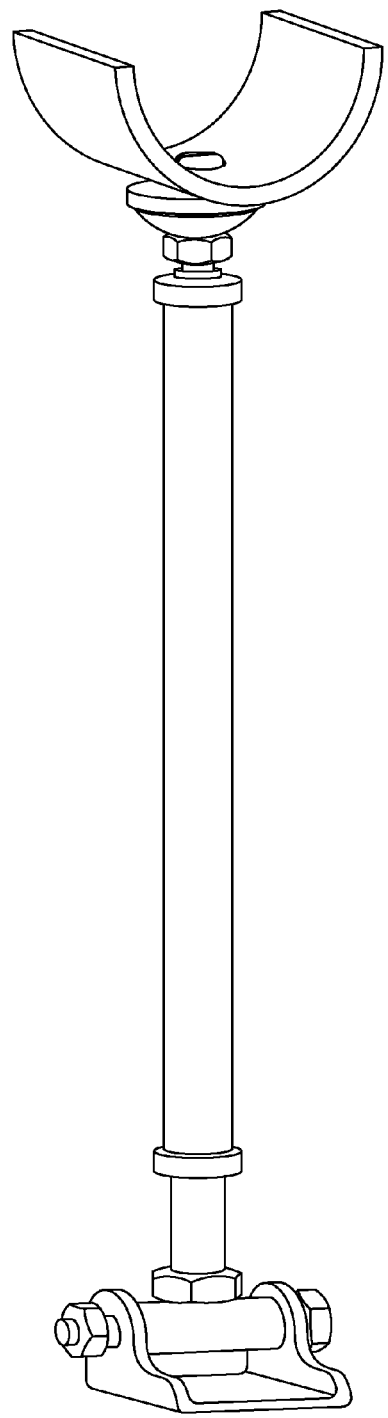
Figure 11C:
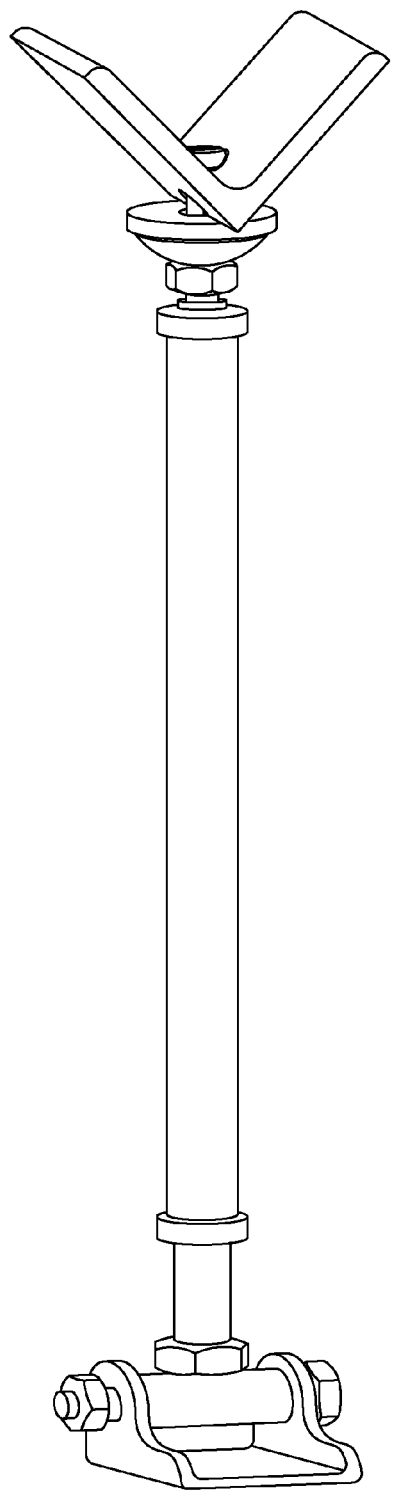
Figure 12:
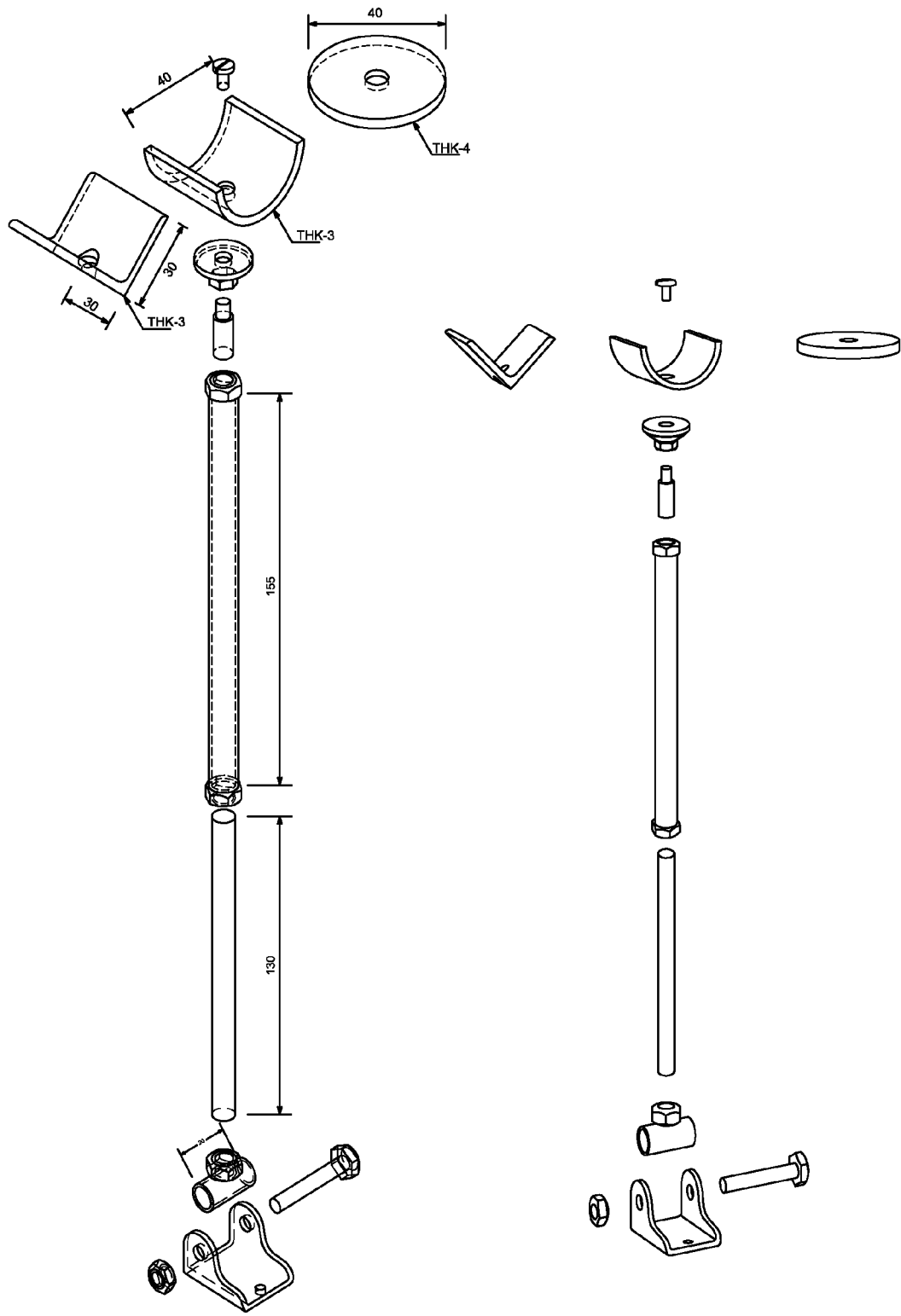
FIG. 12: This figure is representative of the explosive map of bearing levers along with the scales used. In this map, you can see all details used in the bearing lever.
Figure 12A:
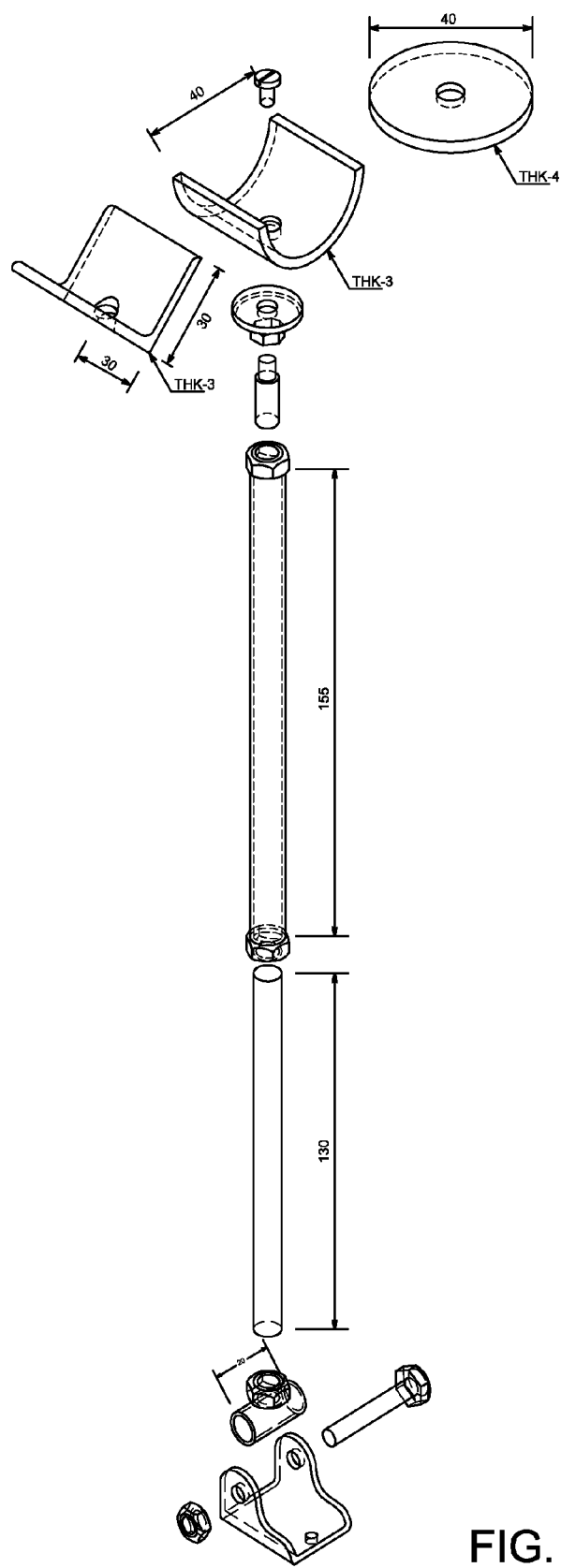
Figure 12B:
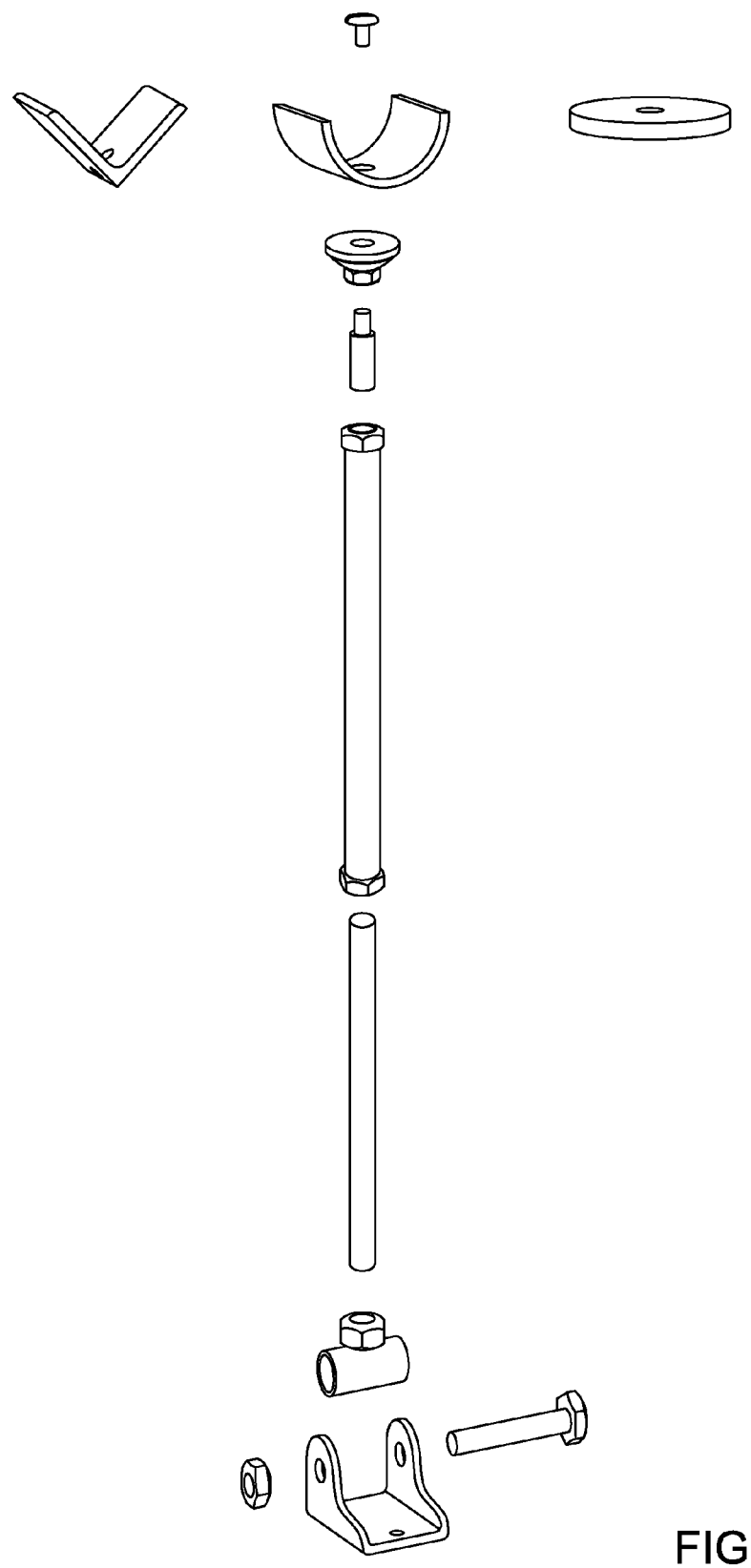
Figure 13:
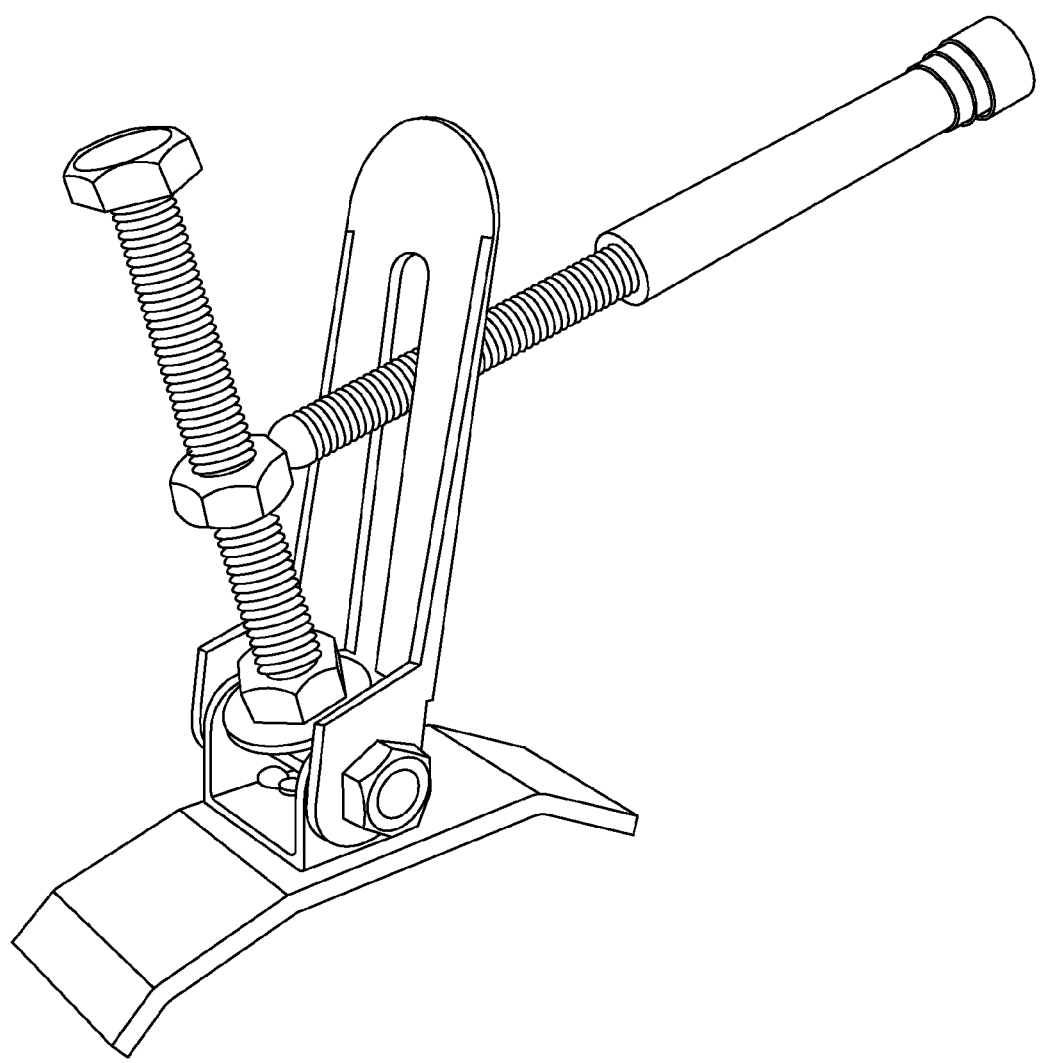
FIG. 13: This figure is representative of the clutch lever composed of:
(1) Fixed Lever
(2) Dynamic Lever
(3) Nippers of Lever
(4) Frame of the Lever's Nipper

Base of Fulcrum Shafts:
As shown in FIG. 10, fulcrum shafts are installed over the frame of the system such that first the fixed lever is installed in the fulcrum shaft over a metal base such that a wire (no. 6) is placed inside two holes of this base and then one no. 1 pipe is put around this wire over the frame of which pipe, one no. 8 pin is attached.

Fixed lever, which is a helical lever no. 8, is placed inside this pin and, finally, fulcrum shaft is placed over its supporter base.

The action of placing lever over this base makes this lever able to be placed in optional angles. Finally, fulcrum shaft can be placed tightly over the base by the bolt existing in the base wire avoiding any angle change.

This base may have a rotating position and it can have different angles in different positions such that it can rotate the fulcrum shaft both around the horizontal and vertical axles simultaneously.

The reason for rotation of lever around two axles simultaneous is that besides rotation of the lever over the base the base rotates itself and the holder base, which is connected to the dynamic frame through bolt no. 4, may rotate over the dynamic frame and set in different angles. Doing so, fulcrum shaft may be settled in 4 different angles and directions.

Method of Fixing Fulcrum Shaft

After specifying angle of the lever, we can keep the lever fixed and avoid any angle change with the help of the helical wire in the lever's base. Doing so, fulcrum shaft is put over its base and can be tightened.

Base of the fulcrum shaft is also tightened over its dynamic frame, which is made of steel, after adjusting the best angle for the lever making use of bolt no. 4, and the body or frame itself can be settled over the main frame of the system and be fastened by bolt no. 4 over the rail frame of the system.

This bolt is placed over the moving frame such that fastening this bolt, head of the bolt touches the main frame of the system and preserves the dynamic frame over the main frame of the system and avoids movement of the dynamic frame over the main frame of the system.

Clutch Lever and Description of its Structure and Functioning:

Clutch Lever is Composed of 4 General Sections as Follows:
Fixed Lever
Dynamic Lever
Tweezers of Clutch Lever; and
Frame of clutch lever Fixed Lever:

This lever is composed of one empty pipe with a different structure such that 1.5 cm of the bottom of this pipe has a diameter of 14 mm and diameter of the remainder section (7 cm) us 11 mm (This pipe is mad by turner system).

Existence of this structure is because of the fact that a hole (10) is tapped in the ending section of this pipe with the length of 1.5 cm and another hole (8) is created in the other head of the pipe continuing until the end of the pipe.

Length of this lever is equal to 8.5 cm and it is presented along with the system of two other levers with the scales of −6.5 and 10.5 cm that depending on the distance between clutch and brake levers in different cars, a suitable and corresponding lever will be used.

Figure 14:
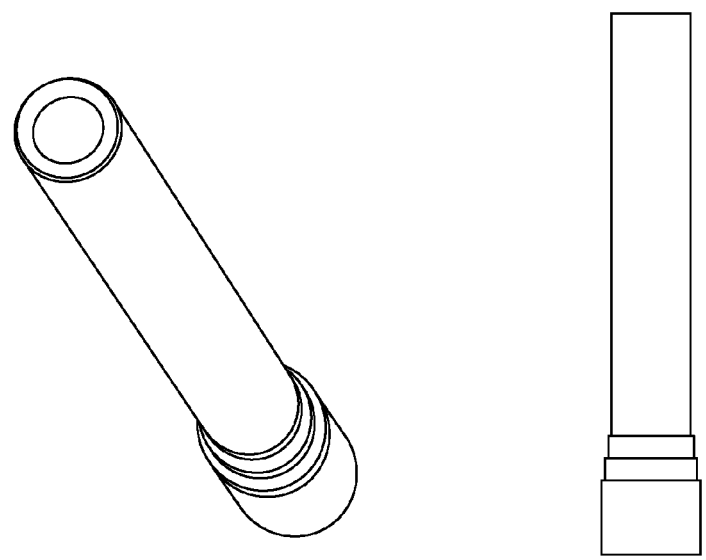
FIG. 14: This figure is representative of the map of fixed lever in the clutch lever.
Figures 14A, 14B:
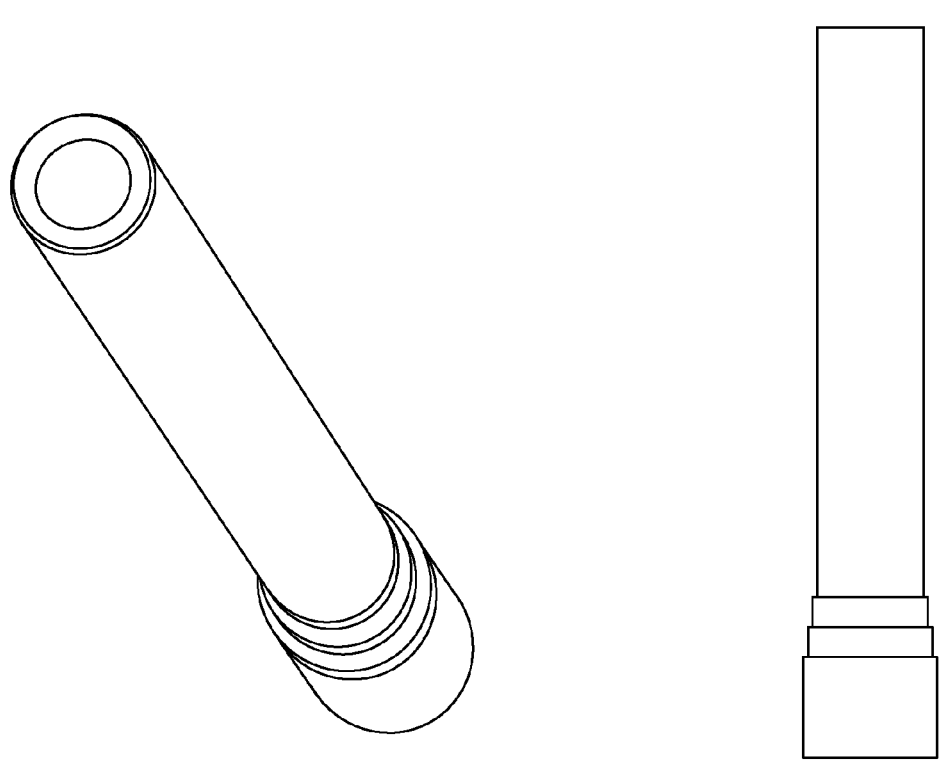

As shown in FIG. 14, the fixed lever is illustrated:
(Bottom of the fixed lever is connected to two cogwheels through bolt no. 10 that will be fully described in below.)

Dynamic Lever:

Dynamic lever is composed of one helical wire no. 8 with the length of 7.5 cm that this helical wire is rotated in the head section of the fixed lever and it can be screwed until the end inside the fixed lever. These two levers compose a helical opening-closing lever in total.

Figure 15:
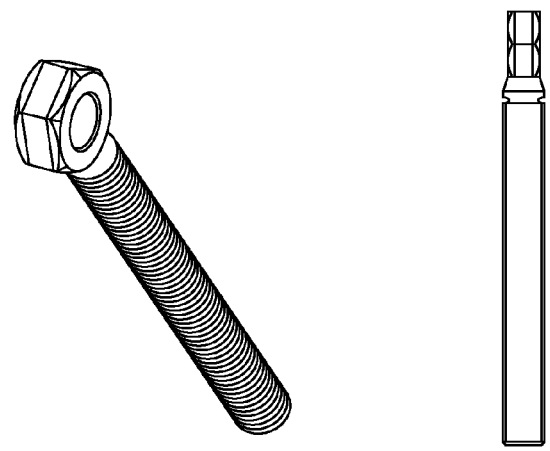
FIG. 15: This figure is representative of fixed lever in the clutch lever. A Nut (no. 8) is welded in the Head Section of this lever.
Figures 15A, 15B:
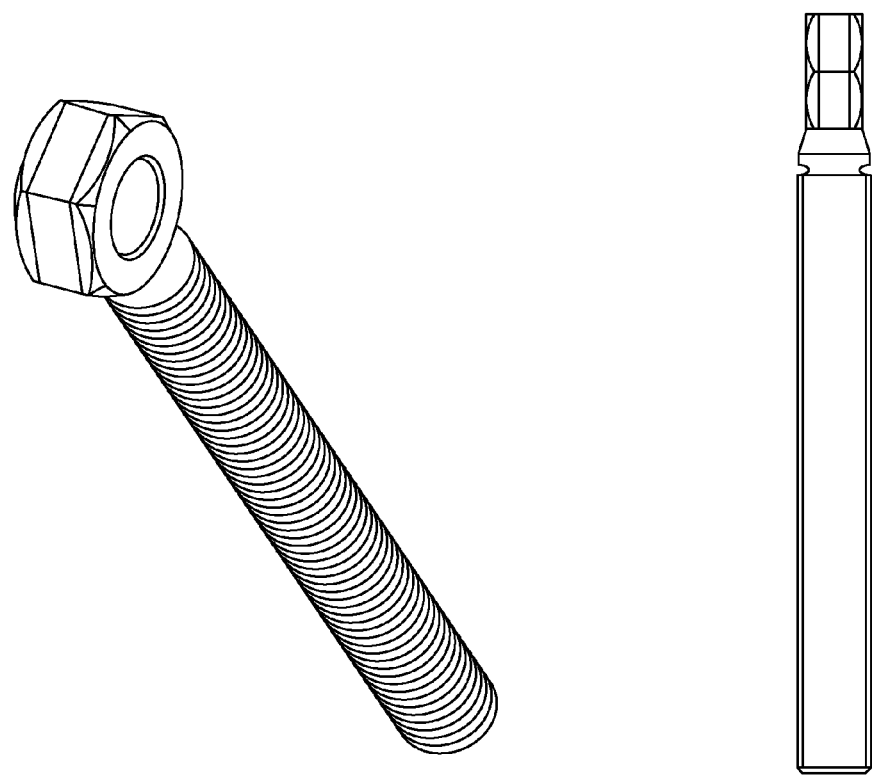
Figure 16:
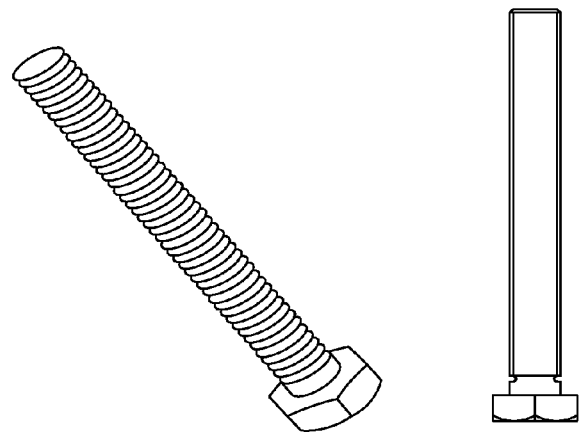
FIG. 16: This figure is representative of the map of "Nipper Regulator Bolt" of lever. This bolt (no. 8) is placed over Nut welded to the dynamic lever.
Figures 16A, 16B:
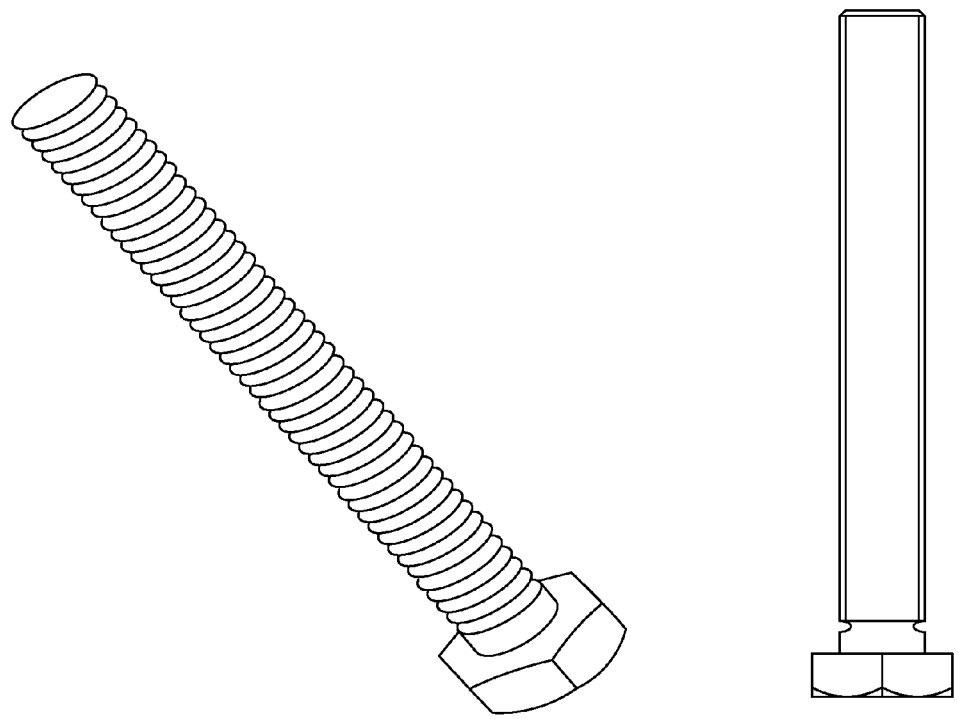

When dynamic lever is placed inside the fixed lever wholly, about 0.5 cm of the head of the dynamic lever remains uncovered. One nut (no. 8) is welded to this heading section of the dynamic lever. FIG. 15 shows the connection style of nut to the lever.

Inside this bolt, one bolt (no. 8) is placed with the length of 7.5 cm, which is called "Tweezers Regulation Bolt" that we will describe in the next section why we need it.

Tweezers of Clutch Lever:

This tweezers is made of iron with a lunate form. Length of this tweezers is 87.5 mm and its width is equal to 3 cm and its diameter is 4 mm. Over this tweezers and in its middle section, one base is placed similar to the supportive bases of fulcrum shafts, which base is connected to the tweezers through 2 bolts (no. 5) as represented in the figure in the next page.

Figure 17:
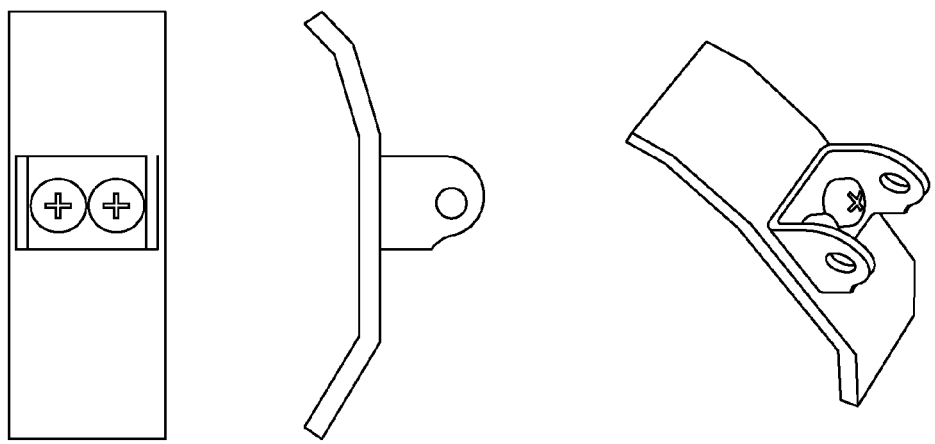
FIG. 17: This figure is representative of the map of "Nipper of Clutch Lever" and its base.
Figure 17A:
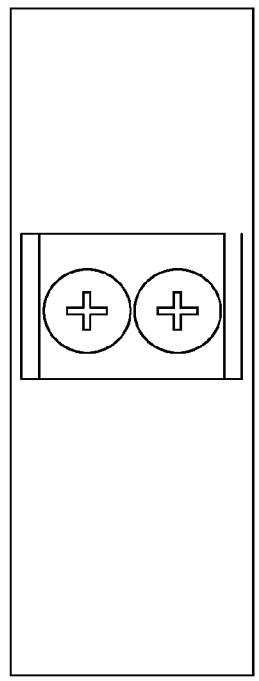
Figure 17B:
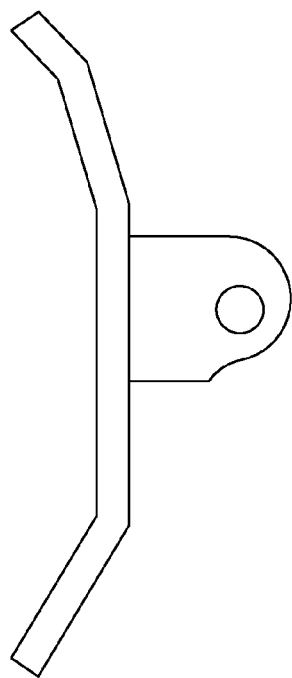
Figure 17C:
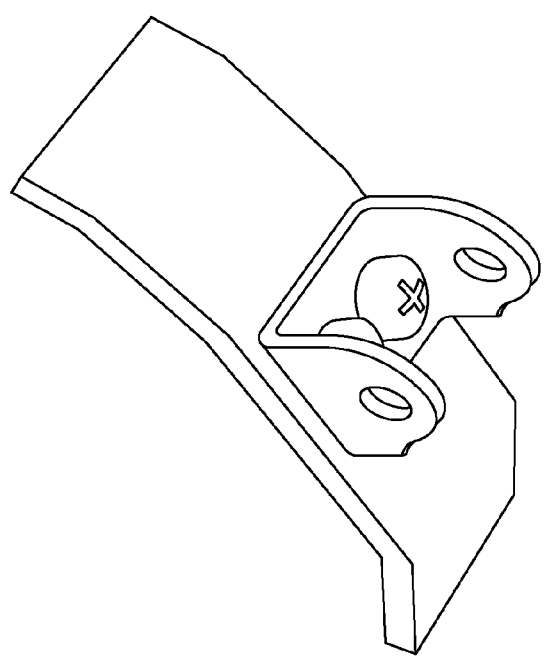

FIG. 17 shows the tweezers of the gas pedal.

One helical wire with the diameter of 6 mm is placed in both holes of this base and around this wire, which is surrounded by a pipe with the external diameter of 10 cm and internal diameter of 8 cm and length of 2 cm. Over the frame of this pipe, one rotating washer similar to the nut used in the heading of the fulcrum shaft is welded (the reason for the use of the bolt of the rotating washer in this section will be described in the next sections). The bolt placed inside the nut of the heading of the dynamic lever is placed inside this nut and so you can connect the tweezers to the lever.

Existence of base over the clutch lever tweezers helps you to adjust the angle of the tweezers suitable with the clutch pedal that will be described in the coming sections. After adjusting angle of the clutch lever tweezers, you can tighten the tweezers making use of the leg or base of the tweezers in order to avoid any angle change.

Figure 18:
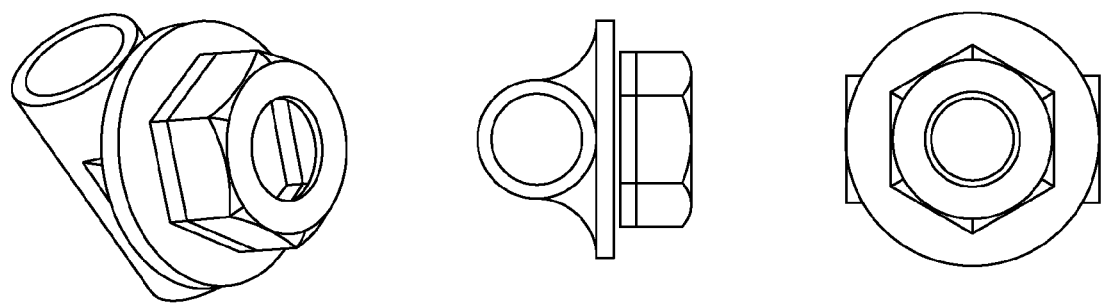
FIG. 18: This figure is representative of the connection style of Nut of the rotating gasket to the pipe. This piece is finally set inside the base of the Nipper of the Clutch Lever.
Figure 18A:
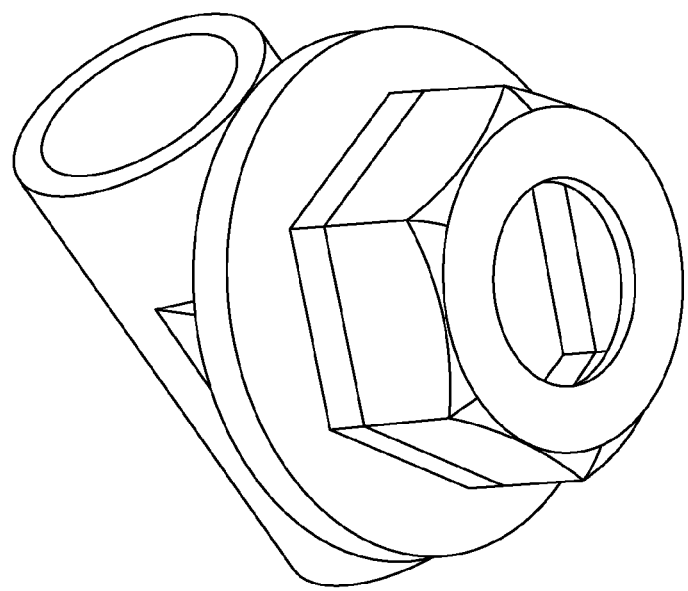
Figure 18B:
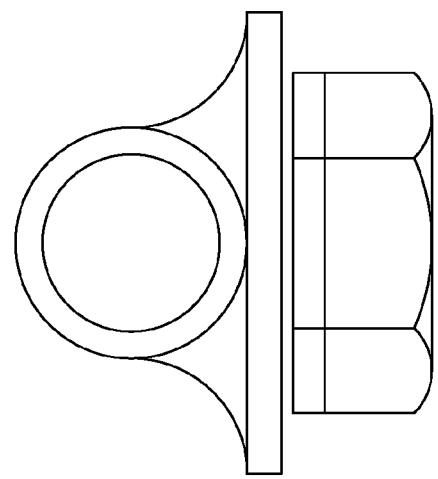
Figure 18C:
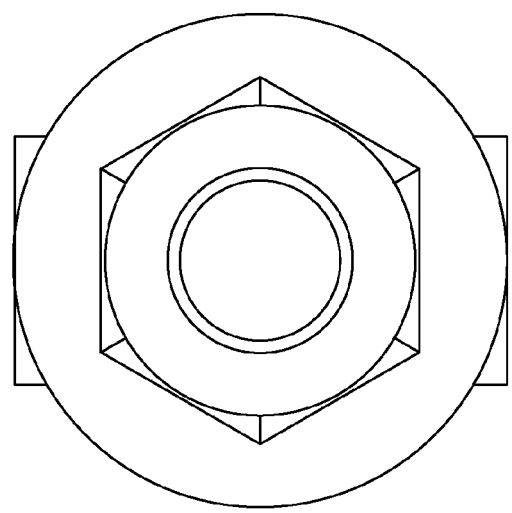
Figure 19:
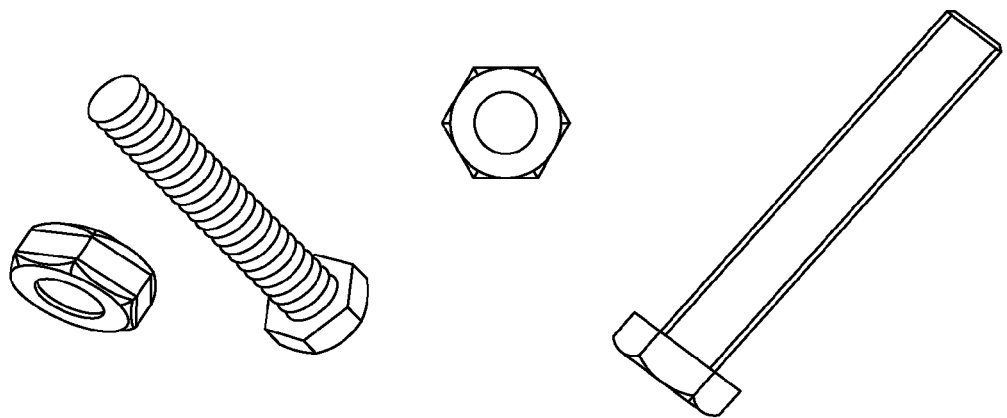
FIG. 19: This figure is representative of screw wire and Nut of the wire (solenoid). This wire connects Nut of the rotating wire and pipe to the base of Clutch Lever's Nipper.
Figures 19A, 19B:
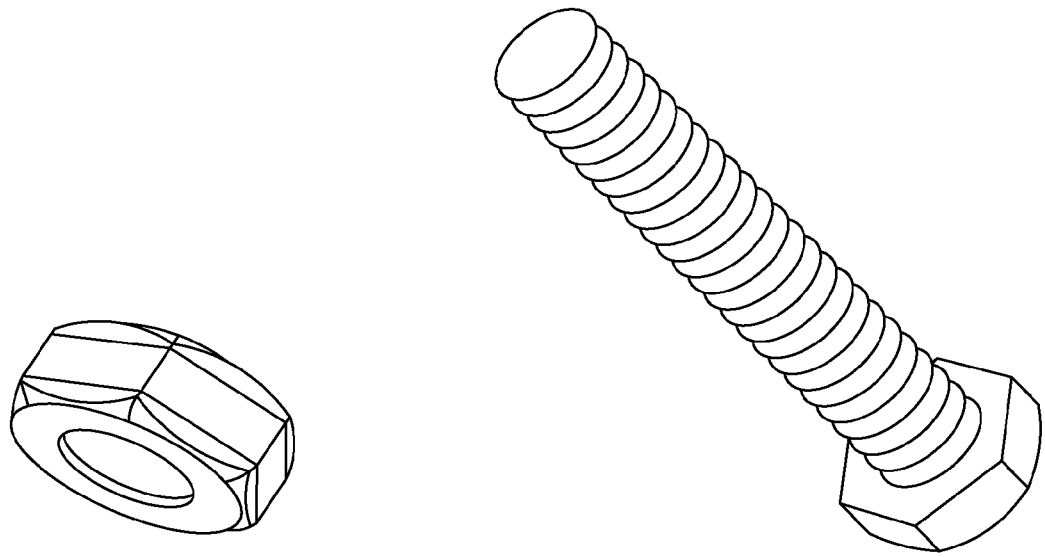
Figure 19C:
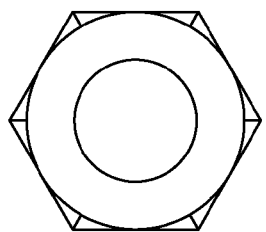
Figure 19D:
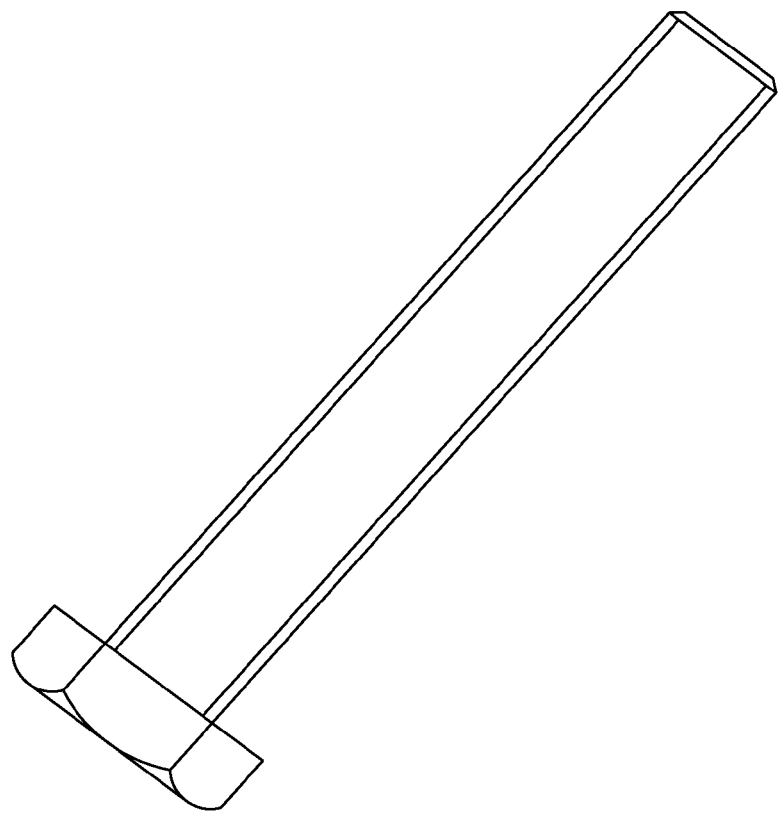

FIG. 18 illustrates design of the rotating washer's nut over the pipe.

FIG. 18 illustrates the design of the helical wire.

Figure 20:
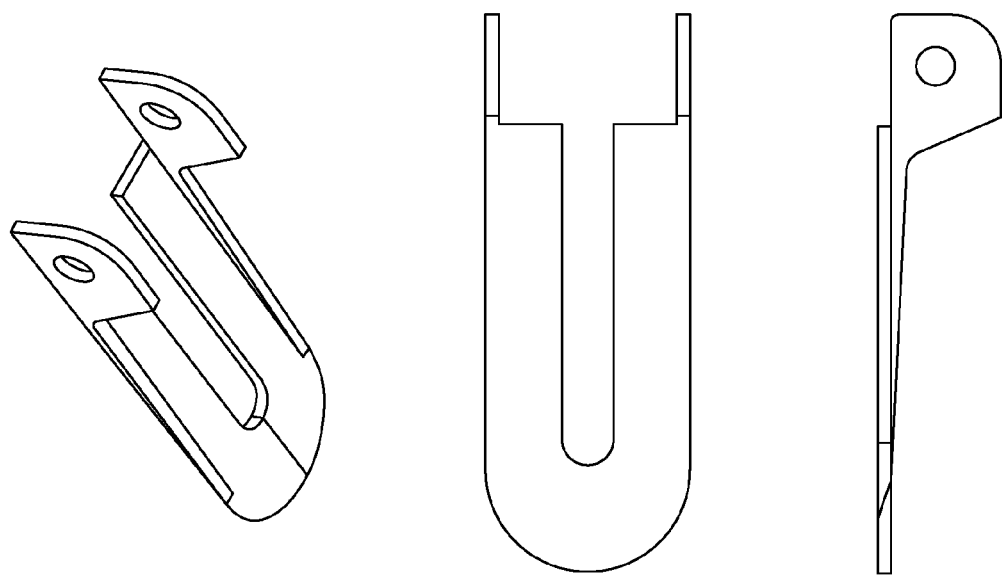
FIG. 20: This figure is representative of the map of "Frame of Clutch Lever's Nipper". This frame is finally connected to the Base of Clutch Lever's Nipper.
Figure 20A:
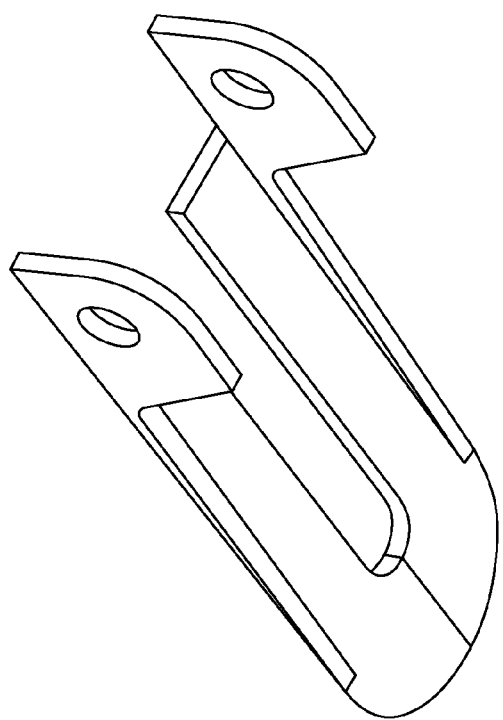
Figure 20B:
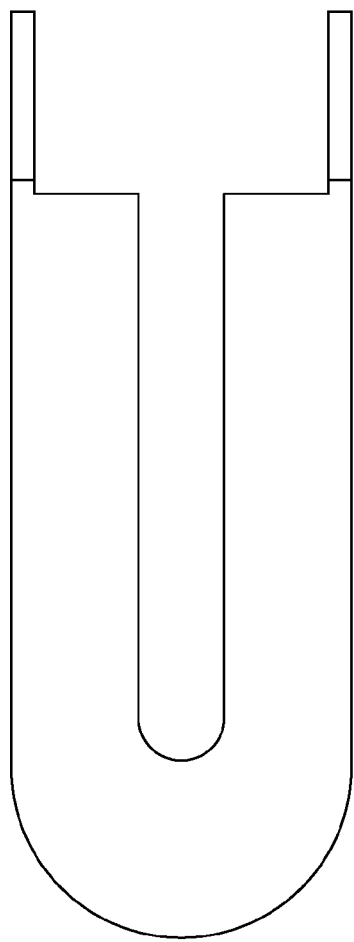
Figure 20C:
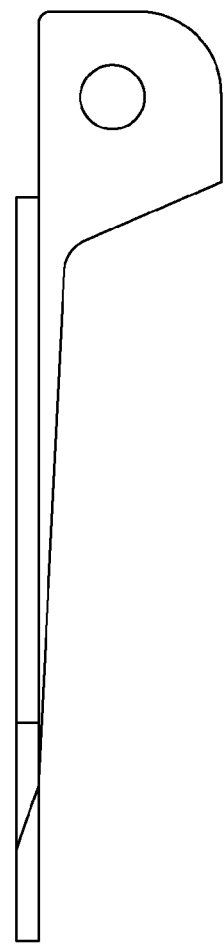
Figure 21:
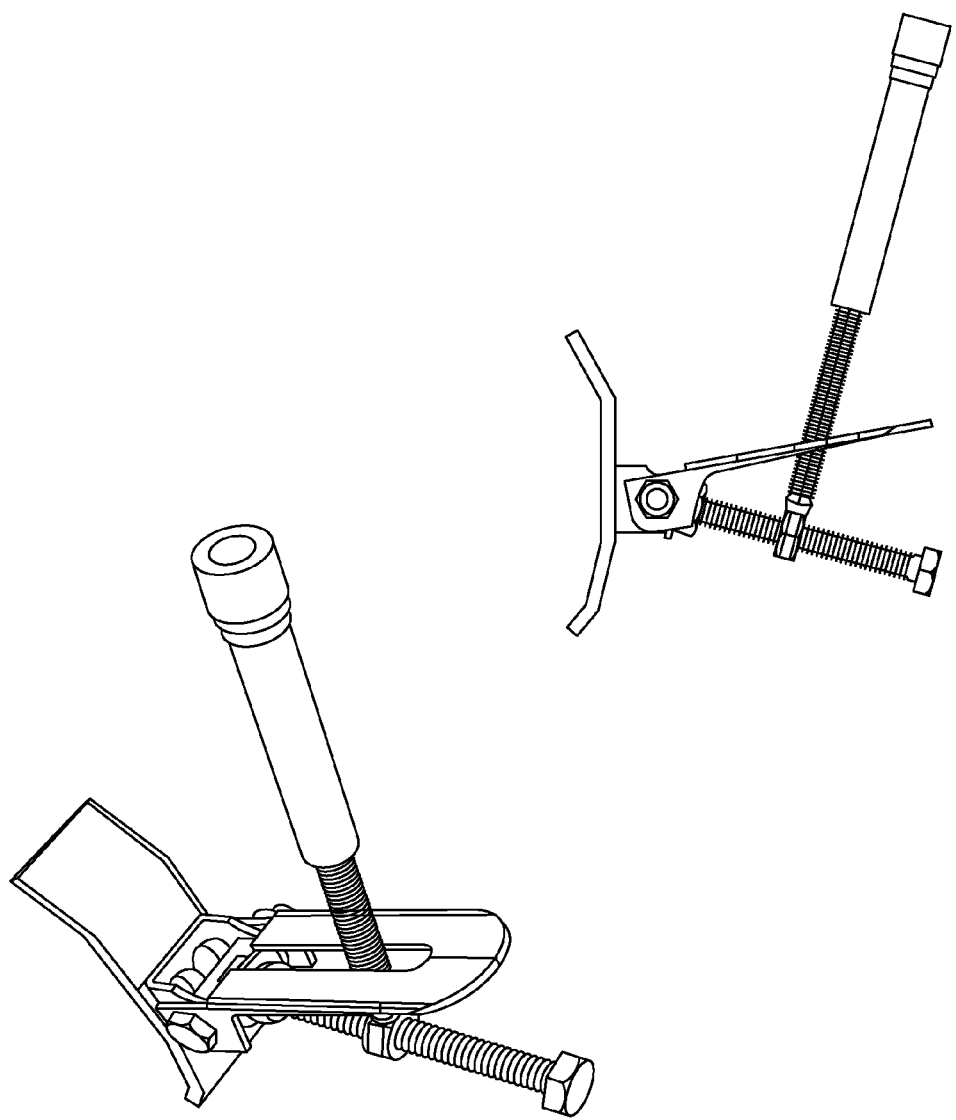
FIG. 21: This figure is representative of the blueprint of Clutch Lever showing all constituent parts of the Clutch Lever.
Figure 21A:
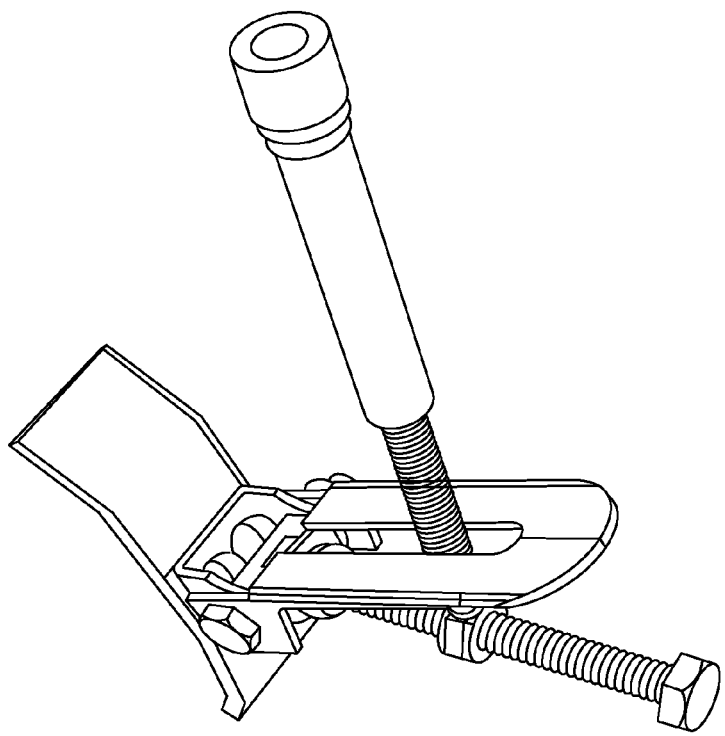
Figure 21B:
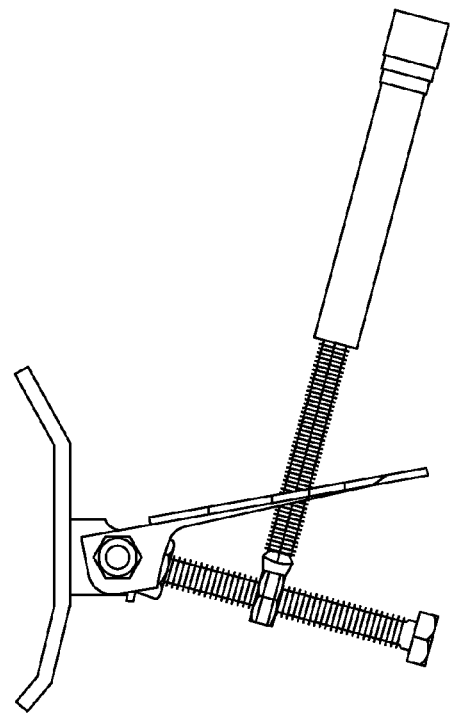

Frame of Clutch Lever:

When the tweezers of the clutch lever is put over the clutch pedal, tweezers may rotate under the strike of the clutch pedal due to the existence of the rotary washer's nut. For this reason, as it is seen in the FIG. 20, a special frame is designed for the tweezers of the clutch lever that this frame is placed in both sides of the lever and its both heads is placed in two sides of the supporting bas and is connected to the base by the same helical wire of the base avoiding rotation of the tweezers. In the FIG. 20, different views of the clutch lever are illustrated.

Figure 22:
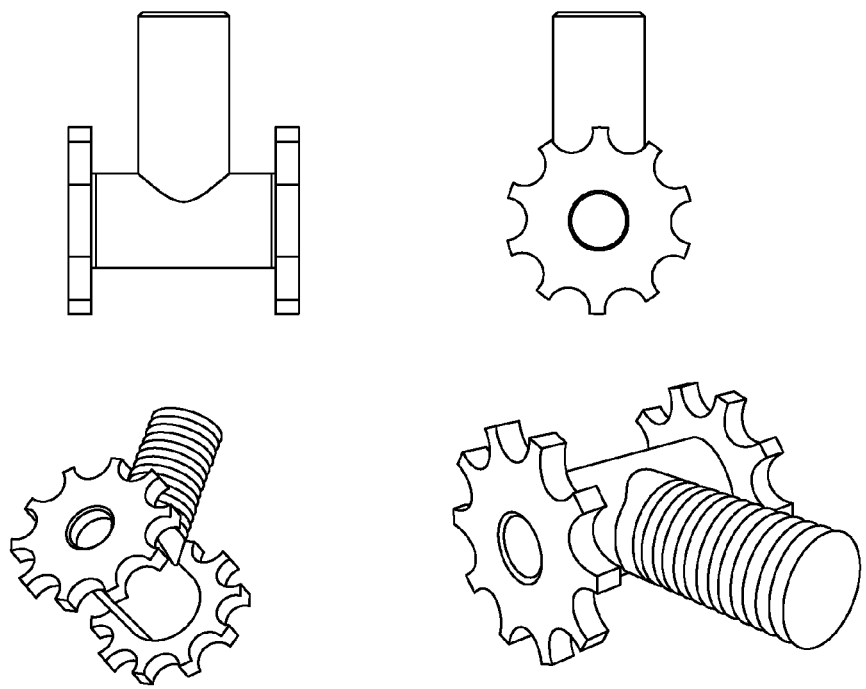
FIG. 22: This figure is representative of binary cogwheels. Binary cogwheels are composed of parallel cogwheels and one bolt no. 10.
Figure 22A:
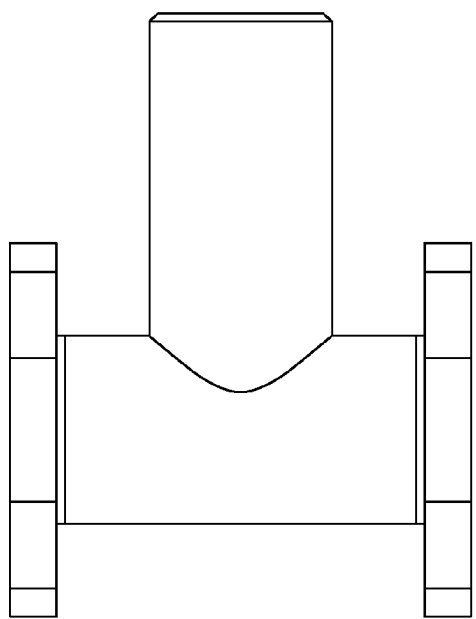
Figure 22B:
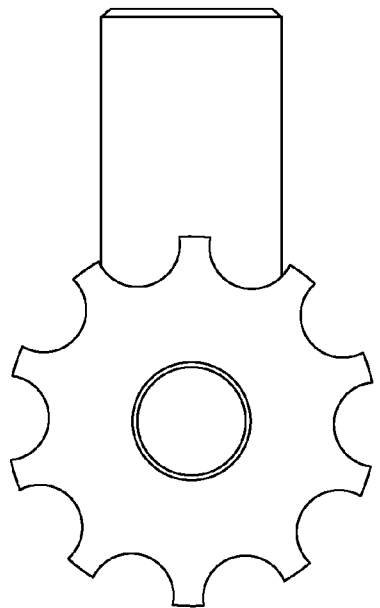
Figure 22C:
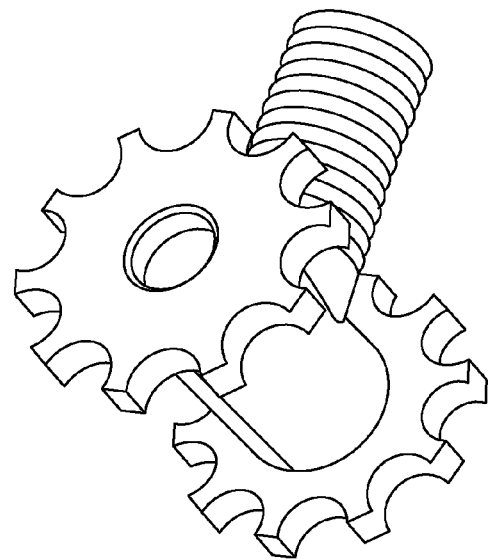
Figure 22D:
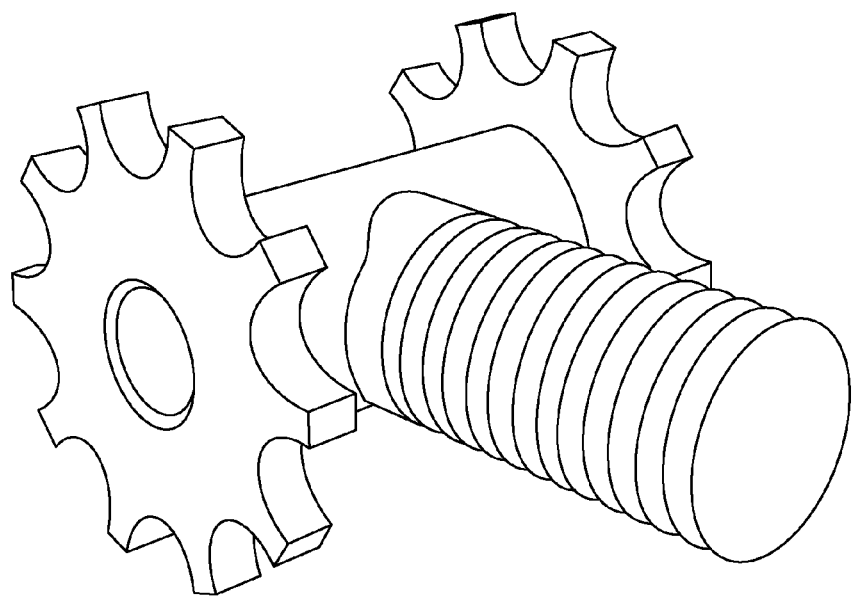
Figure 23:
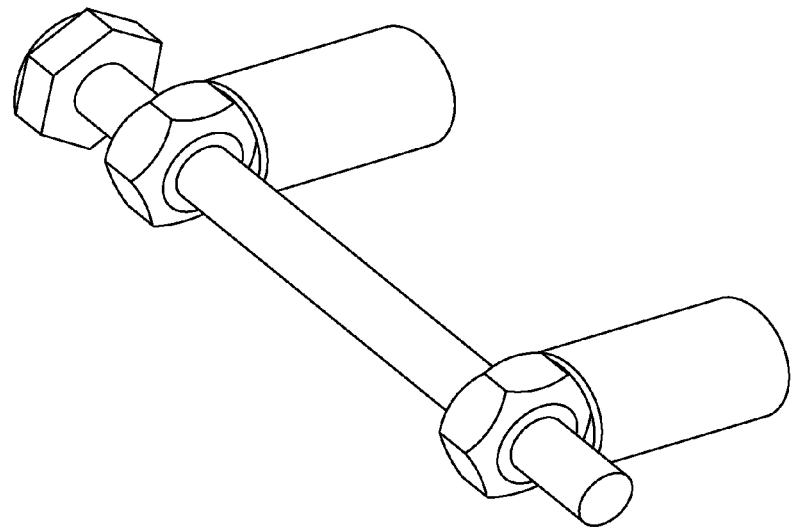
FIG. 23: This figure is representative of binary cogwheels. The wire you see in the figure is the disposition place of binary cogwheels.
Figure 24:
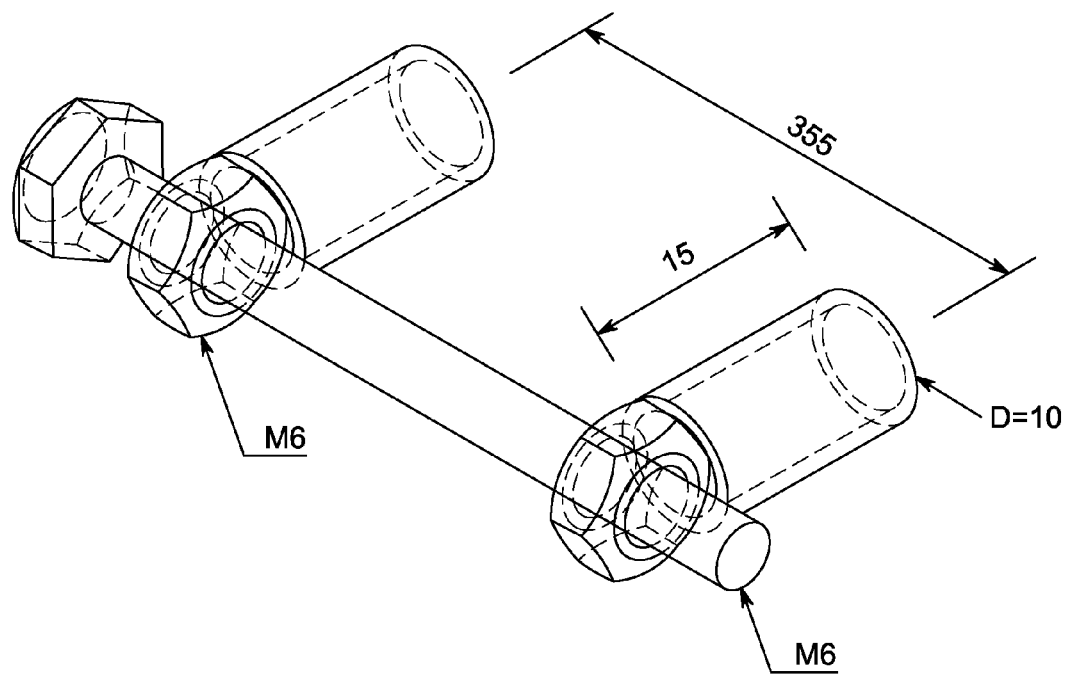
FIG. 24: This figure is representative of the map of scale and sizes existing in the support base of binary cogwheels.

Binary Cogwheels and their Connection with the Clutch Lever:

Binary Cogwheels:

As shown in FIG. 22, these two cogwheels are put in the same direction and they are connected to each other such that the distance between them reaches 2 cm and both of them may have simultaneous rotation around an axle. Diameter of them is 2.2 cm and each has 8 cogs coupled with each other in pair wise fashion in one direction. These cogwheels are custom-made and they are not found in market.

In the distance between these two cogwheels and in the middle of them one no. 8 bolt with the length of 1 cm is welded that bottom of the fixed lever in connected to this bolt in the lever of the clutch pedal connecting lever to the binary cogwheels composing a general structure in general as it was represented in the previous figure.

Through this action, with the rotation of binary cogwheels, tweezers of the clutch lever is connected to the head of the lever and it is connected to the clutch lever moving up and down. But functioning and rotation of these binary cogwheels will be clarified in the next sections. In this system, these cogwheels are called "Binary Cogwheels".

Placement Style of Binary Cogwheels Over the Dynamic Frame:

These cogwheels, to which clutch lever is connected, are placed over two legs (bases) by a wire no. 6 that is the rotation axle of them. The hole created inside these two cogwheels has a diameter of 5.6 mm.

Each of these legs has length of 1.5 and diameter of 1cm placed over the dynamic frame of the clutch lever. One nut (no. 6) is welded to the heading section of these legs inside which nuts there is a helical wire (no. 6) that this wire is the same as the wire of the rotating axle of the binary cogwheels and you may see the placement style of wire inside them.

Two bases (wire no. 8) are welded over the dynamic frame of the clutch lever. These wires are precisely welded over the dynamic frame such that both of them move vertically, in a same direction and along each other in both sides of the dynamic frame making 90° angle with the flooring of the dynamic frame. Supportive legs of the binary cogwheels, which are made of pipe no.1, are placed over these two wires and each of them is connected to the related wire through bolt no. 4.

Figure 25:
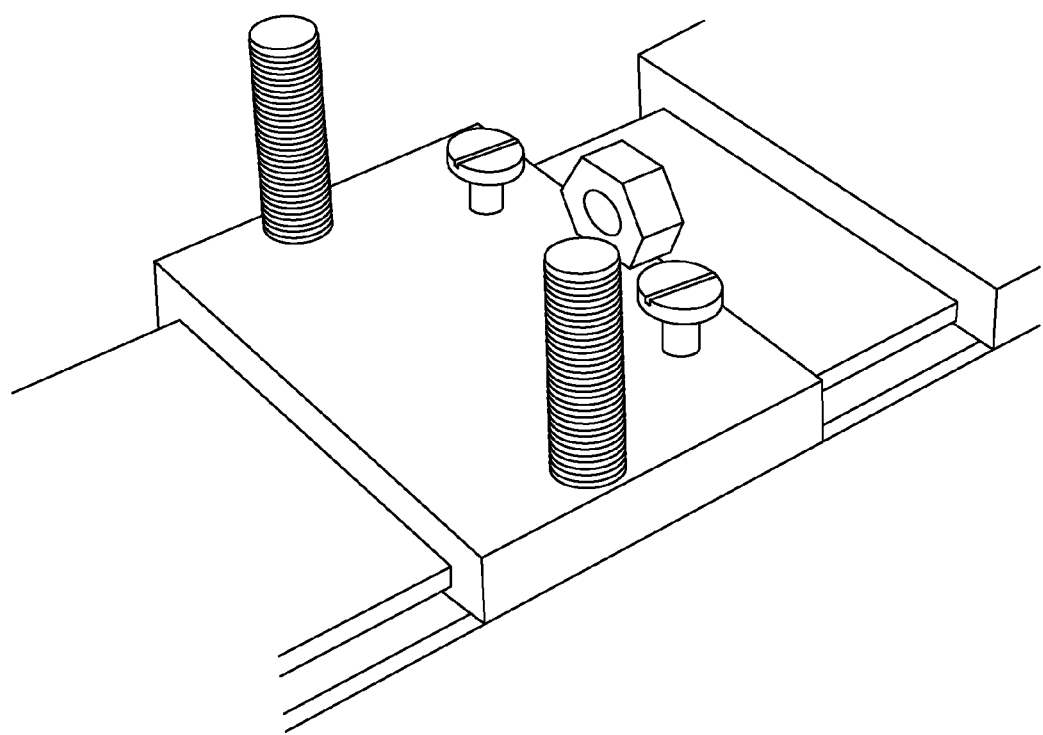
FIG. 25: This figure is representative of the dynamic frame of clutch lever. In this figure, you may see bases connected to the dynamic frame. These bases are finally installed over these two wires.
Figure 26:
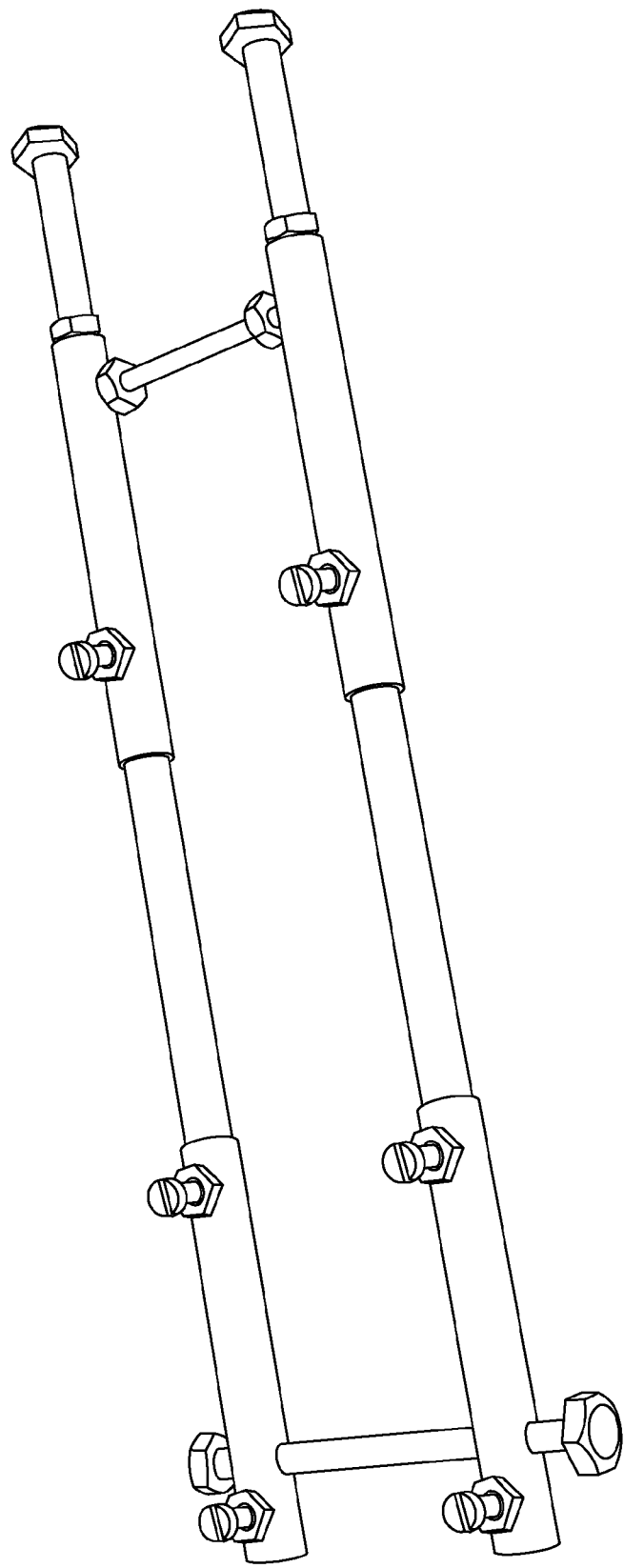
FIG. 26: This figure is representative of the parallel columns which are composed of three separating sections including: 1—Fixed Columns; 2) Connector Wire; and 3) Dynamic Columns.

In the FIG. 25, legs welded to the dynamic frame of the clutch lever are illustrated.

When binary cogwheels are placed over their dynamic frame through the supportive legs, the distance of the axle of the binary cogwheels up to the flooring of the dynamic frame will reach 15 mm.

Finally, the dynamic frame of the clutch lever is fixed and tightened to the main frame of the system through 2 bolts (no. 4) and this is done similar to the connection style of the fulcrum shafts with the only difference that frame of the fulcrum shaft is fixed with a single bolt to the main frame but the dynamic frame of the clutch lever is fixed on the main frame with the help of two bolts as represented in the figure.

Parallel Columns

These columns are composed of three separate parts as follows:

Fixed Columns

Connector Wire

Dynamic Columns

Fixed Columns:

Two columns made of pipe no. 1 are placed over the frame of shaft and spring each of which columns have a length of 6.5 cm and are situated against each other in parallel fashion. These columns are settled over two bases, which are designed along the supportive bases of the binary cogwheels and they are welded over their dynamic frame.

These four bases are placed against each other in pair wise fashion.

Figure 27:
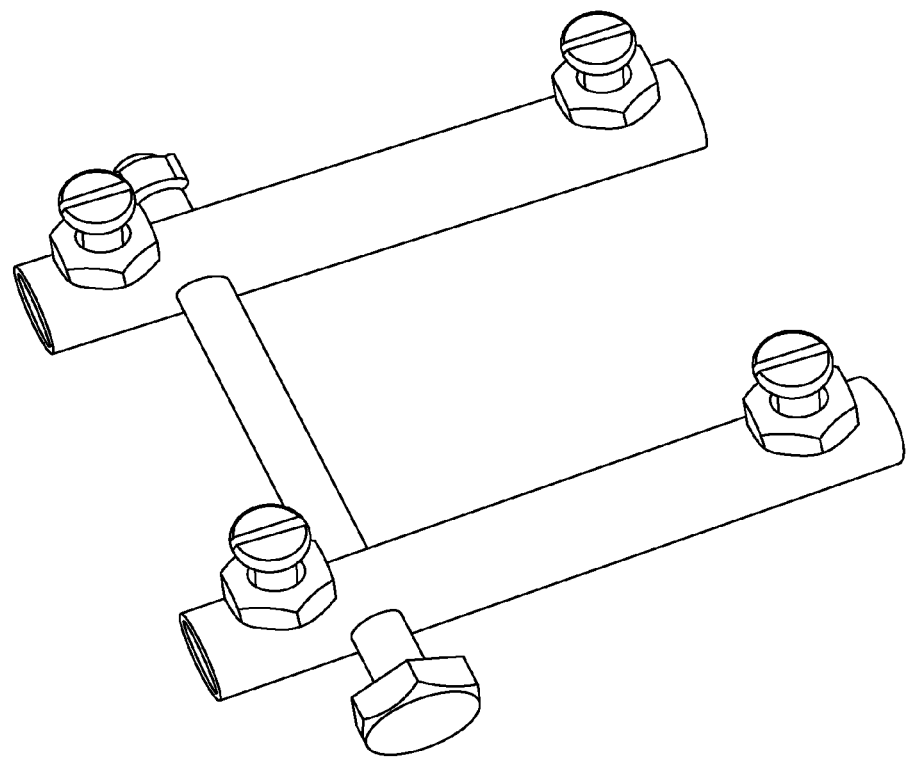
FIG. 27: This figure is representative of Fixed Columns, which compose a part of parallel columns.

Physical form of the fixed columns and parallel columns are shown in FIG. 27.

Figure 28:
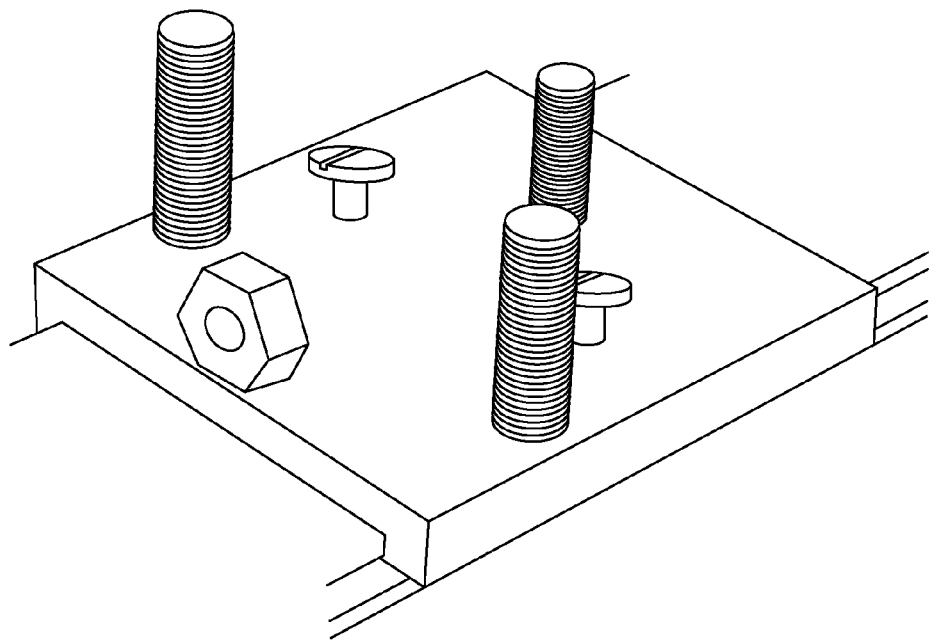
FIG. 28: This figure is representative of the dynamic frame of shaft and parallel columns. In this figure, you may observe bases connected to the dynamic frame. Parallel columns are finally installed over these bases.

In the lower section of these two columns, two holes are created over the parallel columns with the distance of 1.5 cm from the dynamic frame that when they (columns) are placed over the supportive bases, the existing holes are placed against each other and in one direction. Inside these two holes, one helical wire no. 6 is placed. Fixed columns are each fixed on the supportive bases welded on the dynamic lever. In FIG. 28, bases welded on the dynamic frame of the shaft are illustrated.

Connector Wire:

Inside each of fixed columns, there are two wires with the diameter of 8 mm and length of 12 cm. When they are placed inside fixed columns, 6 cm of them remains out of the fixed columns. Finally, each of them is tightened to the fixed columns through bolt no. 5, which are placed over fixed columns and in the upper section of them.

Dynamic Columns:

To other columns with the length of 7.5 cm with material similar to that of the fixed columns are placed around the wires remained out composing parallel columns with the length of 14 cm.

Fixed columns are fixed always but the dynamic ones can move up or down around the connector wires through connector wires that the necessity of its existence will be described in the next sections.

But dynamic columns are somehow different from the fixed columns such that over each of the dynamic columns, one bolt (no. 6) is welded with a distance of 0.5 cm. When these dynamic columns are placed around the connector wire, these two nuts are placed against each other and with the help of one wire two heads of the bolt (6 mm diameter) are connected to each other. Finally, dynamic columns are connected to each other. This wire is completely in one direction with the fixed wire of the fixed columns and they are parallel with each other in horizontal direction.

Figure 29:
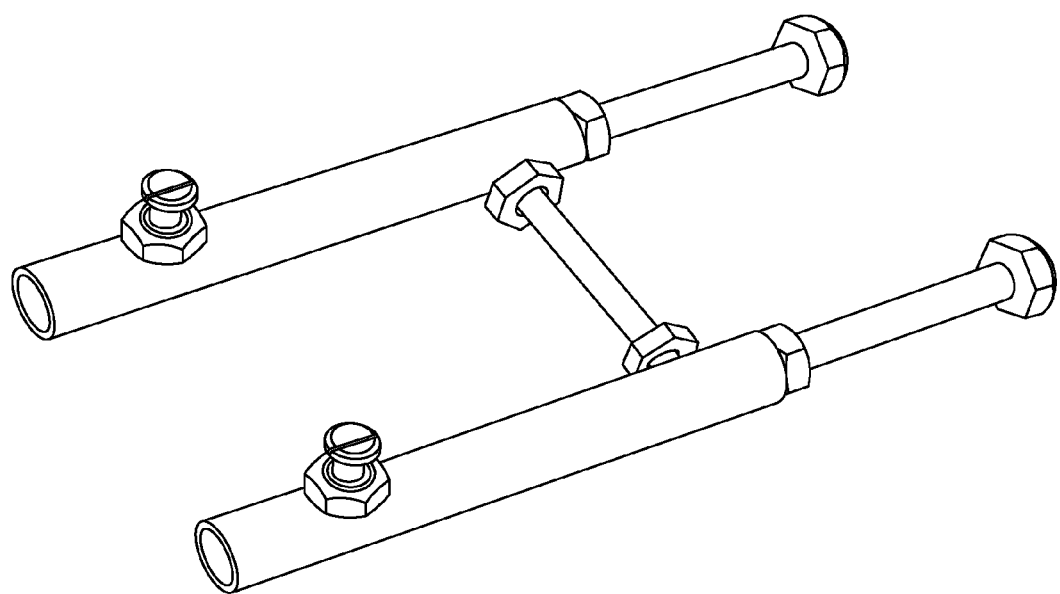
FIG. 29: This figure is representative of the dynamic frames. Dynamic frames compose a part of parallel columns.

FIG. 29, shows the physical form of the dynamic columns.

Dynamic columns similar to fixed columns are fixed in the end of the dynamic columns to the connector wires through bolt no. 5.

Two other nuts (no. 6) are welded in the heading section of the dynamic columns inside which nuts two bolts (no. 6) are placed that after being placed inside nuts, these bolts can be put inside the dynamic columns and opened or closed in line with the dynamic columns.

Heads of these bolts are placed over wires placed inside dynamic columns and through opening and closing these bolts; we may move up or down the dynamic columns and adjust the distance between fixed and dynamic columns. These bolts in this system are called "Single Chain Regulation Bolts".

Figure 30:
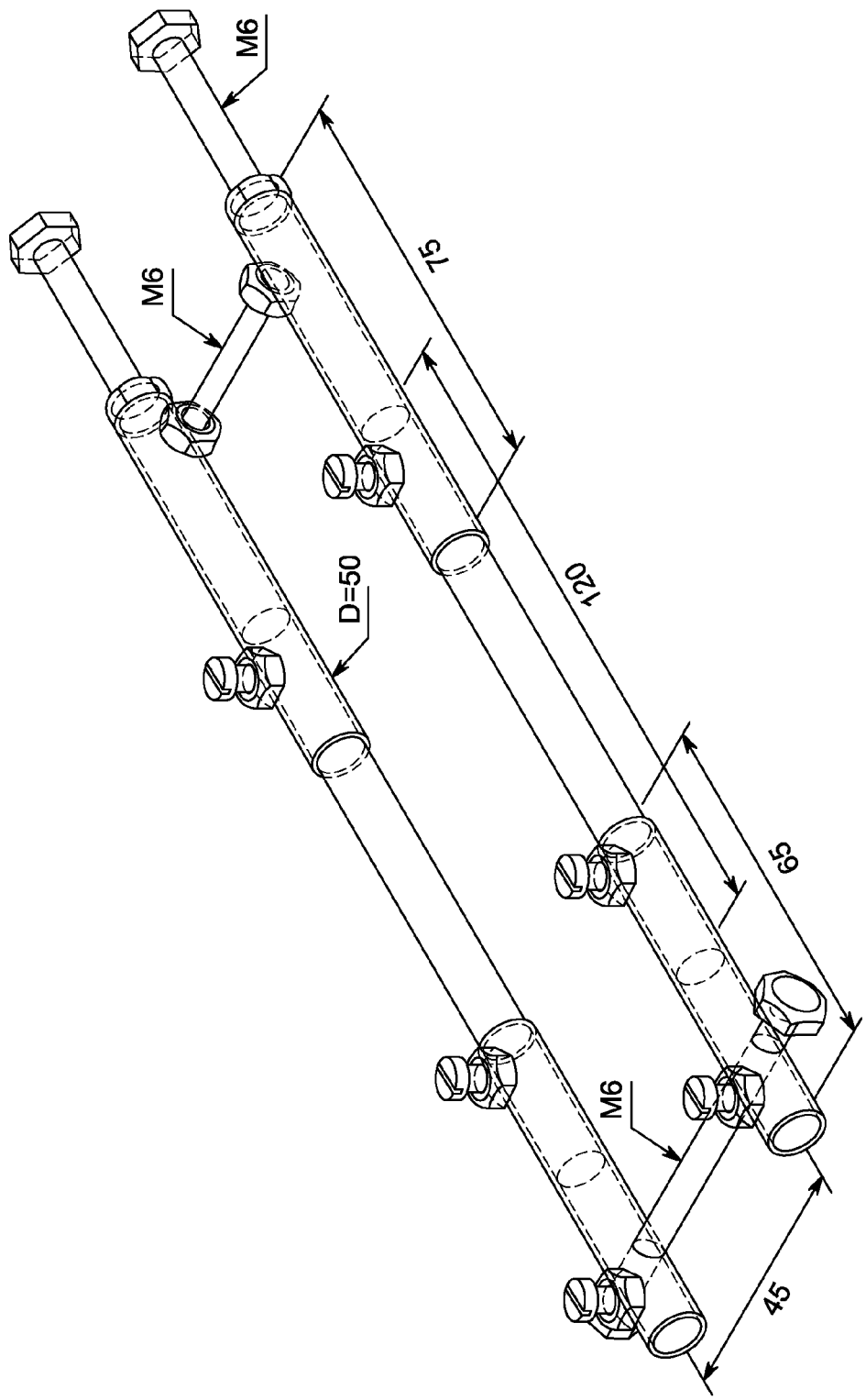
FIG. 30: This figure is representative of the map of the scale of parallel columns. In this figure, you may observe scales used in these parallel columns.

FIG. 30, shows the blueprint of the parallel columns.

Figure 31:
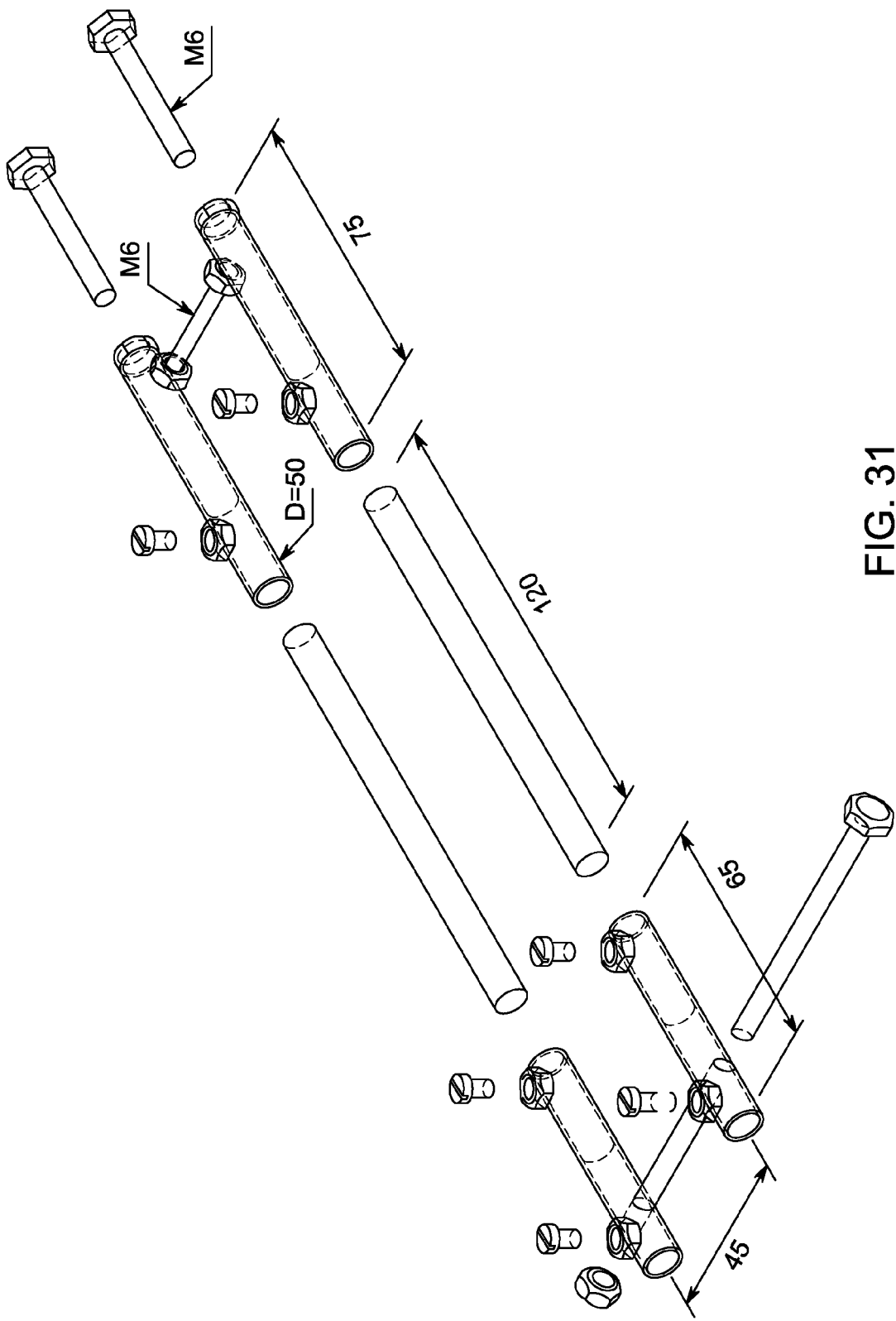
FIG. 31: This figure is representative of the explosive map of the scale of parallel columns. In this figure, you may observe scales used in these parallel columns.
Figure 32:
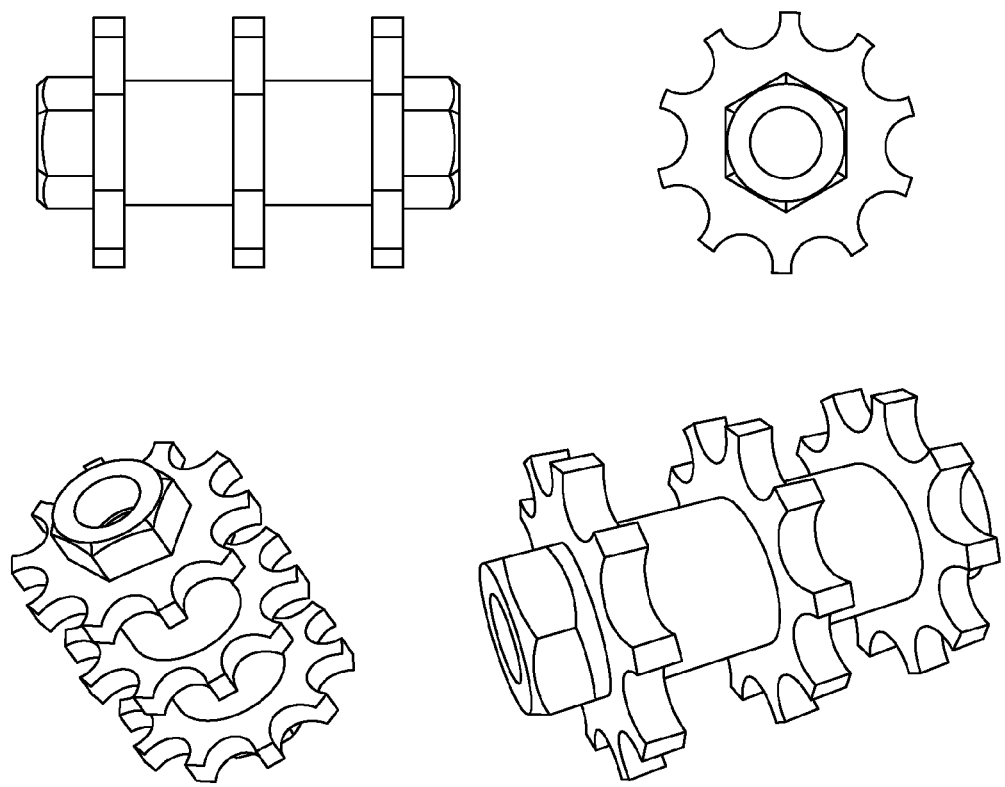
FIG. 32: This figure is representative of triple cogwheels. Triple or triplicate cogwheels are composed of three parallel cogwheels put in one line and in similar scales.
Figure 32A:
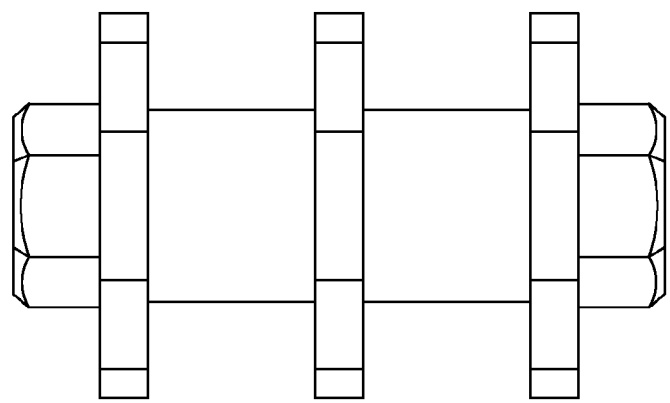
Figure 33:
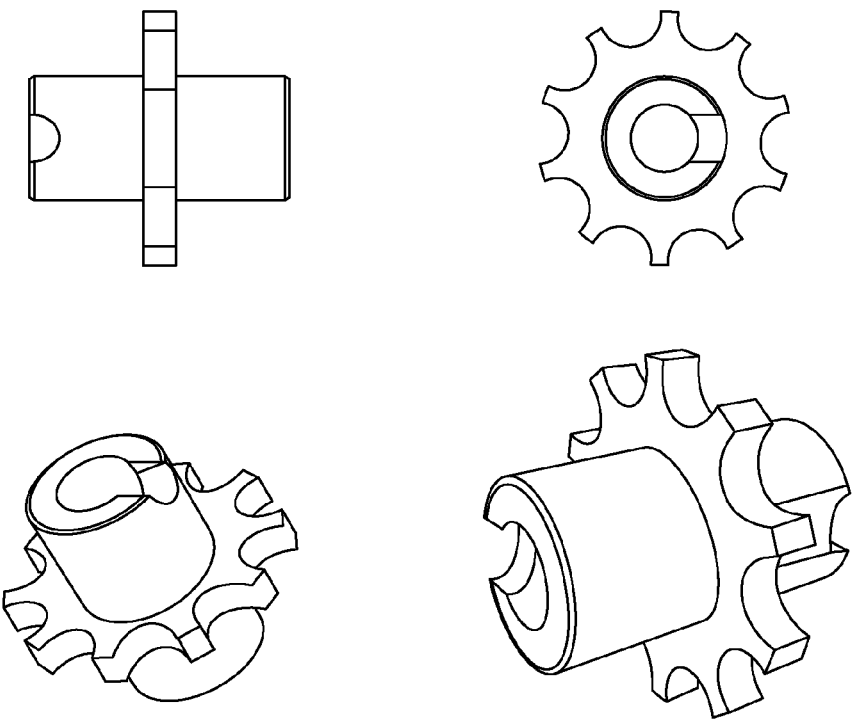
FIG. 33: This figure is representative of single cogwheel. Single cogwheel is put in one line with middle cogwheel from among triple cogwheels.
Figure 33A:
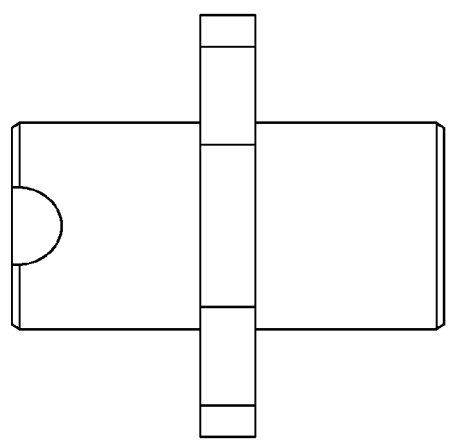

FIG. 31 is an Explosive drawing of parallel column.

Triplicate Cogwheels and their Connection with the Binary Cogwheels:

Triple Cogwheels:

Three cogwheels, which move in one direction and are connected to each other, rotate around the wire of fixed columns and are called "Triple Cogwheels".

These three cogwheels are made of the same material as the binary cogwheels and have unified scale. Each cog of one cogwheel is in one direction with the cogs of the two remaining cogwheels; these cogwheels are set between two parallel columns around the wire of fixed columns placed under fixed columns.

Distance of the center of these cogwheels from the flooring of the dynamic frame is 15 mm and these three cogwheels may simultaneously turn around one axle.

Distance between each of these cogwheels is 8.5 mm.

Single Cogwheel:

One cogwheel called "Single Cogwheel" is settled around the wire placed among the dynamic columns, which are of the same type and material as the material of the triple and binary cogwheels that the scale of this cogwheel is similar to the scale of the remainder cogwheels.

It shall be noted that single cogwheel is in the same direction in vertical fashion with the middle cogwheel of the triple cogwheels and triple cogwheels are in the same direction in horizontal fashion with the "Binary Cogwheels".

Connection Style of Cogwheels with each other:

Single cogwheel is in the same direction with middle cogwheel of the triple cogwheels in vertical fashion and they are connected to each other with a chain with the length of 12.5 cm.

Two lateral cogwheels of the triple cogwheels, which are in the same direction with the binary cogwheels, are horizontally connected to each other through two chains that length of each one of these chains reaches 7 cm.

In this system, looseness and tightness rate of the single chain is adjustable such that when the single chain is connected to the related cogwheels, you may regulate looseness or tightness of the single chain through opening or loosing "Single Chain Regulation Bolts".

When single chain regulation bolts are put inside dynamic columns, head of these bolts is placed over the connector wires. Opening or tightening these bolts, you may adjust the distance between the dynamic and fixed columns. Doing so, you can regulate looseness or tightness of the single chain. This is why parallel columns are composed of fixed and moving sections. Of course, looseness or tightness rate of the binary chains is adjustable that will be described hereafter.

Now we have 3 chains in this system that one is in vertical state and two others are in the same size and direction in horizontal fashion that the single chain composes 90° angle with the binary chains all of which are connected to each other through single, triple and binary cogwheels.

With the movement of the single chain, middle cogwheel of the triple cogwheels moves and with the movement of the middle cogwheel, its lateral cogwheels also move and, similarly, movement of triple cogwheels result in the movement of the binary cogwheels, which are connected to each other with the help of triple cogwheels. Finally, movement of binary cogwheels moves bottom of the clutch lever, which is connected to the binary cogwheels, and head of the clutch lever moves and down.

Figure 34:
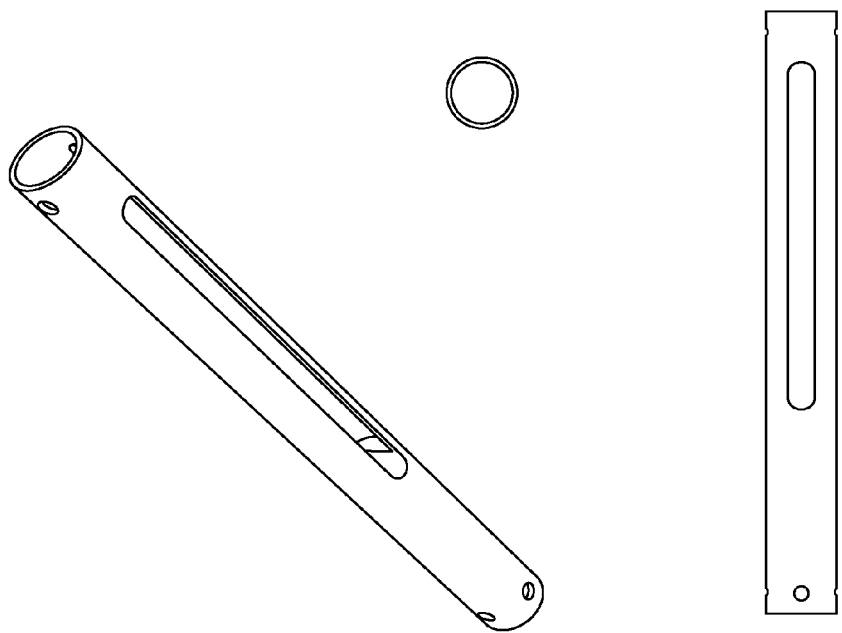
FIG. 34: This figure is representative of shaft. This shaft is put in one line with single cogwheel.
Figure 34A:
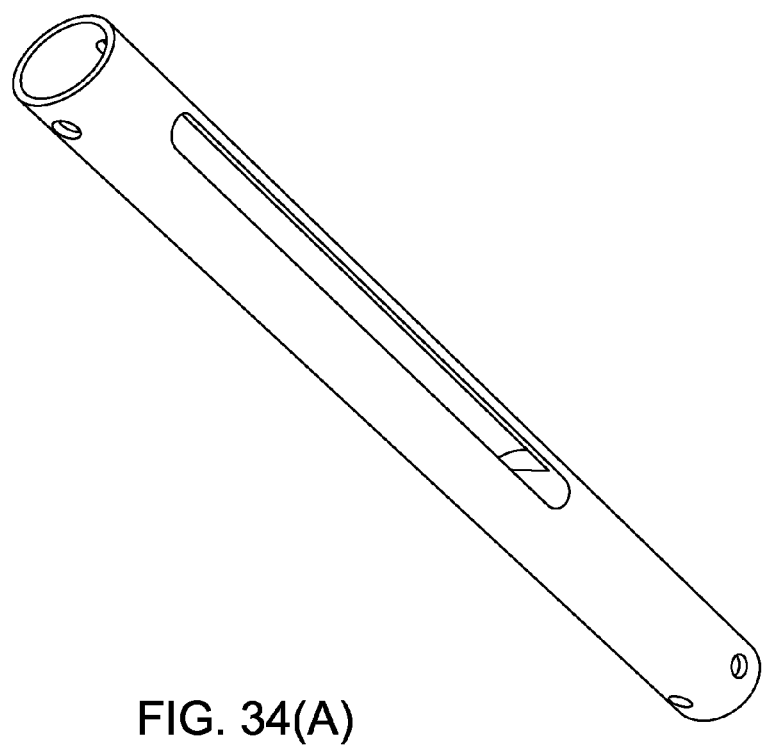
Figure 34B:
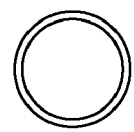
Figure 34C:
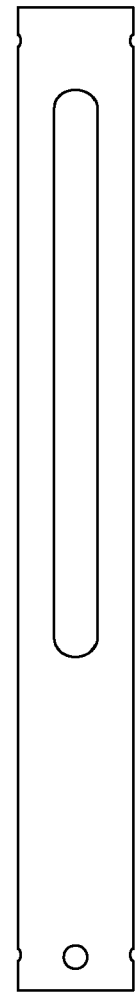
Figure 35:
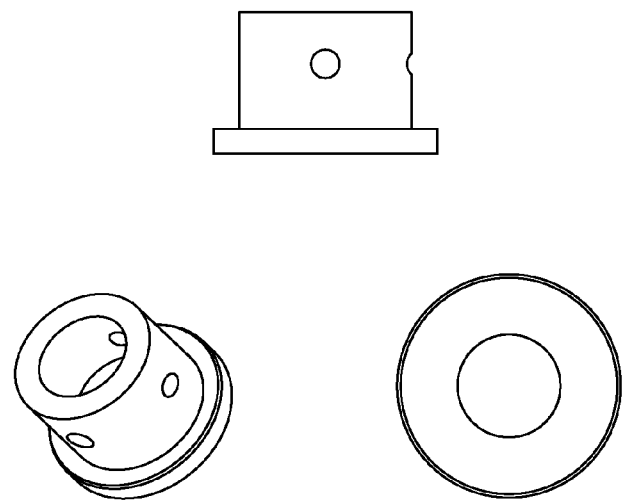
FIG. 35: This figure is representative of the support base of shaft. This base is placed over dynamic frame of shaft and is screwed to the frame.
Figure 35A:
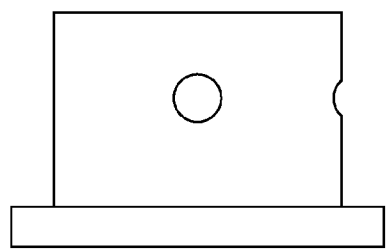
Figures 35B, 35C:
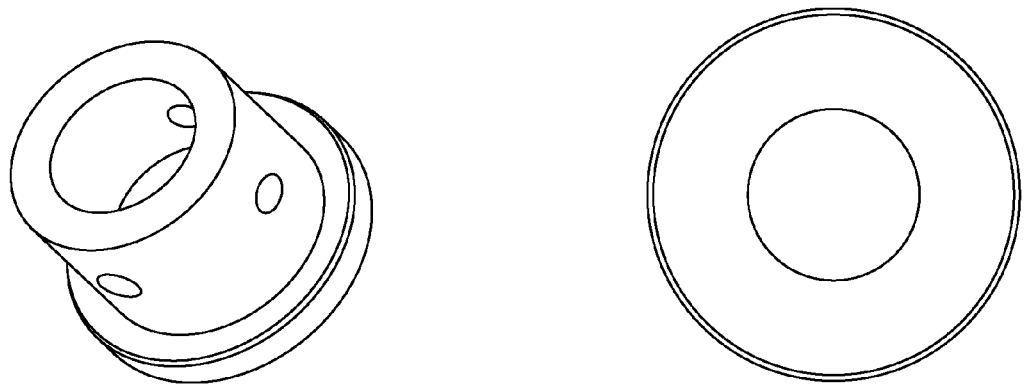

Dynamic Style of Chains:
Shaft and Spring:

As shown in FIG. 34, there is a shaft with the length of 18 mm placed in another section of the system and over the dynamic frame against the single, which is vertically placed in the middle of the dynamic frame.

Diameter of this shaft is 16 mm and it is put along the single chain and it is parallel with the single chain (By shaft, we mean a polished plated wire).

This shaft is placed over the dynamic frame by one base such that shaft is in the same direction with the single chain and parallel with it. The shaft holder base is connected to the dynamic frame through bolt no. 6, which has been welded to the dynamic frame since the beginning (angle of this bolt with the dynamic frame is 90°.

Finally, shaft is placed tightly over the dynamic frame with the help of three bolts beside the shaft holder base.

Figure 36:
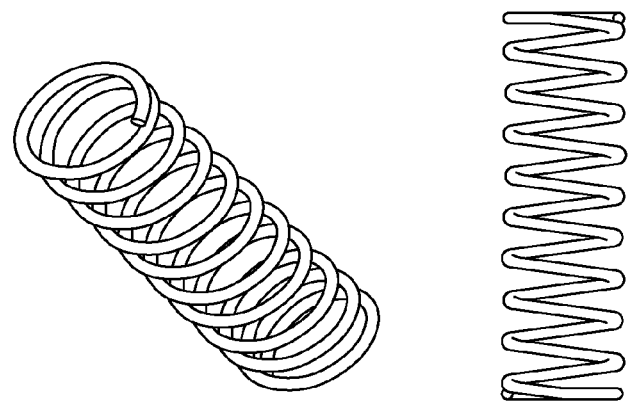
FIG. 36: This figure is representative of the spring existing around the shaft. This spring, which is a roll-top spring, may assume different wire thicknesses depending on the power of the clutch pedal.
Figures 36A, 36B:
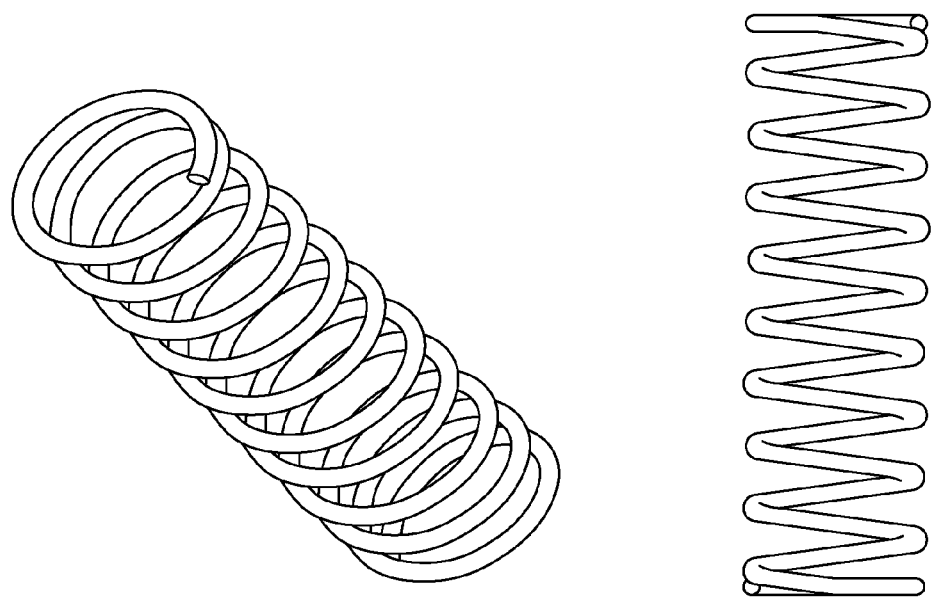
Figure 37:
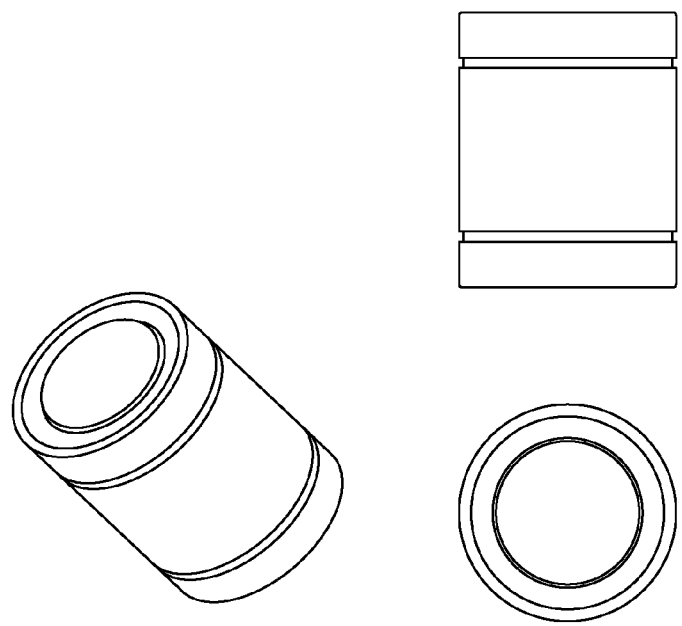
FIG. 37: This figure is representative of the ball bearing coupling. This coupling moves up and down around the shaft. The spring existing around the shaft is placed under this coupling.
Figure 37A:
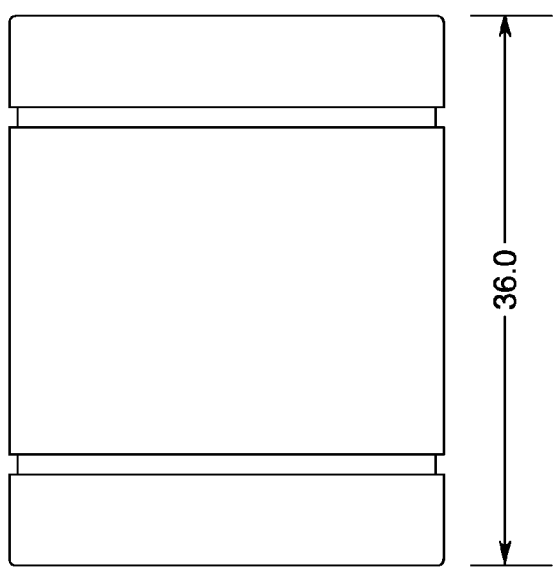
Figure 37B:
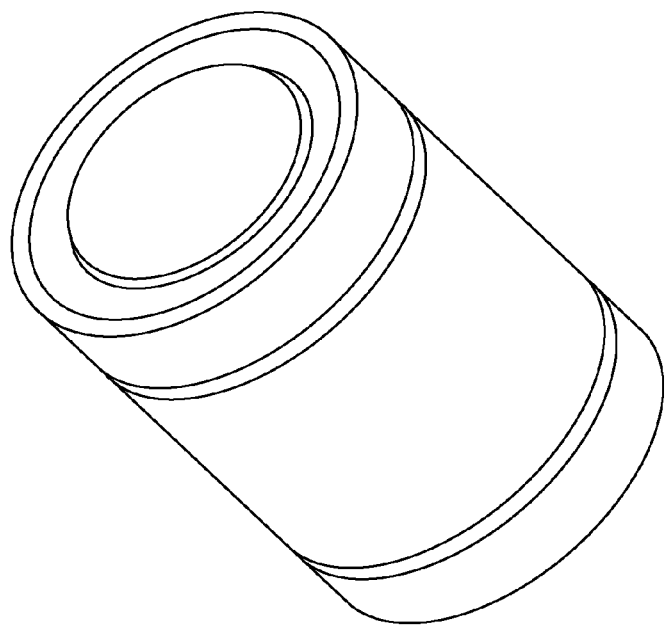
Figure 37C:
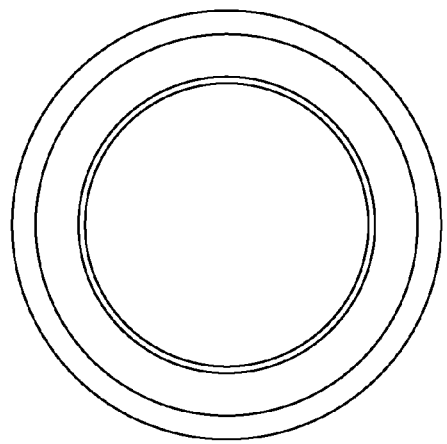
Figure 38:
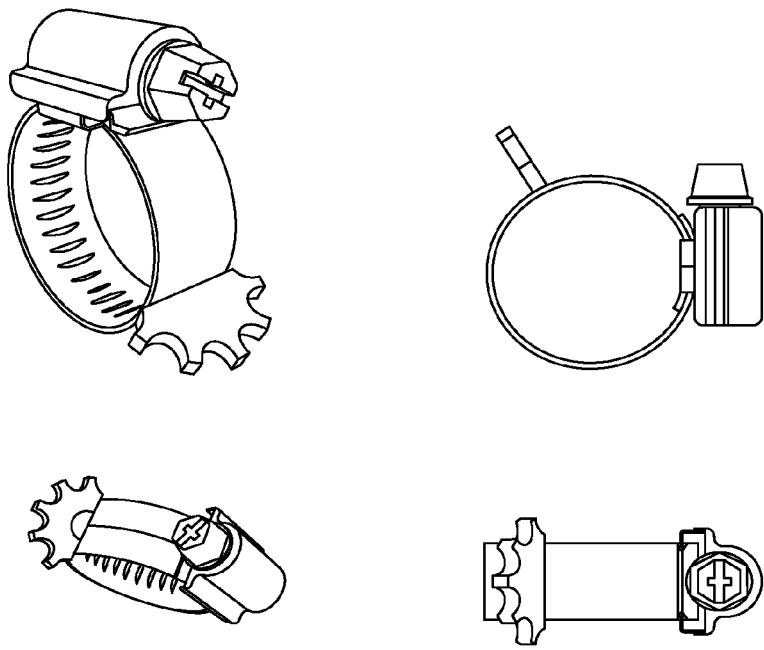
FIG. 38: This figure is representative of "Chain Clamp". This clamp is finally installed over the frame of ball bearing coupling and its cogged section is connected to the single chain.
Figure 38A:
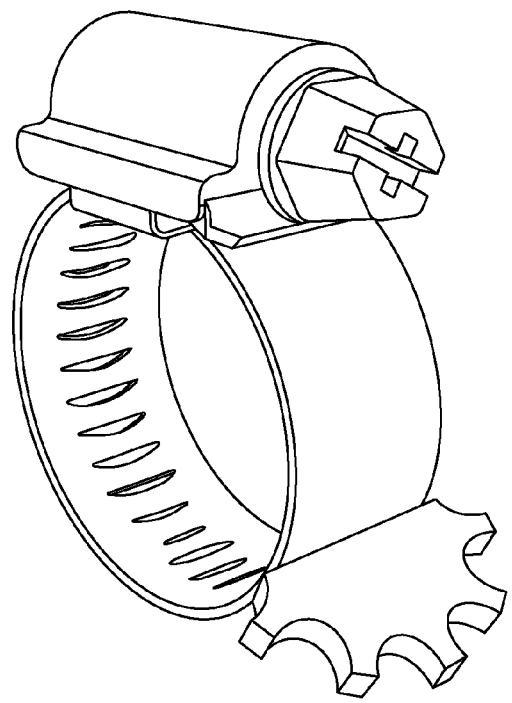
Figure 38B:
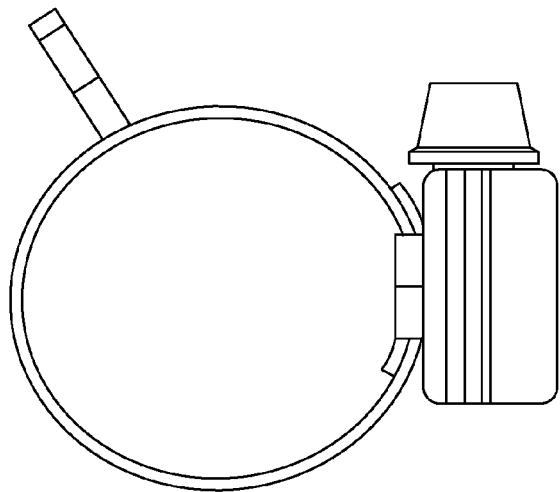
Figure 38C:
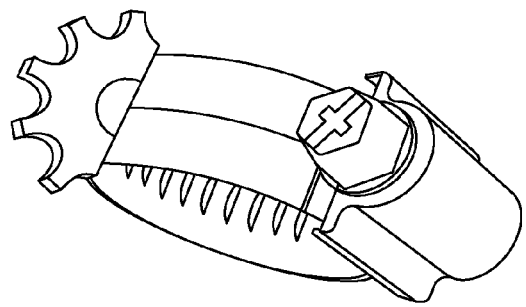
Figure 38D:
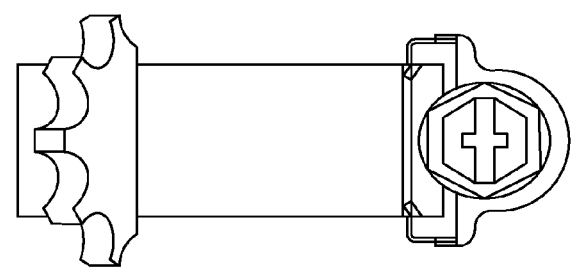
Figure 39:
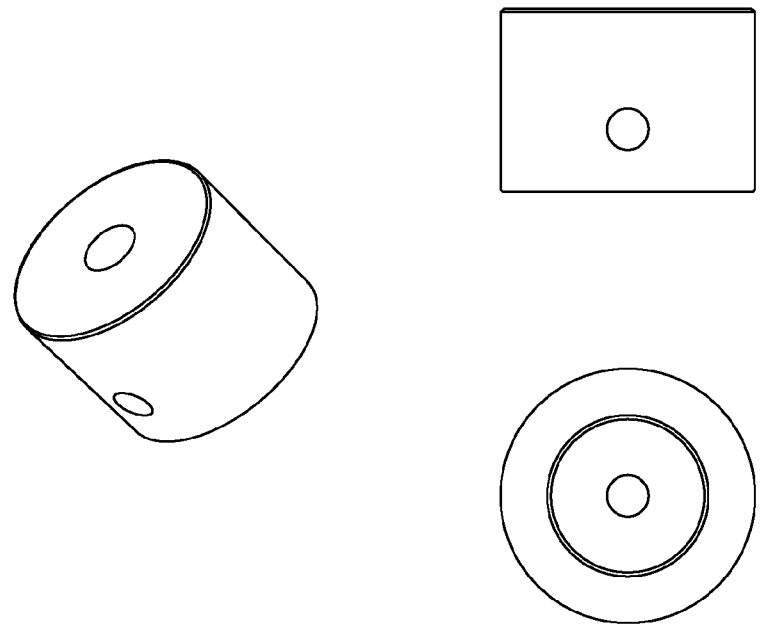
FIG. 39: This figure is representative of the shaft's cap. This cap is connected tightly to head of shaft through two bolts.
Figure 39A:
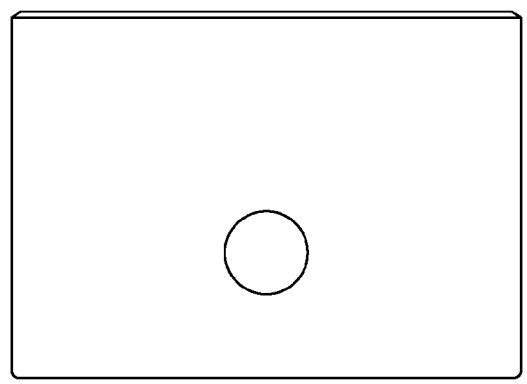
Figure 39B:
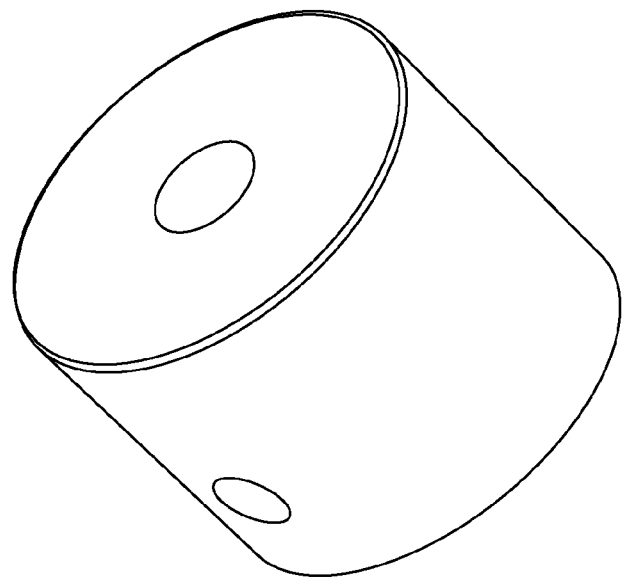
Figure 39C:
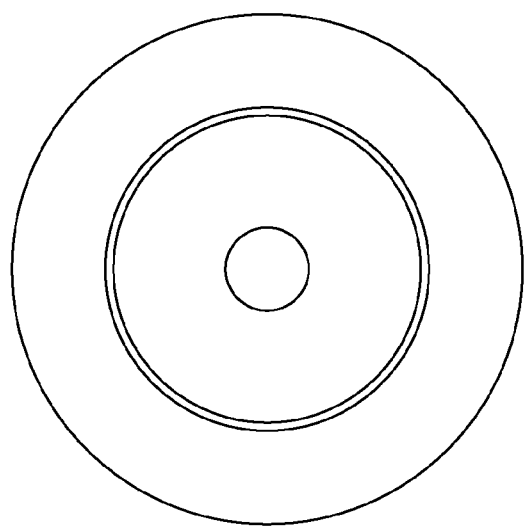

Over the frame of this shaft, there is a furrow with the width of 6 mm and length of 12 cm. This furrow starts since 1.5 cm distance from the head of the shaft and moves down 13 cm as represented in FIG. 34. Inside this shaft from the head section of the shaft, there is a furrow with the diameter of 13 mm length of which is 14.5 cm and its bottom size is equal to the size of furrow existing over the shaft's frame. Around this shaft is surrounded by a spring with the length of 7 cm that this spring is the opposite point of the spring of the clutch pedal as it is illustrated in FIG. 36.

Ball Bearing Coupling and its Connection to the Single Chain:

One ball bearing coupling of LBE type is placed around shaft located over the dynamic frame and over the spring surrounding the shaft. Length of this coupling is 5 cm and its diameter is 2.1 cm, which can move up and down around the shaft. Internal diameter of this ball bearing coupling is 17 mm.

By ball bearing coupling we mean a coupling that is placed inside coupling and series of ball bearings have covered throughout its internal wall making the coupling able to move softly up and down around the shaft.

A clamp is set over the frame of the ball bearing coupling called "Chain Clamp" and a cogwheel is welded over this clamp. This cogwheel is composed of only five cogs.

After installing chain clamp over the frame of the ball bearing, due to the settlement of the coupling along the single chain, cogwheels of the chain clamp are placed inside the single chain and with the up and down movement of the coupling, you may move the chain up or down.

Shaft's Cap:

A cap like piece is installed over the heading section of the shaft with the help of two bolts (no. 5). Inside the heading section of this cap one hole is tapped (8 mm) inside which one no. 8 bolt with the length of 15 cm is set. In the next section, it will be described why we need this bolt.

Figure 40:
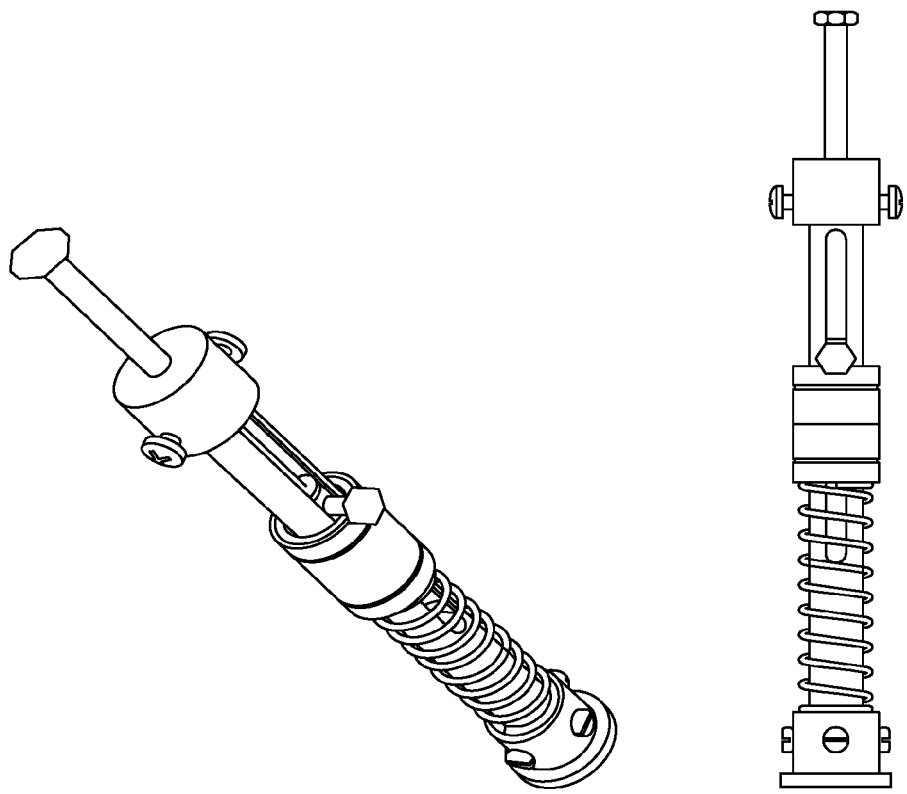
FIG. 40: This figure is representative of the shaft's blueprint and its constituent details.
Figure 40A:
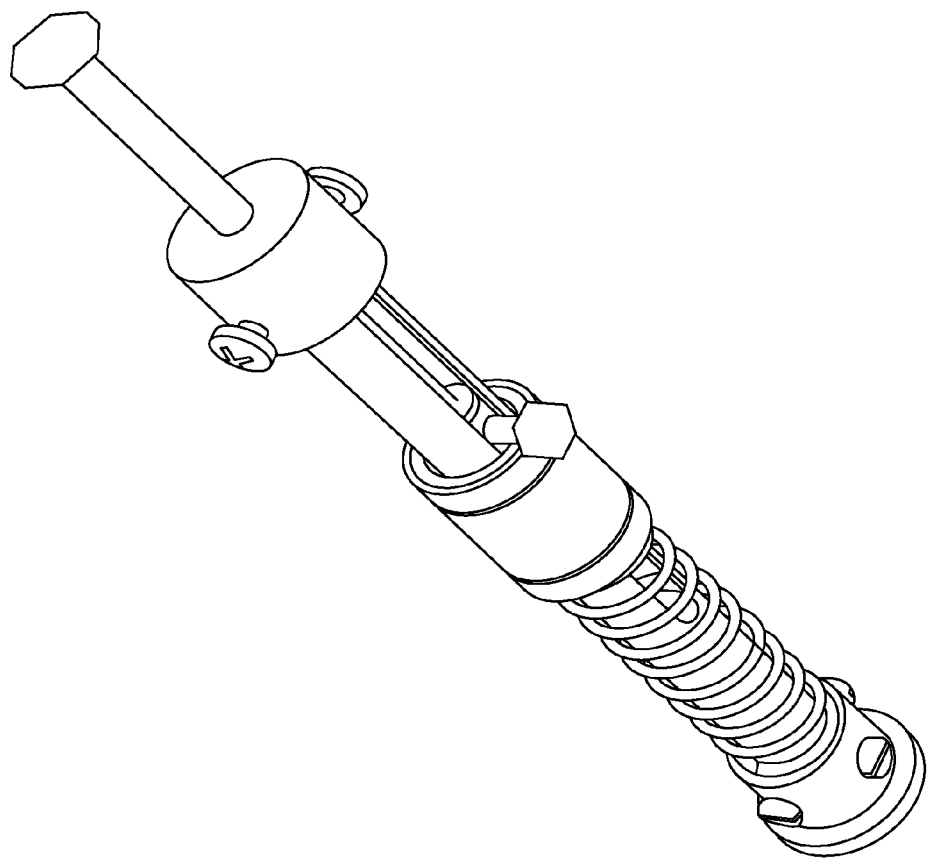
Figure 40B:
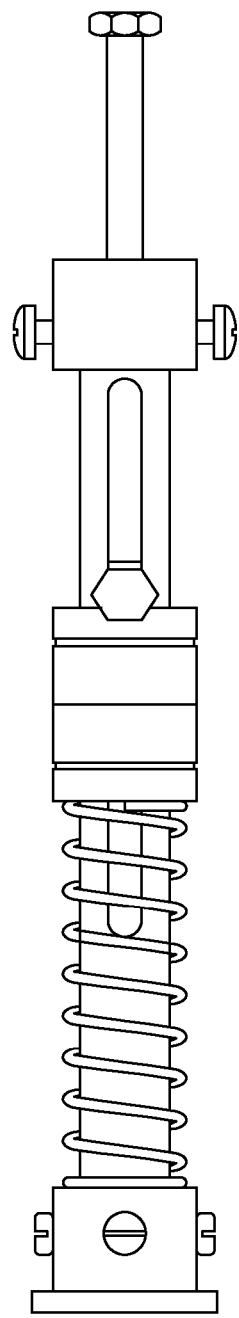
Figure 41:
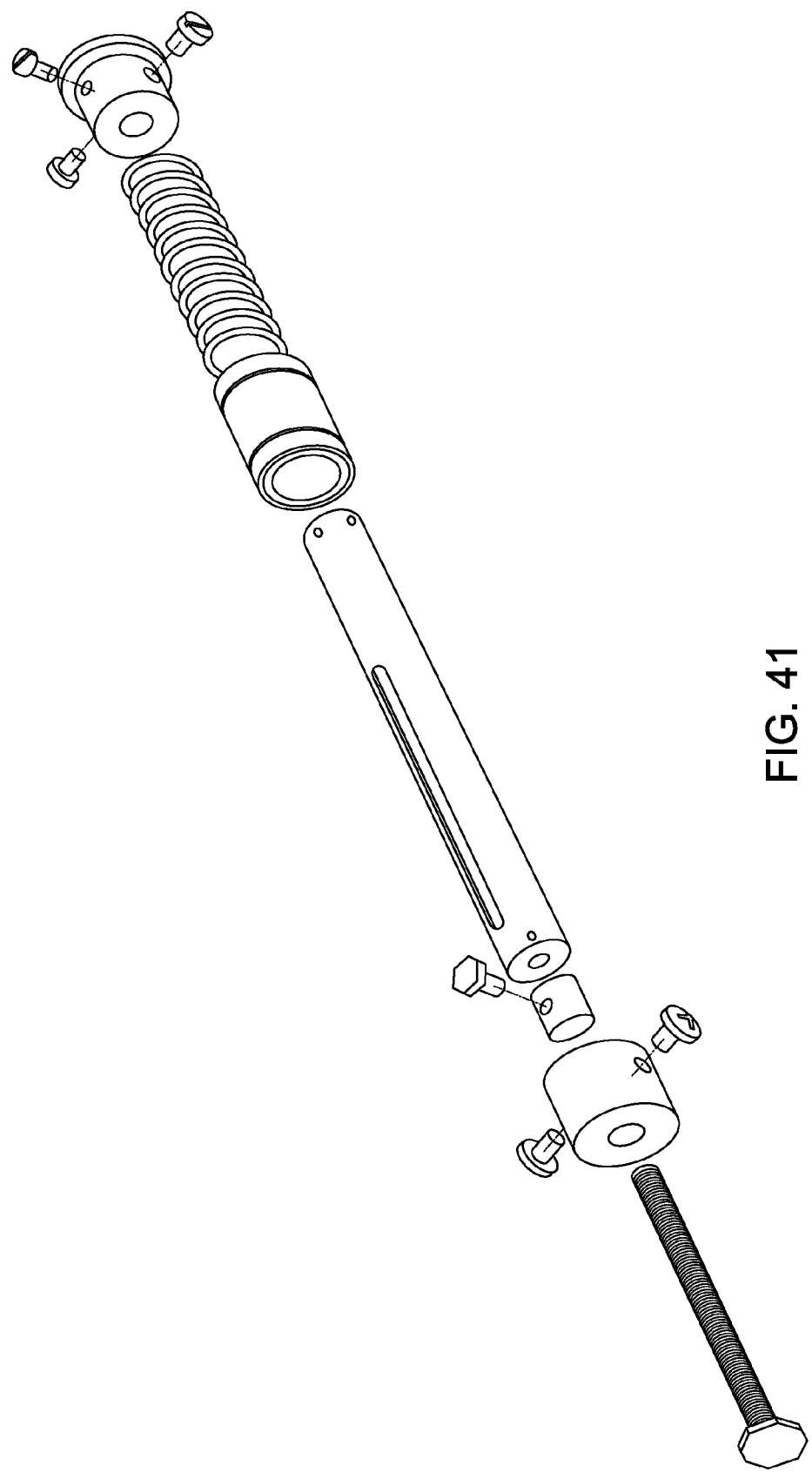
FIG. 41: This figure is representative of 3D Explosive Map of shaft and all constituent parts of it.
Figure 42:
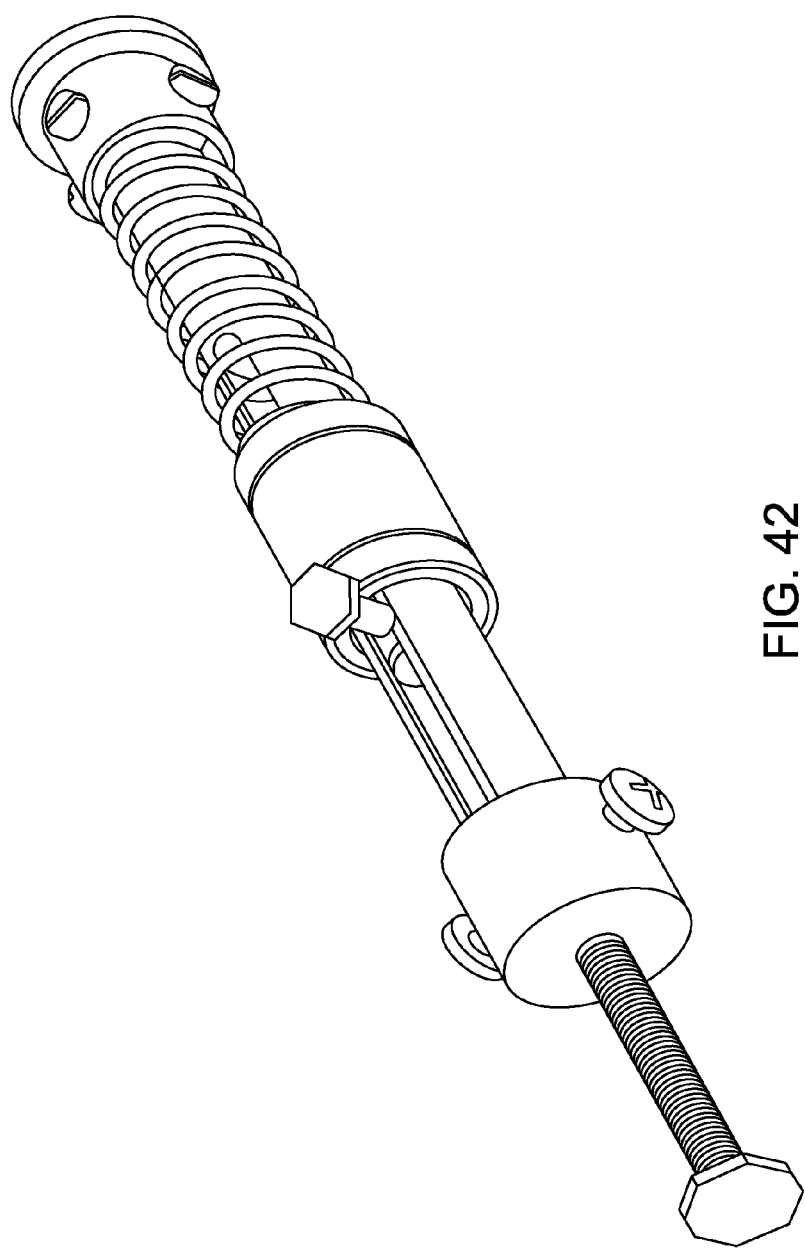
FIG. 42: This figure is representative of 3D Map of shaft and all constituent parts of it.

FIG. 40 shows the physical form and blueprint of the shaft and its constituent parts:

FIGS. 41 and 42 are explosive form of the shaft and its constituent parts:

Dynamic Style of Ball Bearing Coupling:
Gas Pedal's Tweezers:

In this system and along with it, one tweezers is designed and presented which is called "Pedal Tweezers". This tweezers is separate from the system and it is composed of two sections as follows:

1—"UP" Tweezers
2—"DOWN" Tweezers

Figure 43:
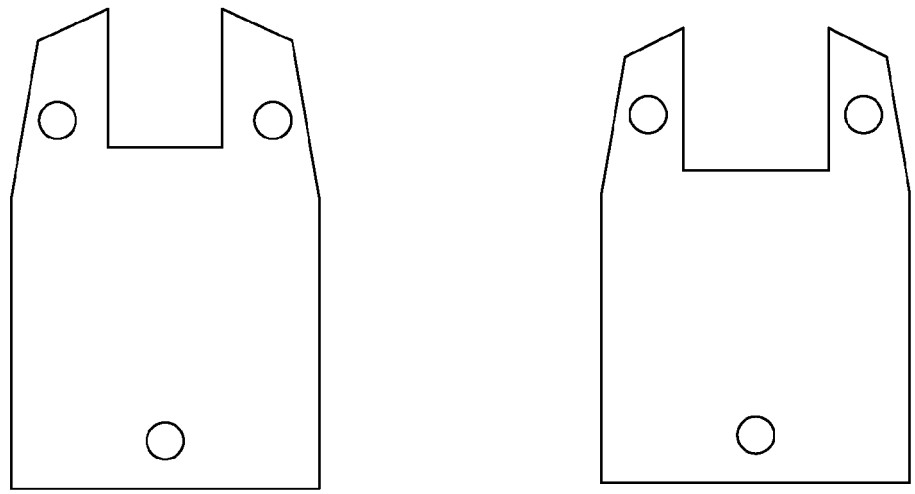
FIG. 43: This figure is representative of gas pedal nippers composed of: 1) Upper Nipper and 2) Lower Nipper. These nippers are connected finally to the gas pedal through 3 bolts.

The down tweezers is placed underneath the gas pedal and up tweezers is installed over the gas pedal such that cogs of these tweezers are placed out and in the left side of the gas pedal connected to each other through 3 bolts (no. 6). The structure of both tweezers is shown in the FIG. 43.

Figure 44:
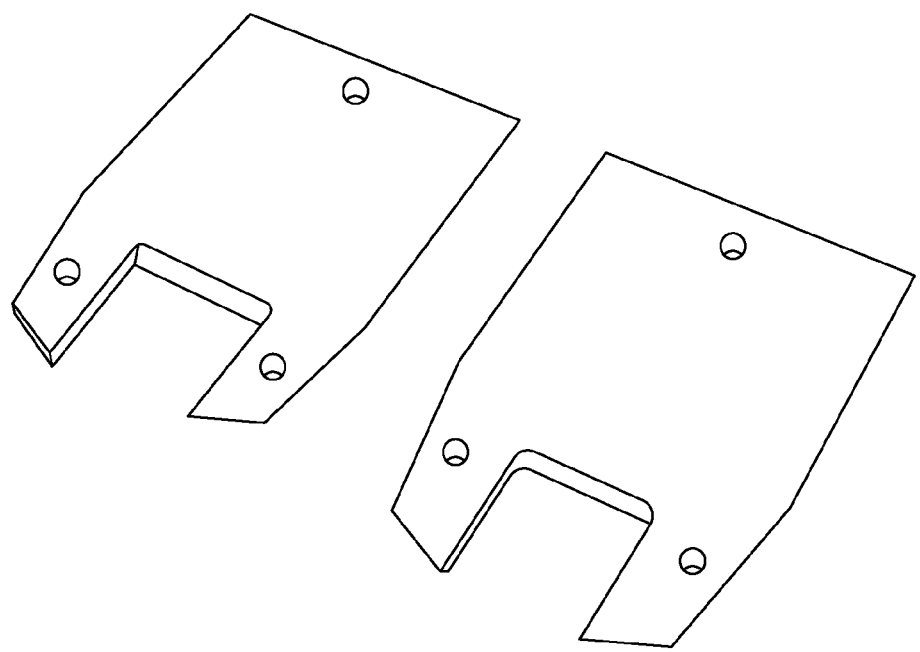
FIG. 44: This figure is representative of gas pedal nippers composed of: 1) Upper Nipper and 2) Lower Nipper. These nippers are connected finally to the gas pedal through 3 bolts. In this figure, you may see place of these bolts.

FIG. 44 shows physical form of the Up and Down Tweezers.

After installing tweezers to the gas pedal, cogs of the down tweezers, which are set in the left side of the gas pedal, are placed around shaft and over the ball bearing coupling that pressing the gas pedal, you can move down the ball bearing coupling. For the existence of spring underneath the ball bearing coupling, coupling moves up with releasing the gas pedal (automatic clutch system is installed under car pedals such that shaft, spring and parallel columns, which are placed in the vertical direction, are located between two gas and brake pedals with shaft and spring placed beside the gas pedal and coupling stuck to the gas pedal. Doing so, cogs of the tweezers connected to the gas pedal are set around the shaft and over the ball bearing coupling.

Regulating distance of ball bearing coupling with the tweezers of the gas pedal.

Method of Adjusting Distance of Coupling with the Gas Pedal:

Maximum distance of the head of the ball bearing couple with the flooring of the dynamic frame is 14 cm and its minimum distance is 4 cm. In different cars, distance of the gas pedal until the car deck is different from one car to the other. For this reason, this system is designed such that it can be adjusted with different distances from the car deck as described in the coming sections.

Inside the hole existing in the head section of the shaft (13.5 mm), there is a piston with the diameter of 13.5 mm and length of 12.5 cm and it can move inside the shaft's hole.

A hole (no. 6) is tapped over the frame of this piston inside which hole one bolt (no. 6) with the length of 3 cm is placed such that when piston is placed inside this hole, head of this bolt, which has remained out of the piston, is placed inside the furrow existing over the shaft's frame and it can move up and down with the up and down movement of the piston. Head of this bolt, which is placed inside the shaft's furrow, is finally set over the ball bearing coupling.

This bolt as used in this system is called "Bolt Connecting Piston to Coupling" as it is specified in the figure.

Bolt existing in the heading section of the shaft's cap, which is opened and closed along the shaft's hole, is placed over the piston inside shaft's hole that screwing up this bolt, we can lead down the piston. For the placement of strategy he spring under the ball bearing coupling, a kind of pressure is always tolerated for keeping the coupling up. When the coupling moves up with the help of the spring underneath it, piston, which is connected to the ball bearing coupling with the help of the connector bolt, slides up always and remains up. For this purpose, loosening the bolt existing in the shaft's cap, which was screwed up previously due to keeping piston down, you may lead up the piston and ball bearing coupling in consequence. Doing so, you may regulate the distance of the ball bearing coupling from the cogs of the tweezers of the gas pedal.

Of course, this coupling moves up and down depending on the develop and return power of the spring.

Method of Installing and Utilizing the System:

Installation:

Automatic Clutch System is generally placed under car pedal such that the main rail frame and dynamic frame of the clutch lever and binary chains are placed under the brake pedal. Clutch lever is also placed between brake lever and clutch lever in a clockwise direction and reverse in a determinate angle.

Parallel columns, shaft, and spring as well as parts existing over the shaft are also placed between gas and brake pedals in vertical fashion. Such that shaft has at least 0.5 cm of distance from the gas pedal. Fulcrum shafts are also placed beside gas and brake pedals in a due place not having contact with pedals.

Head of the fulcrum shafts is placed in a due place under console of steering wheel avoiding any slide. Finally, increasing length of fulcrum shafts, system is installed in a due place tightly.

After tightening the system under car pedals with the help of fulcrum shafts, it is the turn to fastening gas tweezers to the gas pedal and to adjust its distance with the ball bearing coupling in the way that tweezers of gas pedal is installed to the gas pedal while its cogs are placed in the left side of the gas pedal putting cogs of the gas tweezers around the shaft stuck to the gas pedal in vertical fashion. Then adjust the distance of the ball bearing coupling from the cogs of the gas tweezers with the help of "Bush Regulation Bolt" such that cogs of the gas lever tweezers are placed over the head of the ball bearing coupling sticking to it.

After regulating distance of the coupling with the gas pedal tweezers, it is the turn of regulating tweezers of the clutch lever such that after adjusting angle of the tweezers of the clutch lever with the clutch pedal, put the tweezers of the clutch lever over the clutch pedal.

Note: clutch lever, which is connected to the ball bearing coupling with the help of cogwheels and chains existing in the system, (explained in the former chapters) has a spring mood due to the existence of spring beneath the ball bearing coupling. Installing system under the car pedals and putting the clutch lever tweezers over the clutch lever, head of the clutch lever, which is down always for the existence of spring, pulls down the clutch keeping the clutch pedal in a lower and neutral position.

Utilization:

Pressing the gas pedal through cogs of the gas pedal tweezers, you may move down the ball bearing coupling, which is up due to the included spring. Pressing spring under this coupling and moving down this coupling, ball bearing coupling, which is connected to the "Single Chain" by the "Chain Clamp", moves chain downwards along the shaft.

With the down movement of the single chain, triple cogwheels move clockwise and binary chains, which are connected to the single chain through triple cogwheels, also move to the right. With the movement of the binary chains, binary cogwheels move clockwise.

Bottom of the clutch lever, which is connected to the binary cogwheels, move clockwise and make the clutch pedal tweezers to be connected to the head of the clutch lever and be placed over the clutch pedal. For the existence of spring, shaft keeps down the clutch pedal and move up. With the upward movement of the clutch lever tweezers, clutch lever moves up and clutch is engaged with the gearbox of the car and car, which was set in the gear position, starts moving.

Releasing the gas pedal, spring existing around the shaft, which was pulled in for pressing the gas pedal, develops suddenly and moves up the ball bearing coupling and this coupling moves up the "Single Chain" with the help of the "Chain Clamp" moving the binary cogwheels counter clockwise moving the binary chains towards the left. Binary cogwheels move counter clockwise moving head of the clutch lever tweezers downward.

Finally, the opening action of the spring about the shaft makes clutch lever tweezers and clutch pedal to move downwards and this action releases clutch from the gearbox (in this stage, clutch pedal returns to its former position).

Doing so, Auto Clutch System may turn a car with clutch system to a clutch-less system and you may drive your car without the need for clutch.

General Descriptions on the Functioning of the System:

In different cars, clutch pedal is engaged with gearbox in different distances from the car deck. For instance, in some cars, when you press the clutch pedal to the end, you need to release clutch pedal 3 cm in order to engage the gearbox and in some others this rate varies from 5 to 7 cm.

In this system, in which clutch lever is placed over the clutch pedal and clutch pedal is usually kept in a lower position, you may regulate distance of tender documentations clutch lever from the car deck in two styles.

In clutch lever in the heading section of the dynamic lever one nut is welded inside which nut one no. 8 bolt with the scale of 7.5 cm is placed that this bolt makes a 90° angle with the lever.

Tightening or loosening this bolt, you may lead the clutch lever tweezers towards up or down. The reason for the application of the rotary washer nut in the base section of the clutch lever tweezers is used in order to avoid any rotation of the tweezers, which is placed over the clutch pedal, when you are tightening or loosening tweezers distance regulation bolt and to have rotation only in its nut. Doing so, you can regulate distance of the clutch pedal from the car deck. Washer existing in the rotary washer nut is connected to the tweezers by the base of the tweezers and this nut is also connected to the distance regulation bolt.

When tweezers of clutch lever is placed over the clutch pedal, clutch lever fixed and in a lower position commonly and pressing gas pedal and ball bearing coupling and the spring under it, you may move the clutch lever. Clutch lever, when it is connected to the binary cogwheels, will make a determinate angle with the flooring of the main frame. Another method for adjusting distance of the clutch pedal from the car deck is to change angle of the clutch lever. To do so, loosening the single chain through parallel columns distance regulation bolts and releasing single chain from the cogwheels of "Chain Clamp" you may regulate this angle ideally and you can put the clutch pedal in the optional distance from the car deck.

Of course, in the common situation in this system, the first style is used for regulating distance of the clutch pedal from the car deck.

At the time of using system, for the higher pressure of the clutch pedal to the clutch lever, higher pressure is imposed on the binary chains, which lowers and mitigates the distance between "Triple" and "Binary" cogwheels, which are connected to each other through binary chains. For this reason, binary chains loose their tightness and this will complicate functioning of the system.

For this reason, a bolt is placed over the flooring of the dynamic frame of the clutch lever in vertical fashion the bolt of which is welded to the flooring of the frame among the frame and between two holder bases of binary cogwheels. Tightening this bolt in the welded nut makes head of this bolt to touch one fringe of the dynamic frame of the shaft filling the distance between these two frames. This "fringe" is also welded in the middling of the dynamic frame, which is parallel with the nut welded over the dynamic frame of the binary cogwheels. So you can avoid pressure of the clutch pedal and distortion of the distance between these two frames.

Of course, looseness and tightness rate of the binary chains can be adjusted in this fashion, as it is clear in the FIG. 47.

It needs to be noted that looseness and tightness of the clutch pedal varies from one car to the other. This pressure in this system is controlled by a spring existing around the shaft. Since pressure power of clutch pedal varies in different cars, several other springs are presented along the system that the suitable spring can be used. This system is designed in the way that you can replace the spring easily through opening the shaft's cap. Springs presented with the system are made of wires with diameters of 2.5, 2.8, 3, 3.2 and 3.5 and their power is different from each other depending of the diameter of the used spring wire. I also need to note that length of all foregoing springs is 7 cm.

In this system total dynamic frame of the clutch lever and binary cogwheels are put under the brake pedal. In standard cars, when you press down the brake pedal to the end, you will still have a 4 cm distance between the brake pedal and the car deck.

In designing this system, for the placement of the frame of the clutch lever and binary cogwheels underneath the brake pedal and lower space under the brake pedal, it is tried not to let scale of this frame along with binary cogwheels exceed 32 cm and to avoid contact of brake pedal with the binary cogwheels at the time of pressing the brake pedal.

Diameter of the binary cogwheels (2.2 cm)+distance of the binary cogwheels from the flooring of the dynamic frame (2 mm)+diameter of the dynamic frame (6 mm)+one third of the diameter of the main rail frame (2 mm)=32 mm Of course, existing cogs are placed beneath the main rail frame in the car deck penetrating to the inside of the car mat finally. For this reason, height of these cogs (5 mm) is not taken into account. This system is suitable for cars, which enjoy standard brake system.

When heads of the fulcrum shafts are placed underneath the console of the steering wheel and you want tighten the lever through screwing the dynamic lever and increasing height of the lever under the said console, heads engaged beneath this console avoid screwing the dynamic lever and increasing its height. To solve this problem, we have placed nuts of the rotary washer under these heads that their washer is connected to the heads and their nut is connected to the head of the dynamic lever such that when heads are engaged, dynamic lever may rotate freely and you can increase length of the fulcrum shaft through screwing the dynamic lever and this will tighten the system.

Performance of the nuts of the rotary washer is such that washer is connected to the heads and nut is connected to the lever. So both head and dynamic lever may rotate separately. In FIG. 48, the physical form of the nut of the rotary washer is illustrated.

All cogwheels used in this system are cogwheels that have diameter of 2.2 cm and thickness of 2 mm and quantity of the cogs in all cogwheels used in this system is 8 per every cogwheel.

Since in heavy vehicles the distance between the gas pedal and the car deck may be higher than that in the light vehicles, five (5) other springs are presented along this system that thickness of wire of these springs is identical to the thickness of the 7 cm springs explained previously with the only difference that length of these springs is 11 cm. These springs enable us to use the suitable spring when the said distance is more than 10 cm. Shaft used in this system that spring is placed about it has the capacity of spring laying until the length of 12 cm.

In the fulcrum shafts, we saw that scale of the dynamic lever is equal to 155 mm. In this system and along with the system, two other dynamic levers are presented as well with the scales of 24 cm and 32 cm that can be used whenever distance of the car deck from the lower section of the console of the steering wheel exceeds the determinate extent.

All three chains used in this system are no. 25 chains (ANSI).

In this system, instead of the spring used around the shaft, you may use high-tension pumps that have the ability of adjusting the pressure. Through this action, performance and quality of the system will be increased considerably. These pumps assume a spring quality by the oil and a mechanical performance and this is effective on the quality of the system.

When you press the gas pedal to its end, clutch lever moves up and assumes a vertical position. The more you press the gas pedal the more will be come up rate of the head of the clutch lever. This system is designed such that when clutch lever comes up to its final extent, it will make a 90° angle from the flooring of the main frame and in this situation, lever is placed vertically beside the brake pedal without having any contact with the brake pedal.

Fulcrum shafts in this system are designed such that you can place them anywhere in the system, which is the most due for the placement under the console of the steering wheel. In the installation time of the system, fulcrum shafts should be placed in a due position avoiding any contact with the pedals. For using the present invention in a vehicle, the gas pedal is not pressed to the end of its capacity due to the existence of springs and ball bearings coupling around shaft, which are placed underneath the tweezers of gas pedal. In this system, instead of using retractile spring underneath the tweezers of gas pedal, opening and developing spring is used in the top section of the tweezers of gas pedal.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. An apparatus for eliminating use of a clutch lever in a vehicle while driving the vehicle, wherein said apparatus comprises of:
  a main frame;
  at least one dynamic frame;
  at least one shaft;
  double cogwheels;
  at least one spring; and
  gas pedal tweezers,
    wherein said apparatus is placed inside the vehicle,
    wherein said apparatus is connected to said clutch lever.

2. The apparatus as claimed in claim 1, wherein said apparatus comprises of a means for lowering said clutch lever, wherein said apparatus comprises of another means for elevating said clutch lever.

3. The apparatus as claimed in claim 2, wherein said apparatus is detached from said clutch lever of the vehicle.

4. The apparatus as claimed in claim 2, wherein said apparatus is secured by two shafts.

5. The apparatus as claimed in claim 2, wherein said apparatus comprises of at least two different sections, wherein at least one section of said apparatus being placed close to said clutch lever.

* * * * *